US012377377B2

(12) United States Patent
Buth et al.

(10) Patent No.: US 12,377,377 B2
(45) Date of Patent: Aug. 5, 2025

(54) FILTER-HOUSING INTERFACE DESIGNS FOR HEATING, VENTILATION, AND/OR AIR CONDITIONING SYSTEMS

(71) Applicant: RESEARCH PRODUCTS CORPORATION, Madison, WI (US)

(72) Inventors: Steven J. Buth, Madison, WI (US);
Peter J. Davis, Madison, WI (US);
John R. Genova, Madison, WI (US);
Yiwu Yu, Madison, WI (US); Tom Friederick, Madison, WI (US);
Thomas J. Anoszko, Madison, WI (US)

(73) Assignee: Research Products Corporation, Madison, WI (US)

( * ) Notice: Subject to any disclaimer, the term of this patent is extended or adjusted under 35 U.S.C. 154(b) by 0 days.

(21) Appl. No.: 19/030,102

(22) Filed: Jan. 17, 2025

(65) Prior Publication Data

US 2025/0161855 A1 May 22, 2025

Related U.S. Application Data

(63) Continuation of application No. 18/664,128, filed on May 14, 2024.
(Continued)

(51) Int. Cl.
*B01D 46/10* (2006.01)
*B01D 46/00* (2022.01)
(Continued)

(52) U.S. Cl.
CPC ......... *B01D 46/10* (2013.01); *B01D 46/0005* (2013.01); *B01D 46/521* (2013.01); *F24F 8/108* (2021.01)

(58) Field of Classification Search
CPC .... B01D 46/52; B01D 46/521; B01D 46/005; B01D 46/0016; B01D 2265/024; B01D 2265/026; F24F 8/108
See application file for complete search history.

(56) References Cited

U.S. PATENT DOCUMENTS

| 3,823,533 A | 7/1974 | Alverson et al. |
| 5,613,759 A | 3/1997 | Ludwig et al. |

(Continued)

FOREIGN PATENT DOCUMENTS

| CN | 206793234 | 12/2017 |
| DE | 10 2005 044 491 | 3/2007 |

(Continued)

*Primary Examiner* — Benjamin M Kurtz
(74) *Attorney, Agent, or Firm* — Foley & Lardner LLP

(57) ABSTRACT

A filter element for a heating, ventilation, and/or air conditioning (HVAC) system includes a filter media pack and a first support element. The filter media pack includes a pleated filter media. The first support element includes a connecting member that is coupled to the pleated filter media and includes at least a portion of a curved wall that curves above a central axis that extends substantially parallel to an insertion direction of the filter element into a filter housing. The first interface member is located at a distal end of the connecting member and defines a first support ledge that is disposed over the connecting member and that extends substantially parallel to the insertion direction.

16 Claims, 47 Drawing Sheets

Related U.S. Application Data

(60) Provisional application No. 63/524,029, filed on Jun. 29, 2023, provisional application No. 63/466,601, filed on May 15, 2023.

(51) Int. Cl.
*B01D 46/52* (2006.01)
*F24F 8/108* (2021.01)

(56) References Cited

U.S. PATENT DOCUMENTS

| | | | |
|---|---|---|---|
| 5,794,397 | A | 8/1998 | Ludwig |
| 6,502,909 | B1 | 1/2003 | Swilik, Jr. et al. |
| 6,592,643 | B2 | 7/2003 | Shah et al. |
| 6,599,343 | B2 | 7/2003 | Fredrick et al. |
| 6,638,333 | B2 | 10/2003 | Schuld et al. |
| 6,652,613 | B2 | 11/2003 | Shah et al. |
| 6,814,660 | B1 | 11/2004 | Cavett |
| 6,814,773 | B2 | 11/2004 | Shah et al. |
| 6,941,630 | B2 | 9/2005 | Wynn |
| 8,024,309 | B1 | 9/2011 | Deshmukh et al. |
| 8,157,881 | B1 * | 4/2012 | Anoszko ............ B01D 46/0006 55/497 |
| 8,388,717 | B2 | 3/2013 | Livingstone et al. |
| 8,641,794 | B2 | 2/2014 | Gillilan |
| 9,114,342 | B2 | 8/2015 | Schuld et al. |
| 9,320,998 | B2 | 4/2016 | Gillilan |
| 9,579,663 | B2 | 2/2017 | Mckinney |
| 9,610,528 | B2 | 4/2017 | Porbeni et al. |
| 9,674,517 | B2 | 6/2017 | Krancher et al. |
| 9,682,339 | B2 | 6/2017 | Jursich et al. |
| 9,972,505 | B2 | 5/2018 | Matsumoto et al. |
| 10,213,721 | B2 | 2/2019 | Elliott |
| 10,286,351 | B2 | 5/2019 | Schuld |
| 10,350,533 | B2 | 7/2019 | Barry et al. |
| 10,379,199 | B2 | 8/2019 | Diachina et al. |
| 10,406,472 | B2 | 9/2019 | Zhang et al. |
| 10,427,077 | B2 | 10/2019 | Baldinger |
| 10,427,079 | B2 | 10/2019 | Barry et al. |
| 10,646,807 | B2 | 5/2020 | Gorman |
| D914,864 | S | 3/2021 | Roblin |
| 10,940,416 | B2 | 3/2021 | Gregerson et al. |
| 10,981,099 | B2 | 4/2021 | Gregerson et al. |
| 11,074,909 | B2 | 7/2021 | Lee et al. |
| 11,097,217 | B2 | 8/2021 | Barry et al. |
| 11,135,541 | B2 | 10/2021 | Barry et al. |
| 2010/0026354 | A1 | 2/2010 | Utsunomiya et al. |
| 2013/0305146 | A1 | 11/2013 | Hashiba et al. |
| 2014/0230385 | A1 | 8/2014 | Schuld et al. |
| 2015/0267927 | A1 | 9/2015 | Zhang et al. |
| 2017/0216756 | A1 | 8/2017 | Fox et al. |
| 2018/0290090 | A1 | 10/2018 | Bowman |
| 2019/0046909 | A1 | 2/2019 | Haas et al. |
| 2021/0106936 | A1 | 4/2021 | Portelli |

FOREIGN PATENT DOCUMENTS

| | | |
|---|---|---|
| JP | 2000-126529 A | 5/2000 |
| KR | 100504669 | 10/2005 |
| WO | WO-03/031025 | 4/2003 |
| WO | WO-2007/003390 | 1/2007 |
| WO | WO-2010/033695 A1 | 3/2010 |
| WO | WO-2012/162003 | 11/2012 |
| WO | WO-2013/123325 | 8/2013 |
| WO | WO-2015/090870 | 6/2015 |
| WO | WO-2017/053177 A1 | 3/2017 |
| WO | WO-2018/128990 A1 | 7/2018 |

\* cited by examiner

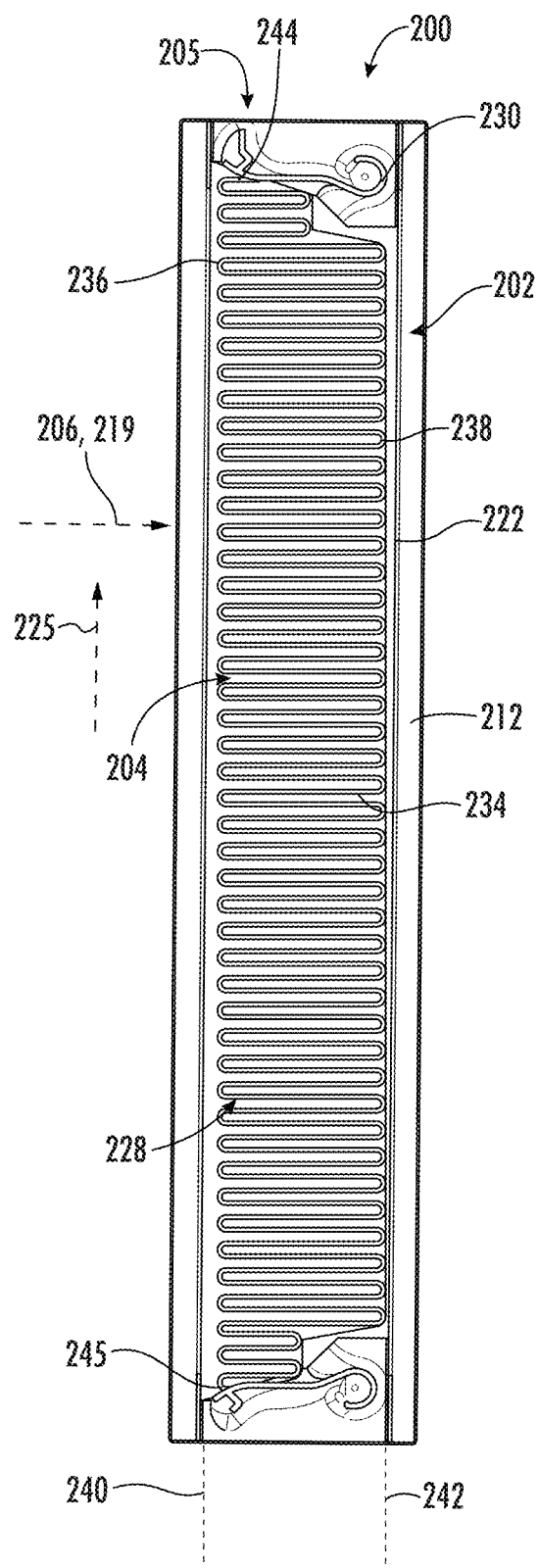
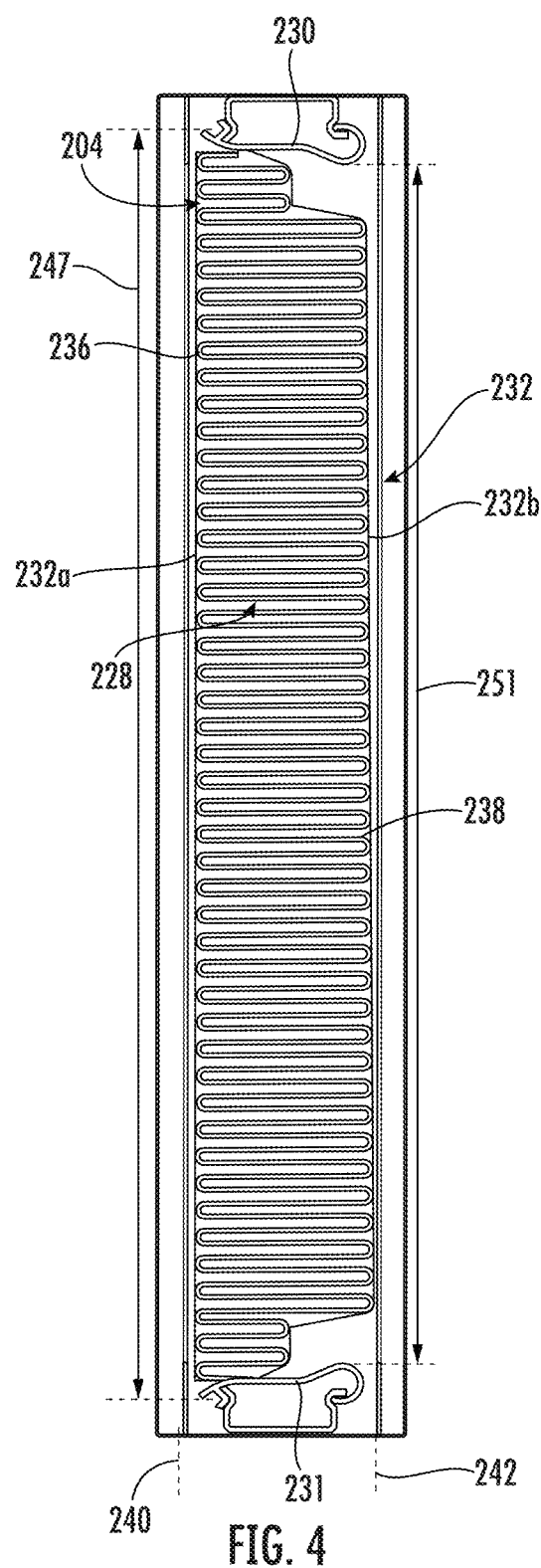
FIG. 3
FIG. 4

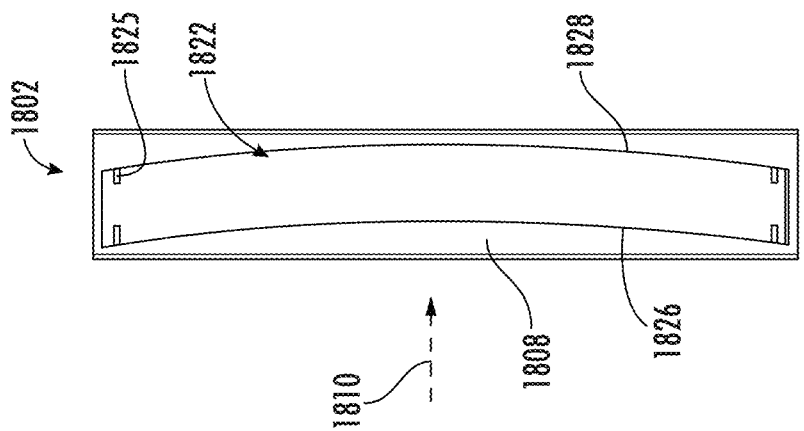
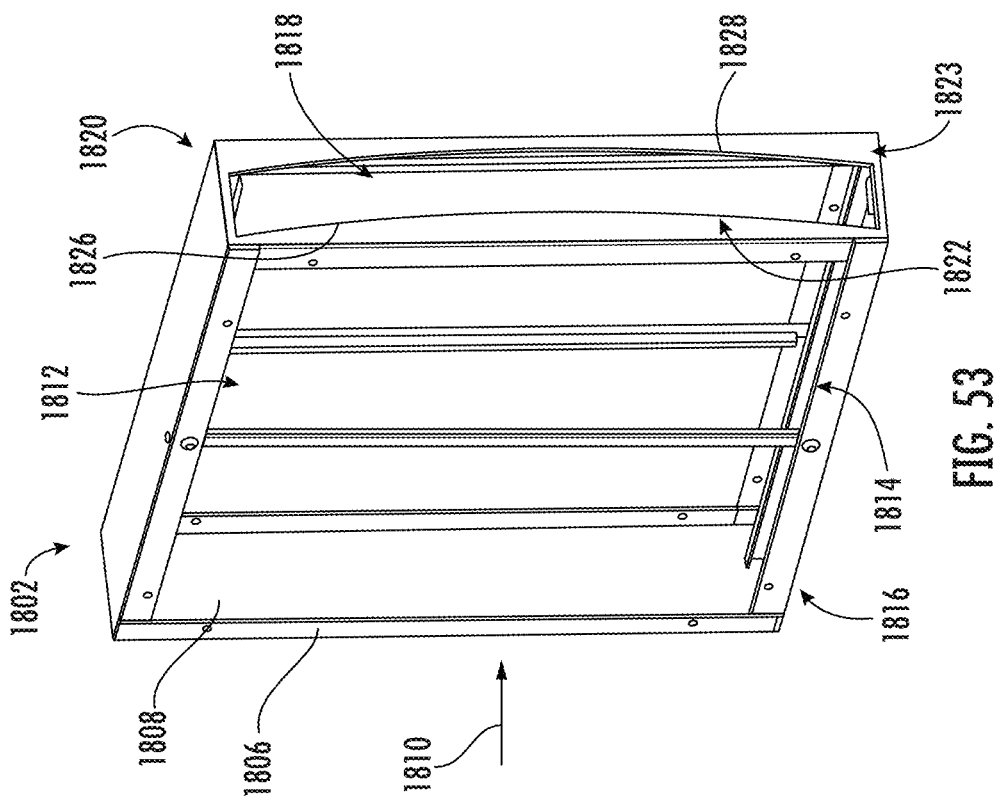

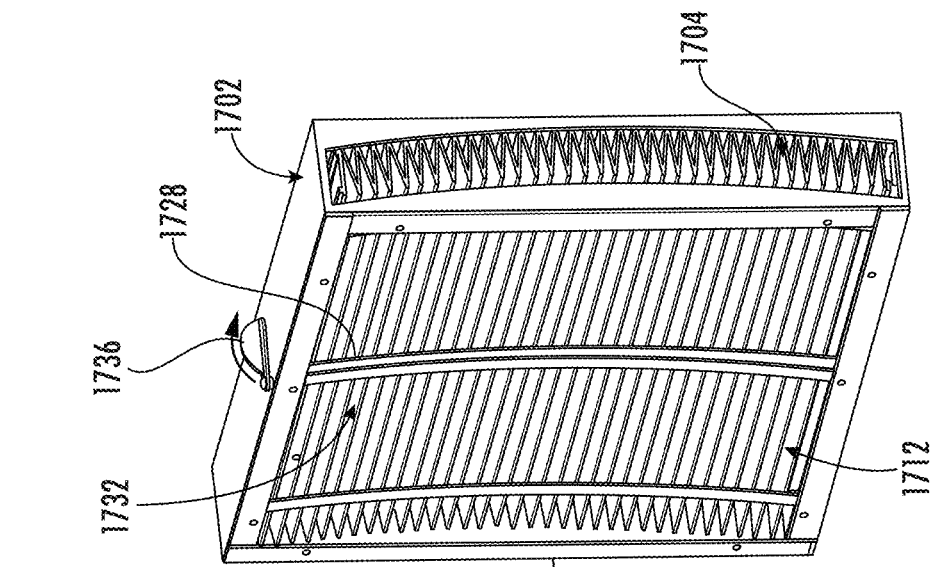
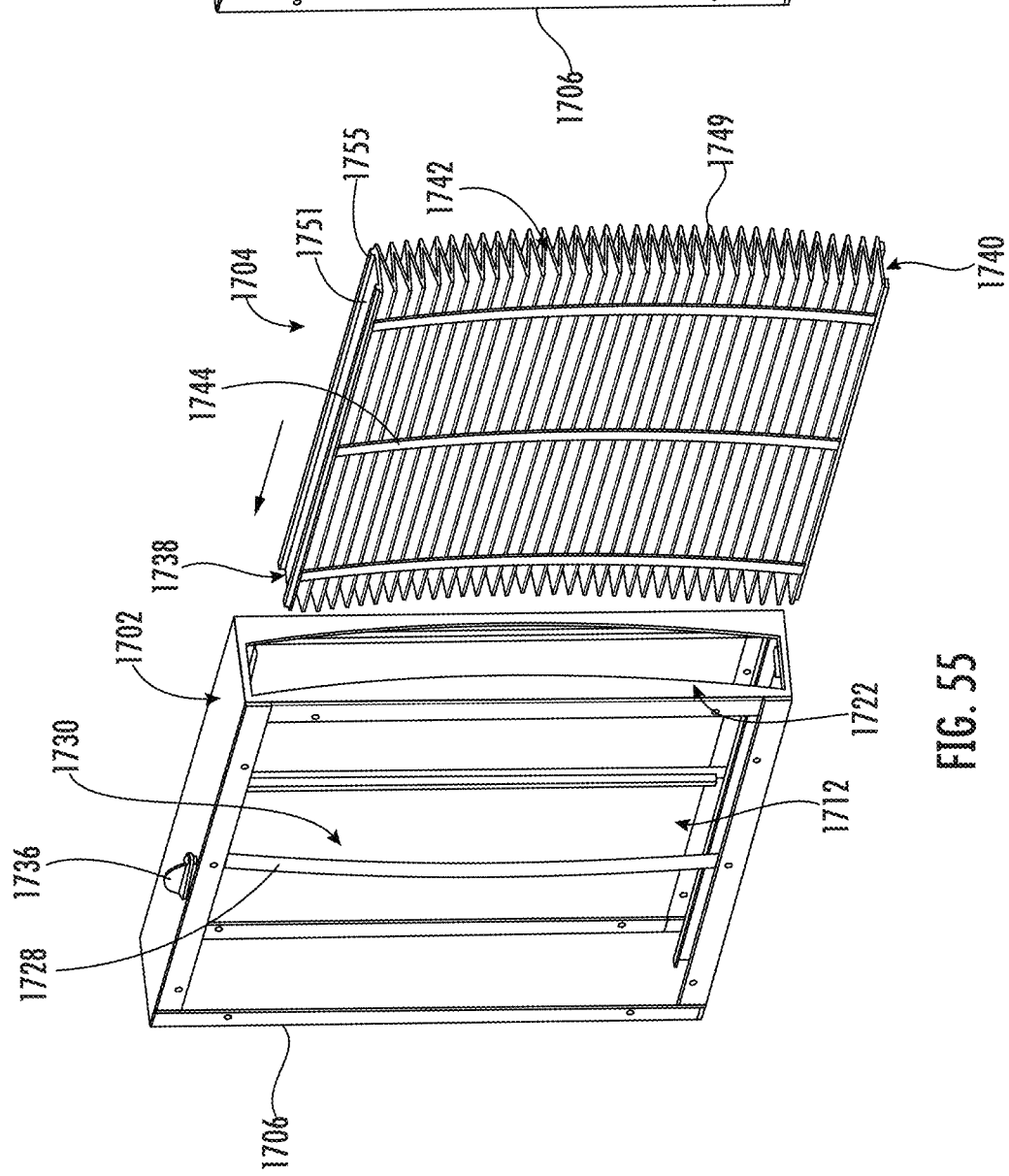
FIG. 56
FIG. 55

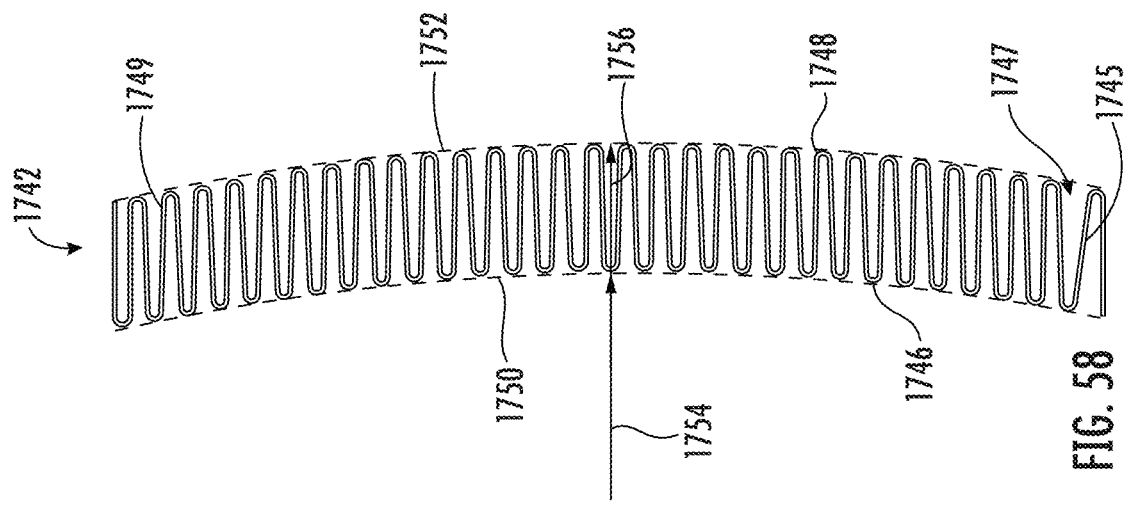
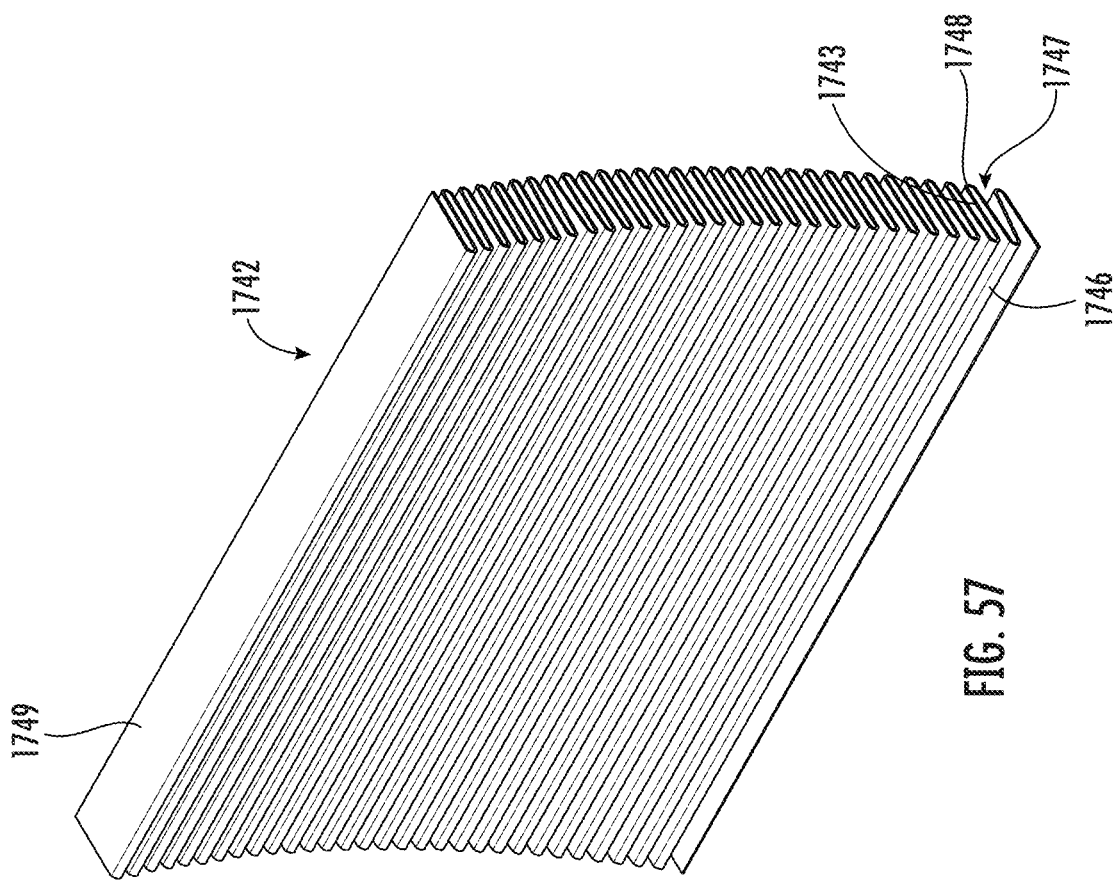

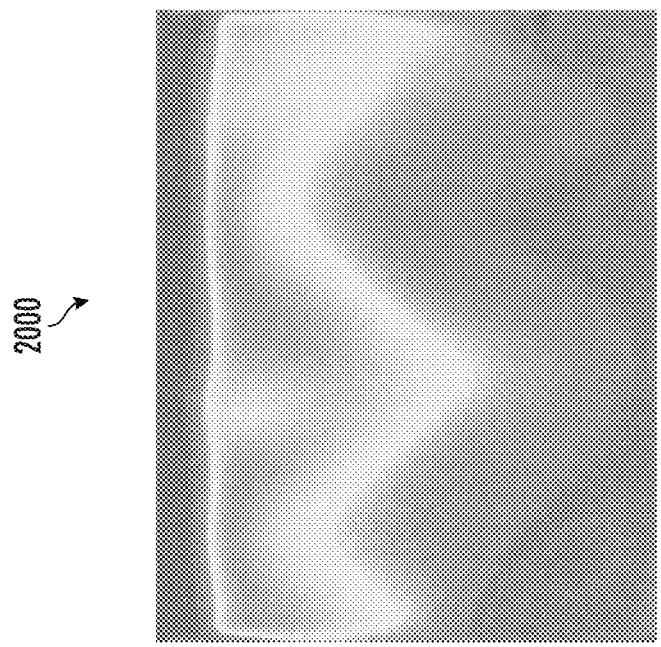
FIG. 61
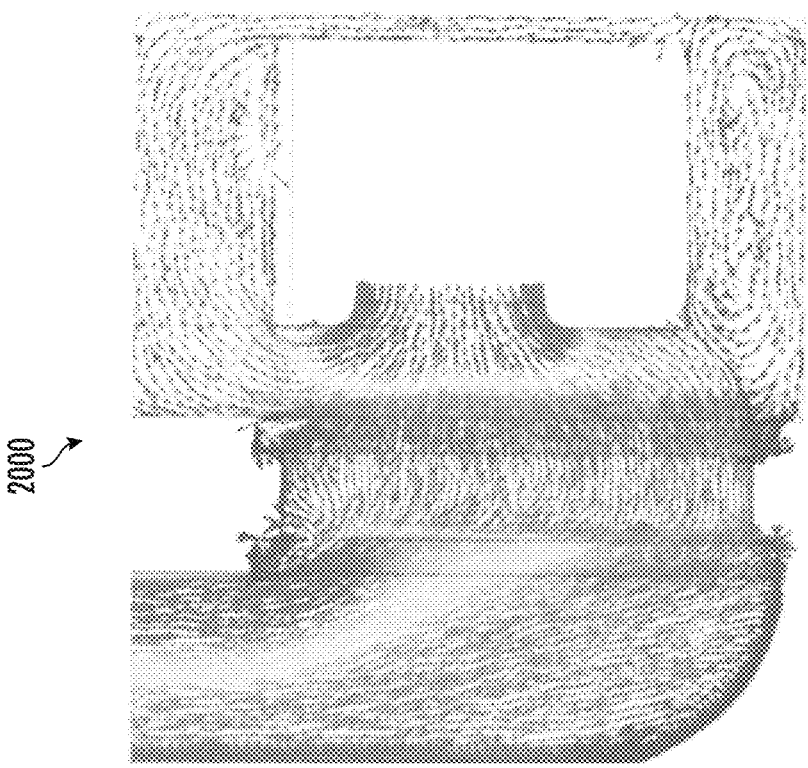
FIG. 60
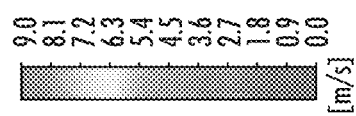

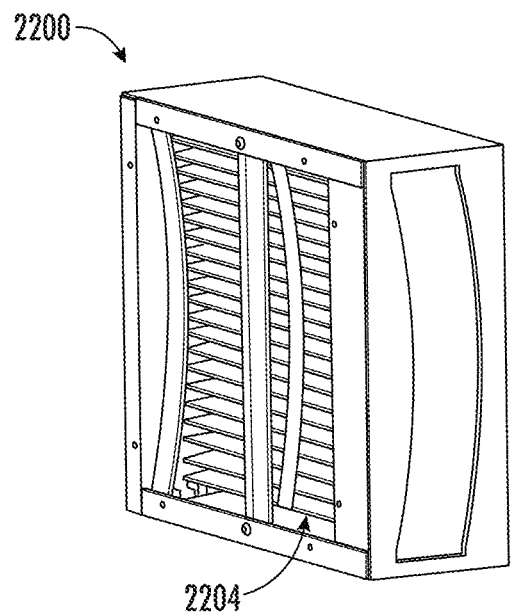
FIG. 65
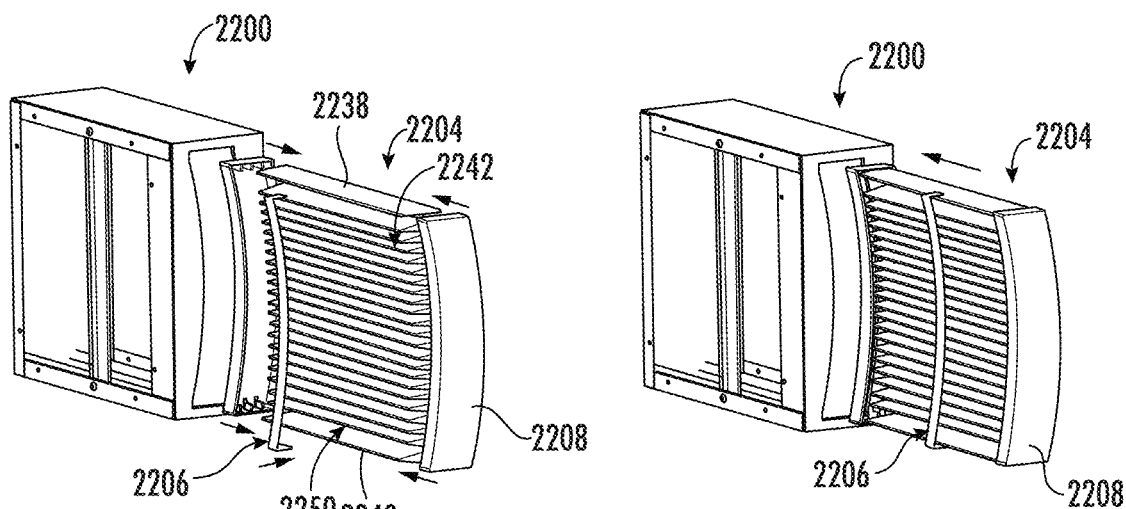
FIG. 66
FIG. 67

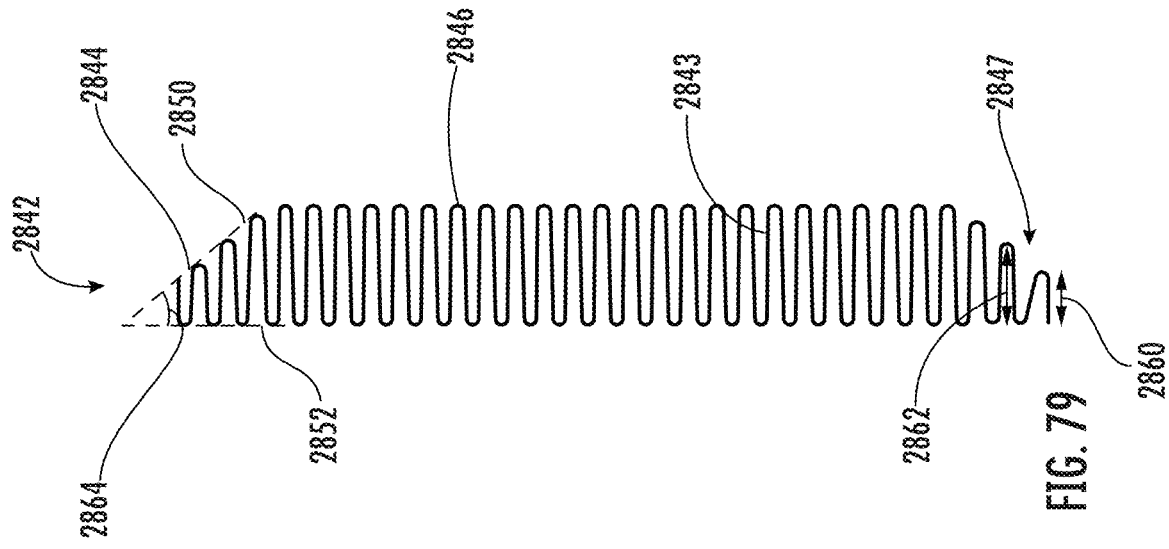
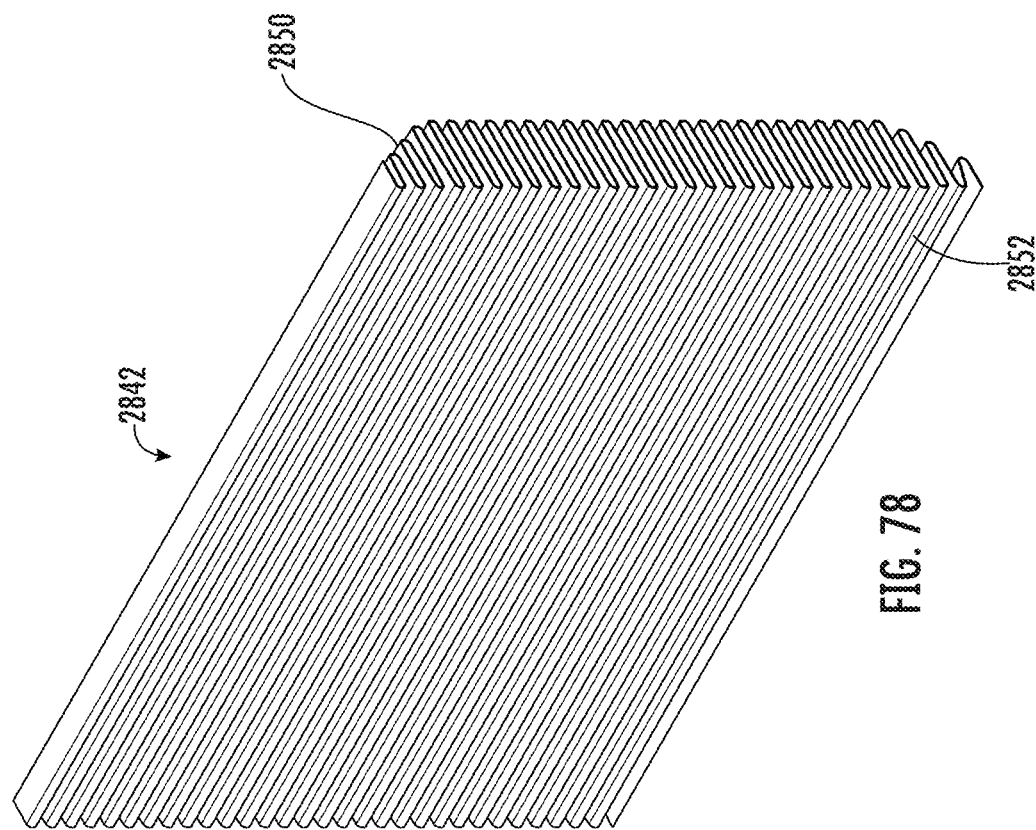

FILTER-HOUSING INTERFACE DESIGNS FOR HEATING, VENTILATION, AND/OR AIR CONDITIONING SYSTEMS

CROSS-REFERENCE TO RELATED PATENT APPLICATIONS

This application is a continuation of U.S. patent application Ser. No. 18/664,128, filed May 14, 2024, which claims the benefit of and priority to U.S. Provisional Patent Application No. 63/466,601, filed May 15, 2023, and U.S. Provisional Patent Application No. 63/524,029, filed Jun. 29, 2023, the entire contents of each of which are hereby incorporated by reference herein.

BACKGROUND

The present disclosure relates generally to air filtration systems and air filter elements for removing particulate matter and other contaminants from air. More specifically, the present disclosure relates to air filter element designs for heating, ventilation, and air conditioning (HVAC) systems, and to filter-housing interface designs used to secure a filter element within a housing of an air filtration system.

SUMMARY

An embodiment of the present disclosure relates to a filter element for a heating, ventilation, and/or air conditioning (HVAC) system. The filter element includes a filter media pack and a first support element. The filter media pack includes a pleated filter media. The first support element includes a connecting member that is coupled to the pleated filter media and includes at least a portion of a curved wall that curves about a central axis that extends substantially parallel to an insertion direction of the filter element into a filter housing. The first interface member is disposed at a distal end of the connecting member and defines a first support ledge that is disposed over the connecting member and that extends substantially parallel to the insertion direction.

Another embodiment of the present disclosure relates to a support element for an HVAC system. The support element includes a first interface member, a second interface member, and a connecting member. The first interface member extends along a longitudinal direction and defines a first support ledge. The second interface member is spaced apart from the first interface member. The second interface member defines a second support ledge that extends substantially parallel to the first support ledge. The connecting member is configured to couple the first interface member and the second interface member to a filter media. The connecting member extends from the first interface member to the second interface member and includes at least a portion of a curved wall that curves about a central axis that extends substantially parallel to an insertion direction of the filter element into a filter housing.

Yet another embodiment of the present disclosure relates to a method of making a filter element for an HVAC system. The method includes coupling a filter media pack including a pleated filter media to a connecting member of a support element. The connecting member includes at least a portion of a curved wall that curves about a central axis that extends substantially parallel to an insertion direction of the filter element into a filter housing. The connecting member also includes a first interface member extending from the connecting member and defining a first support ledge that is disposed over the connecting member and that extends substantially parallel to the insertion direction.

Yet another embodiment of the present disclosure relates to an air filter assembly that includes a filter housing and an HVAC system that is configured to enable installation of the filter element from multiple sides of the filter housing and to accommodate different air flow arrangements through the filter housing. The filter housing includes a housing rail defining a pair of tracks. Each track of the pair of tracks defines a first support ledge and a second support ledge spaced apart from the first support ledge. The filter element includes a filter media pack and a support element coupled to an axial end of the filter media pack. The support element includes a first interface member engageable with the first support ledge of the first track, and a second interface member engageable with the second support ledge of the second track.

Yet another embodiment of the present disclosure relates to a filter element including a first frame element, a second frame element, a filter media pack, and a support element. The filter media pack is coupled to and extends between the first frame element and the second frame element. The filter media pack includes a filter media folded along a first plurality of bend lines and a second plurality of bend lines. The second plurality of bend lines is disposed in an alternating arrangement with the first plurality of bend lines across a surface of the filter media. The first plurality of bend lines together defining a first face of the filter media pack. The second plurality of bend lines together defines a second face of the filter media pack that is offset from the first face along a flow direction through the filter media pack. The support element is engaged with the filter media and extends across one of the first face and the second face. The support element maintains (e.g., supports, etc.) at least a portion of the first face in at least one of (i) a non-perpendicular angle relative to the flow direction, or (ii) a curved shape along the flow direction.

Yet another embodiment of the present disclosure relates to a filter housing for a heating, ventilation, and air conditioning system. The filter housing includes a frame, a plurality of sidewalls, and a support member. The sidewalls are coupled to the frame and enclose at least three sides of the frame. The plurality of sidewalls and the frame together define an interior cavity, an inlet opening at a first longitudinal end of the interior cavity, an outlet opening at a second longitudinal end of the interior cavity opposite the first longitudinal end, and an access opening at a lateral end of the interior cavity. The access opening is configured to receive a filter element therein. The support member is coupled to the frame. At least a portion of the support member extends along a flow direction normal to the inlet opening and the outlet opening.

Yet another embodiment of the present disclosure relates to a method of installing a filter element into a filter housing. The method includes (i) aligning a filter element including a filter media pack, a first frame element coupled to a first end of the filter media pack, and a second frame element disposed on an opposite end of the media pack as the first frame element with an opening of a filter housing, (ii) engaging the first frame element with a frame support element of the filter housing to slidably couple the first frame element to the frame support element, (iii) inserting the filter element into an interior cavity of the filter housing; and (iv) engaging a first face of the filter element with a support element so that at least a portion of the first face is oriented in at least one of (i) a non-perpendicular angle relative to a flow direction through the filter housing, or (ii) a curved shape along the flow direction.

BRIEF DESCRIPTION OF THE FIGURES

FIG. 3 is a front view of the air filter assembly of FIG. 2.

FIG. 4 is a front cross-sectional view of the air filter assembly of FIG. 2.

FIG. 53 is a perspective view of a filter housing of the filter assembly of FIG. 51.

FIG. 54 is a side view of the filter housing of FIG. 53.

FIG. 55 is a perspective view of a filter assembly inclusive of a filter housing having a moveable arcuate support member, shown with the filter element in a first stage of assembly, according to an embodiment.

FIG. 56 is a perspective view of the filter assembly of FIG. 55 in a second stage of assembly.

FIG. 57 is perspective view of a curved filter element that can be used with the filter assembly of FIG. 51.

FIG. 58 is a side view of the curved filter element of FIG. 57.

FIG. 60 is a side cross-sectional view of a velocity profile through a filter assembly, according to an embodiment.

FIG. 61 is a front view of the velocity profile of FIG. 60 taken along a cross-section at an inlet to a filter housing of the filter assembly.

FIG. 65 is a perspective view of a filter assembly inclusive of a filter element having an arcuate media pack support, according to an embodiment.

FIG. 66 is a perspective view of the filter assembly of FIG. 65 showing an assembly operation for the filter element.

FIG. 67 is a perspective view of the filter assembly of FIG. 65 showing installation of the filter element into a filter housing of the filter assembly.

FIG. 78 is a perspective view of a filter media pack having chamfered end portions along an inlet face of the media pack, according to an embodiment.

FIG. 79 is a side view of the filter media pack of FIG. 78.

DETAILED DESCRIPTION

Figure 1:
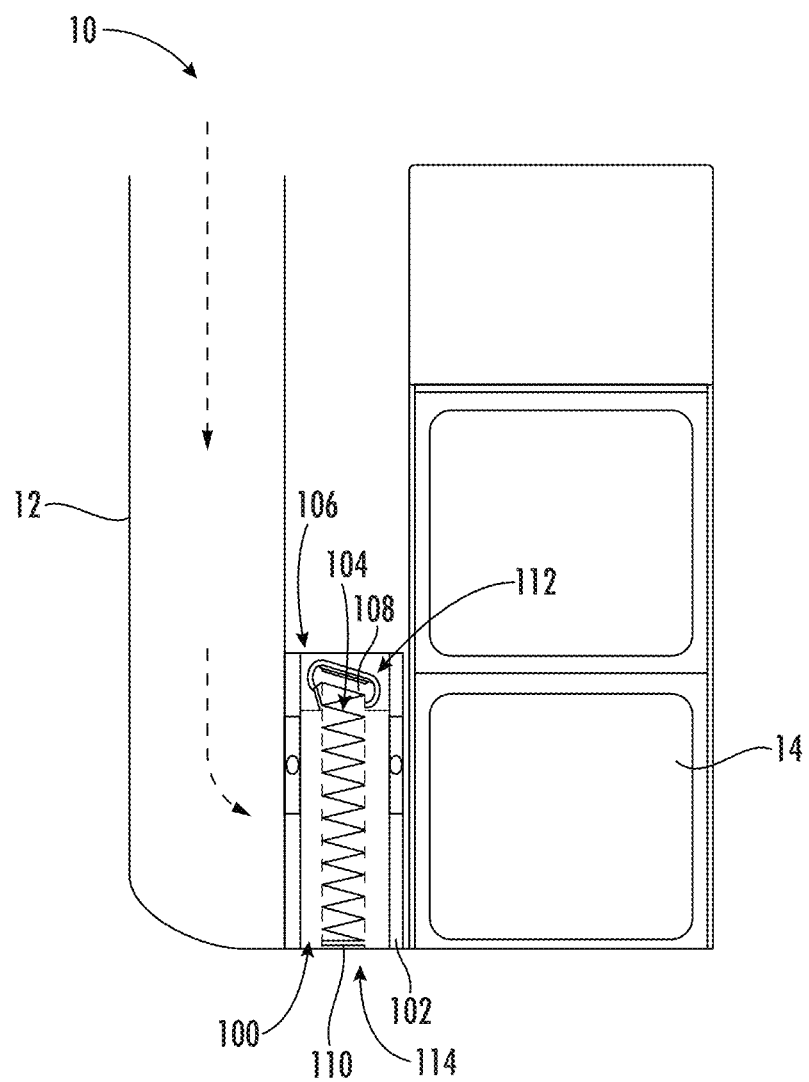
FIG. 1 is a front view of a heating, ventilation, and/or air conditioning (HVAC) system for a building, according to an embodiment.

Forced air heating, ventilation, and/or air conditioning (HVAC) systems are used in buildings to condition air within the building and to allow exchange of air with an environment surrounding the building. HVAC systems generally include an air filter assembly to remove contaminants, such as dirt, pollen, and other particulates from the air entering the building and during recirculation of indoor air to improve overall air quality within the building. These air filter assemblies may include a filter housing that supports a filter element having filter media to remove contaminants from air entering the HVAC system (e.g., a furnace, an air conditioning system, a dehumidifier, etc.). During operation, the filter media traps contaminants from air passing through the filter media, which can build up in the pores of the filter media, leading to increased restriction and pressure drop across the filter assembly, and ultimately requiring replacement of the filter element.

The performance of the filter element depends on a variety of factors, including the pressure drop across the filter element, the dust holding capacity of the filter element, and the efficiency of the filter element at removing dust and other particulate matter from the air (e.g., an amount of dust retained by the filter element divided by the total amount of dust entering the filter element with incoming air). The pressure drop affects the amount of energy needed to filter the air (e.g., fan size, etc.). The dust holding capacity affects the service life of the filter element (e.g., an amount of time that the filter element can be used before requiring replacement), and the efficiency affects the quality of air exiting the filter element (e.g., the indoor air quality).

Overview

In general, air filter housings may include a rail system (e.g., a filter mount assembly, etc.) including a housing rail (e.g., a rail member, etc.) that engages with an endplate structure of a filter element to secure the filter element in place within an air filter housing. Installation may require orienting the filter element before installation into the air filter housing so that air passes through the filter element in a desired direction based on manufacturer specifications, such as based on a label applied to the filter element. Installation may also require aligning narrow openings of the endplate structure with edges or feed of a track in the housing to engage the filter element with the housing and to ensure proper sealing between the endplate structure and the housing. Such alignment operations may require manual manipulation of the filter element and endplate structure to ensure that the endplate structure is fully engaged with the track.

Referring generally to the figures, air filter assemblies for HVAC system are shown that include a filter-housing interface that is configured to simplify installation of the filter element into the filter housing and to increase filter performance. The filter-housing interface features of the present disclosure are defined by an endplate structure (e.g., a support element, a frame element, an endcap, an endplate, etc.) that is configured to support the filter element in an expanded position within the filter housing. The filter-housing interface features of the present disclosure are configured to (ii) improve the performance of the filter element during operation, (ii) simplify handling and installation of the filter element into the filter housing, and (iii) reduce user error during servicing of the filter element.

The endplate structure may be part of the filter element, or may be formed separately from the filter element and inserted onto or otherwise coupled to an endplate of the filter element. The endplate structure is designed to improve performance of the air cleaner assembly. For example, the endplate structure may be structured to support an end pleat of a pleated filter media pack at an angle when the filter media pack is in a fully expanded position, which can increase performance by reducing the restriction across the filter media pack in the area adjacent to the end pleat. The angle also increases the effective media area available for flow through the filter element by exposing the filter media at the end pleat to incoming air flow. For example, the endplate structure may be configured to support the end pleat at an angle relative to a flow direction through the filter media pack to more fully open a media channel that is at least partially defined by the end pleat. The endplate structure may also define at least one curved surface on a media-facing side of the endplate structure, which can reduce flow recirculation along the upper wall (even away from the end pleat). The combination of the endplate geometry and orientation can reduce the pressure drop across the filter element and increase overall dust holding capacity, without requiring additional space with the filter housing.

In at least one embodiment, the rail system includes a rotational alignment member that is configured to rotate the endplate structure into alignment with the housing rail during installation of the air filter into the housing rail, and so that the end pleat is maintained in an open position within the housing. The rotational alignment member may be configured to receive the endplate structure in multiple rotational arrangements with respect to the housing rail, which can significantly simplify installation of the air filter into the filter housing.

In some embodiments, the housing rail is configured to enable installation of the endplate structure from either side of the filter housing while maintaining the endplate structure at an angle relative to the air flow direction through the filter housing. The housing rail can also enable adjustment of the endplate structure to different angles based on the airflow direction through the housing. For example, the housing rail may include a pair of tracks that each define multiple support ledges, which can enable supporting the endplate structure in different orientations depending on which side of the housing the filter element is inserted from. In some embodiments, the support ledges for each track are disposed on opposite sides of each track.

In some embodiments, the endplate structure includes a rail-interface element and a media-interface element that extends away from the rail-interface element and that is configured to couple the rail-interface element to the filter media pack. In such embodiments, the rail-interface element may be structured to allow for insertion of the rail-interface element into an air cleaner housing in a non-angled orientation with respect to a housing rail, while also supporting the end pleat at an angle relative to a flow direction through the air cleaner housing. Such features can facilitate alignment of the endplate structure with the housing rail during installation.

In some embodiments, the rail-interface member defines at least a portion of a key that is engageable with the housing rail in a single orientation. Such an arrangement can ensure that the filter element is inserted into the filter housing in the correct orientation, and/or so that layers of the filter media pack are oriented in the correct arrangement from an upstream end to a downstream end of the filter media pack. The keyed engagement between the rail-interface member and the housing rail can also prevent the use of filter elements having lower performance than the original equipment, such as filter elements having poorer quality than the original equipment, and/or pressure drop characteristics that could reduce the service life of other HVAC equipment (e.g., blowers, etc.) over time.

In some embodiments, the air cleaner assembly also includes an installation guide (e.g., a rail guide, an endplate funnel, etc.) that is coupled to the filter housing and that includes transition elements that interface with and facilitate the transition to guide members of the housing rail. In some embodiments, the housing rail and the installation guide have a different structure, which can simplify the design of the housing rail, while maintaining protection against the use of non-genuine filter elements. These and other advantages of the various embodiments provided herein are described in more detail with respect to the figures.

Embodiments of the present disclosure also relate to filter elements and filter assemblies for HVAC systems that are structured to increase flow performance and the overall dust loading capacity to thereby improve HVAC system performance. The filter elements include a pleated or corrugated filter media having curved and/or angled inlet and/or outlet faces, or portions thereof, along a flow direction through the filter element. The curved and/or angled shape of the inlet and/or outlet faces of the filter media pack can provide greater surface area of the filter media in areas of high air velocity through the filter housing, resulting in a more consistent media velocity across the filter media pack, which can reduce pressure drop across the filter media pack during operation. Such an arrangement can also reduce the amount of filter media in areas of low flow velocity through the housing to thereby increase filter media utilization. The angled and/or curved shapes described herein can also increase the overall volume of filter media that can be contained within the filter housing, across a fixed cross-section along the flow direction through the filter housing, thereby improving dust holding capacity and service life.

In at least one embodiment, the filter element includes a filter media pack extending between, and supported by frame elements that can facilitate engagement of the filter element with a filter housing of the filter assembly. The filter media pack includes a filter media folded along a first plurality of bend lines and a second plurality of bend lines disposed in an alternating arrangement with the first plurality of bend lines across a surface of the filter media. In such embodiments, the filter media is pleated or otherwise folded back onto itself to define an accordion shaped pleat structure having wall segments that extend between adjacent ones of the first and second plurality of bend lines. The first plurality of bend lines together define an inlet face of the filter media pack. The second plurality of bend lines form an outlet face of the filter media pack that is offset from the inlet face along a flow direction through the filter media pack. The filter element also includes a support element, such as a flexible ribbon, inflexible shaft, or another type of structural support element that is engaged with the filter media and that extends across one of the inlet face and the outlet face to support at least a portion of the inlet face and/or the outlet face in (i) a non-perpendicular angle relative to the flow direction, and/or (ii) a curved shape along the flow direction (so that a center portion of the filter media protrudes along the flow direction, etc.), as will be further described.

Air Filter Assembly

Referring to FIG. 1, an air filter assembly 100 of an HVAC system 10 for a building is shown that is structured to filter recirculated air, and/or incoming air from an environment surrounding the building to produce clean, filtered, indoor air. In some embodiments, the HVAC system 10 is configured to condition (e.g., heat, cool, humidify, dehumidify, etc.) air a residential or commercial building, such as an apartment, an office building, a house, or another building type. In various embodiments, the air filter assembly 100 includes a filter housing 102 that supports a filter element 104 within the HVAC system 10. A first end (e.g., an inlet end, etc.) filter housing 102 is coupled to ductwork 12, which may be a return air duct configured to recirculate indoor air through the air filter assembly 100, a vent air duct configured to provide unfiltered outdoor air to the air filter assembly 100, or a combination thereof. A second end (e.g., an outlet end, etc.) of the air filter assembly 100 is coupled to a furnace 14 or another piece of HVAC equipment to provide a source of clean, filtered air to the furnace. In other embodiments, the air filter assembly 100 may be coupled to other components of an HVAC system 10. For example, the filter housing 102 may be coupled to a return air vent within the building to filter air being recirculated into the HVAC system. In other embodiments, the filter housing 102 may be coupled to a dehumidifier assembly or to another piece of HVAC equipment. In yet other embodiments, the filter housing 102 may be coupled to a damper assembly or at a fresh air vent that fluidly couples the building to the outdoor environment.

The size and arrangement of the ductwork and furnace may be different depending on application requirements (e.g., flow rate requirements, building size, a location of the HVAC system 10 within the building, etc.). For example, the size of the ductwork and/or openings in the furnace (or other HVAC equipment) may increase for higher flow rate applications. The types of connections that may be used to fasten or otherwise couple the filter housing 102 to the HVAC system 10 may also be different in various embodiments.

The air filter assembly 100 also includes a rail-interface system 106 (e.g., a rail system, a filter mount assembly, a filter-housing support assembly, etc.) that is configured to maintain and support the filter element 104 in an expanded position within the filter housing 102. In some embodiments, the rail-interface system 106 includes portions of the filter element 104 and the filter housing 102 that together maintain and support the filter element 104 in the expanded position within the filter housing 102.

In the embodiment of FIG. 1, the rail-interface system 106 includes a first endplate structure, shown as first support element 108 coupled to an end pleat of a filter media pack at a first axial end of the filter media pack. The rail-interface system 106 also includes a second endplate structure, shown as second support element 110 coupled to another end pleat at the opposing axial end of the filter media pack as the first support element 108. The first support element 108 and the second support element 110 engage with complementary receiving structures (e.g., a first rail and a second rail, respectively) at a first axial end 112 of the filter housing 102 and a second axial end 114 of the filter housing 102, respectively, which secures the axial position of the first support element 108 and the second support element 110 with respect to the filter housing 102, and prevents the filter media pack from collapsing in the axial direction during operation.

In some embodiments, the first support element 108 and the second support element 110 are different from one another. In other embodiments, the air filter assembly 100 is symmetric across a reference plane passing along an airflow direction (e.g., a lateral direction, etc.) therethrough. For example, referring to FIGS. 2-3, another air filter assembly 200 is shown that may be used in the HVAC system 10 of FIG. 1. The air filter assembly 200 includes a filter element 204 including support elements that are identical to one another on either end of the filter element 204, and so that the filter element 204 is symmetrical across a reference plane that extends along a flow direction 206 (e.g., a lateral direction 219) through the filter element 204, as will be further described. The air filter assembly 200 also includes a filter housing 202, with portions of the filter element 204 and the filter housing 202 together defining a rail-interface system 205 for the air filter assembly 200.

Filter Housing

The filter housing 202 is adapted to support the filter element 204 in a perpendicular orientation relative an flow direction 206 through the filter housing 202, according to an embodiment. The filter housing 202 may be disposed along ductwork of the HVAC system, between a heating and/or cooling element and an inlet air duct that is configured to supply air to the heating and/or cooling element (as shown in FIG. 1). The inlet air duct may be coupled to a vent line that fluidly couples the HVAC system with an environment surrounding the building, and/or a return line that is configured to recirculate air from within the building to the heating and/or cooling element. The heating and/or cooling element may include a furnace, an air conditioner, a dehumidifier, or another piece of air quality and/or conditioning equipment.

In some embodiments (see FIG. 1), the filter housing 202 is directly coupled to an inlet of the heating and/or cooling element of the HVAC system. In other embodiments, the filter housing 202 is disposed in an area of the inlet air duct that is spaced apart from the heating and/or cooling element. In other embodiments, the filter housing 202 may be disposed in another location of the HVAC system, such as at an opening of a vent line for the HVAC system, a return grill location(s) in which air from a space within the building is returned to the HVAC system, or any other location at which a source of clean, filtered air is desired.

Figure 2:
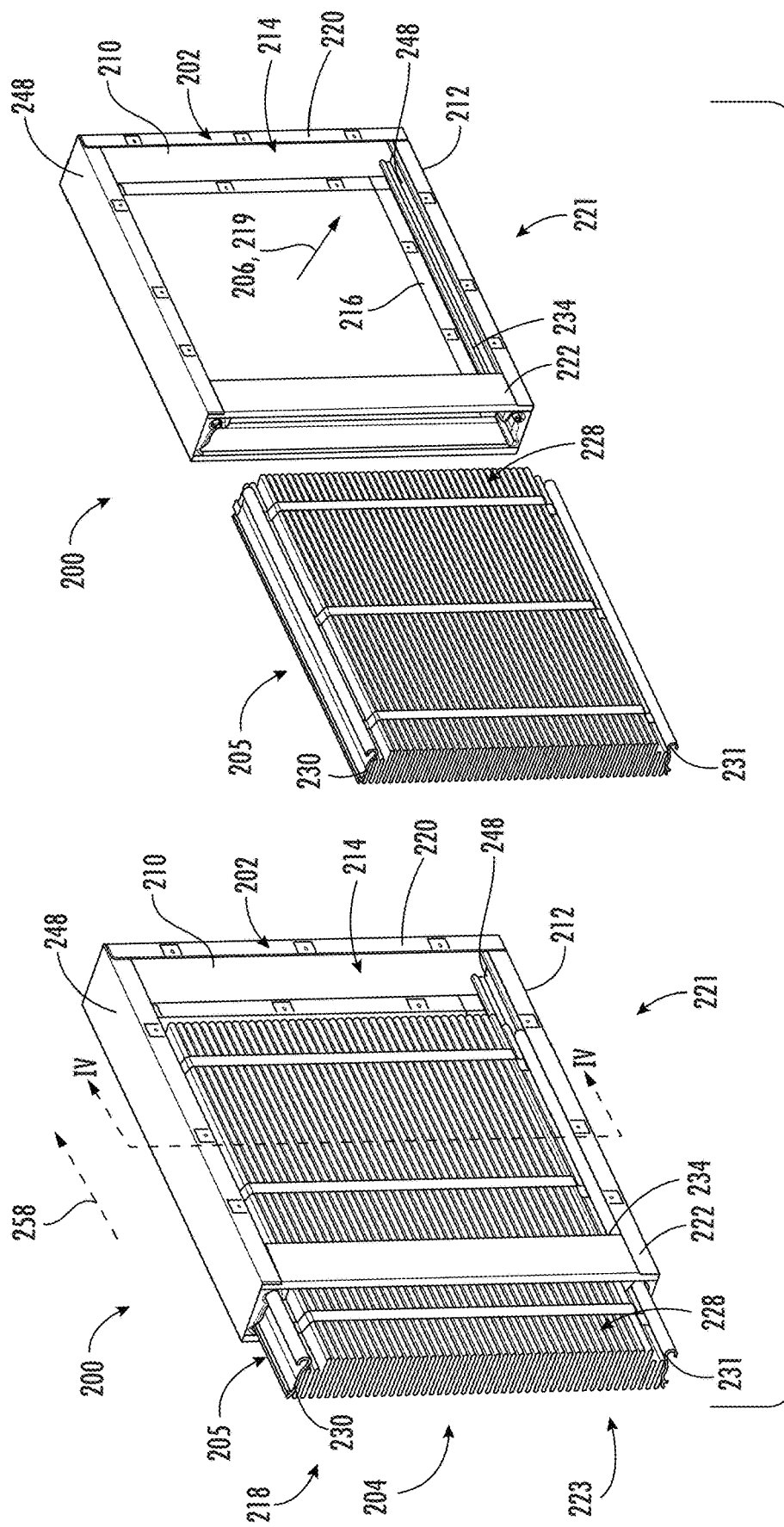
FIG. 2 is a perspective view of an air filter assembly inclusive of a rail system for the air filter assembly, according to an embodiment.

The filter housing 202 is configured to house the filter element 204 therein, and to facilitate installation of the filter element 204 into the filter housing 202, and removal therefrom. In some embodiments, the filter housing 202 includes a frame and a plurality of sidewalls 210 coupled to the frame 208. In other embodiments, the filter housing 202 does not include a frame that is separate from the plurality of sidewalls 210. For example, the sidewalls 210 may be formed and coupled to one another to form the filter housing 202 (e.g., the enclosure, the filter cabinet, etc.). The sidewalls 210 enclose at least three sides of the frame, including a lower side (e.g., a horizontally-oriented side, a floor of the filter housing 202, etc.); an upper side that is spaced vertically apart from, and oriented parallel to, the lower side; and connecting sides (e.g., vertically-oriented sides as shown in FIG. 2) extending between the upper side and the lower side. Together, the frame and/or the plurality of sidewalls 210 form an enclosure 212 (e.g., a cabinet, etc.) that defines an interior cavity 214 sized to receive the filter element 204 therein.

The enclosure 212 further defines a plurality of duct openings, including a first opening 216 (e.g., an inlet opening, etc.) at a first lateral end 218 of the interior cavity 214 along a lateral direction 219 extending substantially parallel to an airflow direction through the filter housing 202, and a second opening 220 (e.g., an outlet opening, etc.) at a second lateral end 221 of the interior cavity 214 opposite the first lateral end 218.

In some embodiments, the first opening 216 is configured to be fluidly coupled to ductwork such as an inlet air duct and the second opening 220 is configured to be fluidly coupled to the heating and/or cooling element of the HVAC system (e.g., a furnace, an air conditioning unit, a humidifier, a dehumidifier, etc.). In other embodiments, the orientation of the first opening 216 and the second opening 220 may be reversed (e.g., the first opening 216 may be arranged as the second opening 220 for the filter assembly, etc.). The frame and/or the plurality of sidewalls 210 also define an access opening 222 at a longitudinal end 223 of the interior cavity 214 along a longitudinal direction 258 (e.g., an insertion direction of the filter element 204 into the filter housing 202, etc.) that is substantially parallel to the lateral direction 219, between the first lateral end 218 and the second lateral end 221, that is configured to receive the filter element 204 therethrough.

Filter Element

Referring to FIGS. 2-3, the filter element 204 includes a filter media pack 228; support elements including a first support element 230 and a second support element 231; and at least one media support element 232 (see FIG. 4) for supporting the filter media pack 228 between the support elements. In other embodiments, the filter element 204 may include additional, fewer, and/or different components.

The filter media pack 228 is coupled to and extends between the first support element 230 and the second support element 231. The filter media pack 228 is formed from a pleated filter media 234. In the embodiment of FIGS. 2-3, the filter media pack 228 includes filter media 234 that is pleated or folded back onto itself in an accordion pattern/shape. The filter media 234 is folded along a first plurality of bend lines 236 and a second plurality of bend lines 238. The first plurality of bend lines 236 together define a first face 240 (e.g., an upstream face, etc.) of the filter media pack 228. The second plurality of bend lines 238 together define a second face 242 (e.g., a downstream face, etc.) of the filter media pack 228 that is downstream of the first face 240. The first plurality of bend lines 236 and the second plurality of bend lines 238 extend linearly along the filter media 234 and are oriented substantially parallel to one another. The second plurality of bend lines 238 is disposed in alternating arrangement with the first plurality of bend lines 236. The first plurality of bend lines 236 and the second plurality of bend lines 238 are spaced in approximately equal intervals across a surface of the filter media 234.

The filter media pack 228 includes substantially linear wall segments of filter media 234 extending between adjacent ones of the first plurality of bend lines 236 and the second plurality of bend lines 238. The plurality of wall segments together define a plurality of channels (e.g., media channels, etc.) that each extend between lateral ends of the filter media 234. The channels define 'U' or 'V' shaped openings at longitudinal ends of the filter media pack 228.

In some embodiments, the filter media pack 228 includes a collapsible extended surface pleated media (CESPM) filter that is reconfigurable between a collapsed position (e.g., a collapsed state, a first position, etc.) in which the pleats of the filter media pack 228 are pressed together (e.g., under the weight of gravity) and/or collapsed onto one another (e.g., in which the first support element and the second support element are spaced apart by a first distance and/or are contacting one another), and an expanded position (e.g., an expanded state, a second position, etc.) in which the filter media pack 228 is pulled apart to increase the average pleat angle between adjacent pleats across the media pack (e.g., in which the first support element and the second support element are separated by a second distance that is greater than in the first distance). that is shipped to an end user in a collapsed state in which the pleats of the filter media 234 are pressed together (e.g., under the weight of gravity, collapsed together, etc.) to reduce the overall package size of the filter element 204. The filter media pack 228 is expanded by a user prior to installation in the filter housing 202. The filter element 204 may be expanded by separating opposing support elements (e.g., by pulling and/or lifting the first support element 230 away from the second support element 231, etc.) to expose channels between pleats of the filter media 234. The filter media 234 may be a fibrous filter media made from a mat of synthetic fibers. In other embodiments, the filter media 234 is made from another filter media material including, but not limited to, synthetic fiber nonwoven sheets, glass fiber non-woven sheets, combined synthetic and glass fiber non-woven sheets, natural fiber nonwoven sheets, or combinations thereof. In other embodiments, the filter media 234 is made from another type of filtration material.

The first support element 230 (e.g., the first frame element, etc.) and the second support element 231 (e.g., the second frame element, etc.) are configured to engage housing rails 248 (e.g., a frame support, etc.) along the filter housing 202 to support the filter media pack 228 in an expanded position within the filter housing 202. In the embodiment of FIGS. 2-3, the first support element 230 and the second support element 231 are endplates (e.g., endcaps, etc.) that are engaged with and coupled to opposing ends of the filter media pack 228. In some embodiments, the first support element 230 is bonded to the filter media pack 228, to an end pleat 244 of the filter media pack 228 at a first axial end of the filter media pack 228 (e.g., along an axial direction 225 that is perpendicular to both the lateral direction 219 and the longitudinal direction 258) using glue, epoxy, or another adhesive product. In other embodiments, the first support element 230 is mechanically fastened (e.g., stapled, etc.) to the filter media pack 228 or directly coupled to the filter media pack 228 such a by ultrasonic welding. In other embodiments, the first support element 230 is a rail interface member formed separately from the filter element 204 that is configured to couple the filter element 204 to the housing rail 248. For example, the first support element 230 may include (e.g., define) an endplate adapter (e.g., endplate rail guides, a clip member, etc.) that is engageable with a separate endplate/endcap of the filter element 204 on a first end, and the housing rail 248 on a second end.

The second support element 231 is coupled to a second axial end of the filter media pack 228 opposite the first axial end. In some embodiments, the second support element 231 is bonded or otherwise mechanically fastened to a second end pleat 245 of the filter media pack 228 that is disposed on and/or defines a second axial end of the filter media pack 228. In the embodiment of FIGS. 2-3, the second support element 231 has the same design as the first support element 230, and is arranged so that the filter element 204 has mirror symmetry along a reference plane extending through the filter element 204 in the lateral direction 219. Such an arrangement can increase the performance of the air filter assembly 200 by angling or otherwise opening the end pleats at either end of the filter element 204 to airflow therethrough, thereby reducing pressure drop and the effective media area of the filter media pack 228. Such an arrangement can also simplify manufacturing of the filter element 204. In other embodiments, the design of the first support element 230 and the second support element 231 are different.

Referring to FIG. 4, the media support element(s) 232 are configured to prevent over-expansion of the filter element 204 (e.g., the filter media pack 228) and to maintain uniform pleat spacing along the filter media pack 228 (between the first support element 230 and the second support element 231) so that the distance between the bend lines of adjacent pleats are approximately equal to one another across the entire axial length of the filter media pack 228. In other embodiments, the pleat spacing at the axial ends of the filter media pack 228 may be different from the average pleat spacing across the filter media pack 228, or than the pleat spacing along an intermediate axial portion of the filter media pack 228 between opposing ends of the filter media pack 228.

The filter element 204 includes a plurality of media support elements 232. In some embodiments, the filter element 204 includes two diametrically opposed pairs of media support elements 232 extending across the first face 240 and the second face 242. The media support elements 232 may be bonded, woven, or otherwise coupled to the filter media pack 228 at pleat tips of the filter media pack 228, such as at locations along the first plurality of bend lines 236 across the first face 240 and the second plurality of bend lines 238 across the second face 242.

In some embodiments, the media support elements 232 are also coupled to the support element(s). For example, the media support elements 232 may be sandwiched or otherwise disposed in between the support element(s) and the end pleat of the filter media pack at each axial end of the filter media pack 228. In such embodiments, at least a portion of the media support elements 232 may be bonded to the end pleats of the filter media pack 228.

In some embodiments, the media support elements 232 are configured to limit rotation of the support element(s) relative to a flow direction through the filter media pack 228. For example, the media support elements 232 may limit an angle 229 (see also FIG. 5) defined by the end pleat 244 (e.g., between the support element and a horizontal reference plane parallel to an air flow direction through the filter element, between the end pleat and the next adjacent pleat when viewed along the longitudinal direction 258) in the fully expanded position to approximately the same as the average pleat angle, approximately two times the average pleat angle, three times the average pleat angle, or another multiple of the average pleat angle. In other embodiments, the angle 229 may be less than the average pleat angle across the filter media pack 228, any other value that is different from the average pleat angle across the filter media pack 228 (e.g., a pleat angle in a central region of the filter media pack 228 between opposing ends of the filter media pack 228).

In the embodiment of FIG. 4, a first axial length 247 of a first media support element 232a extending axially across the first face 240 (e.g., an inlet face, etc.), between the first support element 230 and the second support element 231, is greater than a second axial length 251 of a second media support element 232b extending across the second face 242. In such an arrangement, the second support element 231 limits expansion of the filter media pack 228 to a height along the second face 242 (e.g., a height between the support elements, etc.) that is less than a height along the first face 240. Such an arrangement opens the end pleats for flow therethrough when the filter element 204 is installed within the filter housing 202, which can increase filtration performance by increasing the effective area of the filter media pack 228 available for flow. In embodiments in which the filter media pack 228 includes chamfered ends, the overall length of the first media support element 232a, from the first support element 230 to the second support element 231, may be less than the overall length of the second media support element 232b (e.g., due to the additional length of the second media support element 232b across the chamfer, etc.). Including chamfered regions of filter media at each axial end of the filter media pack 228 (e.g., chamfered regions having lower pleat depth than the average pleat depth across the filter media pack 228) can increase performance by reducing the amount of media in regions of lower flow velocity through the air filter assembly 200.

In the embodiment of FIG. 4 as described above, the support elements limit expansion of the filter element 204 so that a first axial height of the filter element 204 across the first face 240 (e.g., on an upstream side of the filter element 204, etc.), between the first support element 230 and the second support element 231, is greater than a second axial height of the filter element 204 across the second face 242 (e.g., on a downstream side of the filter element 204, etc.), when installed into the filter housing 202, and/or when both the first media support element 232a and the second media support element 232b are fully extended (e.g., such that the first media support element 232a and the second media support element 232b limit further separation of the first support element 230 from the second support element 231).

Figure 5:
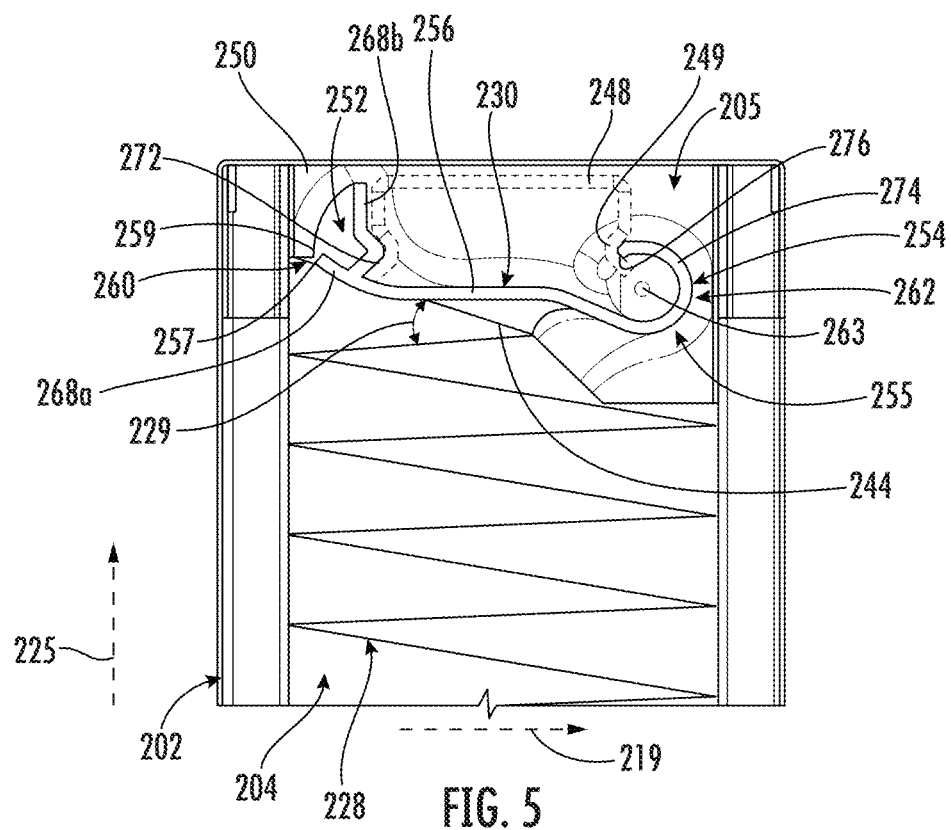
FIG. 5 is a front view of the rail system for the air filter assembly of FIG. 2.

Referring to FIG. 5, in embodiments in which the pleat depth approaching the axial end of the filter media pack 228 is less than an average pleat depth across the filter media pack 228, a leading edge 257 of the first end pleat 244 may be substantially aligned with a lateral edge 259 of the first support element 230 and may extend in a substantially lateral direction 219 from the lateral edge 259 to an intermediate location between opposing ends of the first support element 230 (e.g., approximately half way between opposing ends, less than or equal to 90% of the overall width of the first support element 230 along the lateral direction 219, etc.). Such arrangements can simplify manufacturing, as will be further described, and can increase the angle 229 defined by the end pleat 244 (e.g., the angle 229 between the end pleat 244 and the next adjacent pleat, the angle between the end pleat 244 and a reference plane extending parallel to the lateral direction 219, etc.) in certain arrangements. Engaging the end pleat 244 with only a portion of the first support element 230 between lateral ends of the first support element 230 can also ensure that the end pleat 244 does not close/collapse on itself in a corner region near a bend line of the end pleat 244. Such an arrangement can also reduce the amount of filter media at an axial end of the filter media pack 228, which can improve utilization of the filter media pack 228 by reducing the amount of filter media in areas of lower air velocity across the filter element 204. In other embodiments, the alignment between the end pleat 244 of the filter media pack 228 and the first support element 230 may be different. It should be understood that a similar arrangement may be used to secure the second end pleat 245 to the second support element 231 (see FIG. 3). In other embodiments, a different coupling arrangement may be used to secure the filter media pack 228 to the first support element 230 and/or the second support element 231 to the filter media pack 228.

Rail System

Referring to FIGS. 2-4 and FIGS. 5-6, the support element(s) of the filter element 204 may form part of a rail-interface system 205 that is configured to facilitate installation of the filter element 204 into the filter housing 202, and removal therefrom. Referring to FIG. 5, the rail-interface system 205 includes the first support element 230, a housing rail 248 (e.g., a rail member, etc.), and a rail guide 250. It should be appreciated that the rail system 246 may include similar elements on an opposite axial end of the air cleaner assembly to secure the second support element 231 to the filter housing 202 (see FIG. 3). In other embodiments, the design of the rail system 246 for supporting the first support element 230 and/or the second support element 231 may be different.

The first support element 230 is configured to slidably engage the housing rail 248 to support the filter media pack 228 in an expanded position within the filter housing 202. The first support element 230 includes a pair of interface members, shown as first interface member 252 and second interface member 254, and a connecting member 256.

The interface members (e.g., interface elements, interface bodies, etc.) are configured to facilitate handling of the filter element 204 and installation of (e.g., alignment between, etc.) the filter element 204 into the filter housing 202. The first interface member 252 and the second interface member 254 are engageable with complementary receiving structures 249 of the housing rail 248 to support the first support element 230 on the housing rail 248.

Referring to FIG. 5, the first interface member 252 extends along a longitudinal direction 258 (see also FIG. 2) that is perpendicular to the lateral direction 219 (e.g., that is perpendicular to the flow direction 206) through the filter housing 202. The first interface member 252 defines a first lateral end 260 (e.g., a first lateral edge, etc.) of the first support element 230. In at least one embodiment, the first interface member 252 extends along an entire length of the first support element 230, from a first longitudinal end of the first support element 230 to a second longitudinal end of the first support element 230.

The second interface member 254 is spaced laterally apart from the first interface member 252 and extends parallel to the first interface member 252. The second interface member 254 defines a second lateral end 262 (e.g., a second lateral edge, a free end, a free edge, etc.) of the first support element 230 that is opposite the first lateral end 260. In at least one embodiment, the second interface member 254 extends along an entire length of the first support element 230, from a first longitudinal end of the first support element 230 to a second longitudinal end of the first support element 230.

As used herein, "interface member" refers to a broad class of structures that are engageable with the housing rail 248 to support the first support element 230 at least partially within the housing rail 248. In some embodiments, the interface members are protuberances that extend along opposing lateral ends of the first support element 230. For example, at least one interface member may include a rounded head or bulb extending along the first lateral end 260 of the first support element 230. In other embodiments, the interface members may include slots, notches, indents, recessed areas, and/or channels extending along the lateral ends of the first support element 230. In yet other embodiments, the interface member includes an outer edge or ledge defined by the first support element 230 that is configured to engage the housing rail 248.

In some embodiments, at least one of the interface members includes at least a portion of a curved (e.g., a cylindrical, etc.) protrusion that extends along the lateral end. The curved protrusion may have a smooth/continuous curved side surface. In other embodiments, the interface members may include shapes that approximate a cylindrical protrusion such as an octagon having at least one planar side surface. In other embodiments, the interface member may include a differently shaped protrusion, protuberance, and/or prism, such as an elliptical protrusion having curved side surfaces, a triangular protrusion, a rectangular protrusion, or another polygonal prism having curved or uncurved edges that extend along the longitudinal direction 258. In still further embodiments, at least one of the interface members includes multiple protrusions that are contiguous with one another (e.g., two cylindrical protrusions that are stacked together, etc.).

The protrusions of the first support element 230 provide an ergonomic grip on a respective one of the lateral ends of the first support element 230, which can facilitate manual manipulation and handling of the filter element 204 by a user or technician. The protrusions can also simplify alignment between the first support element 230 and the housing rail 248 by providing a visually perceptible reference on each side of the first support element 230 that is easier to visually track and maintain in alignment with corresponding structures on the filter housing 202 during insertion/installation. The larger surface area of the protrusions can also improve sealing between the filter element 204 and the filter housing 202 by increasing a length of the passage formed between the lateral ends of the first support element 230 and the filter housing 202 (e.g., the housing rail 248).

In the embodiment of FIG. 5, the first interface member 252 extends from the connecting member 256 and includes at least a portion of at least one of plurality of legs 268 (e.g., a plurality of (elongated) extensions, a plurality of fingers, etc.) extending away from the connecting member 256 along the lateral direction 219 and/or the axial direction 225. As used herein, "leg" may refer to any extension element or protrusion that extends away from the connecting member 256. In some embodiments, "leg" refers to an elongated extension such as an elongated wall or panel.

Figure 6:
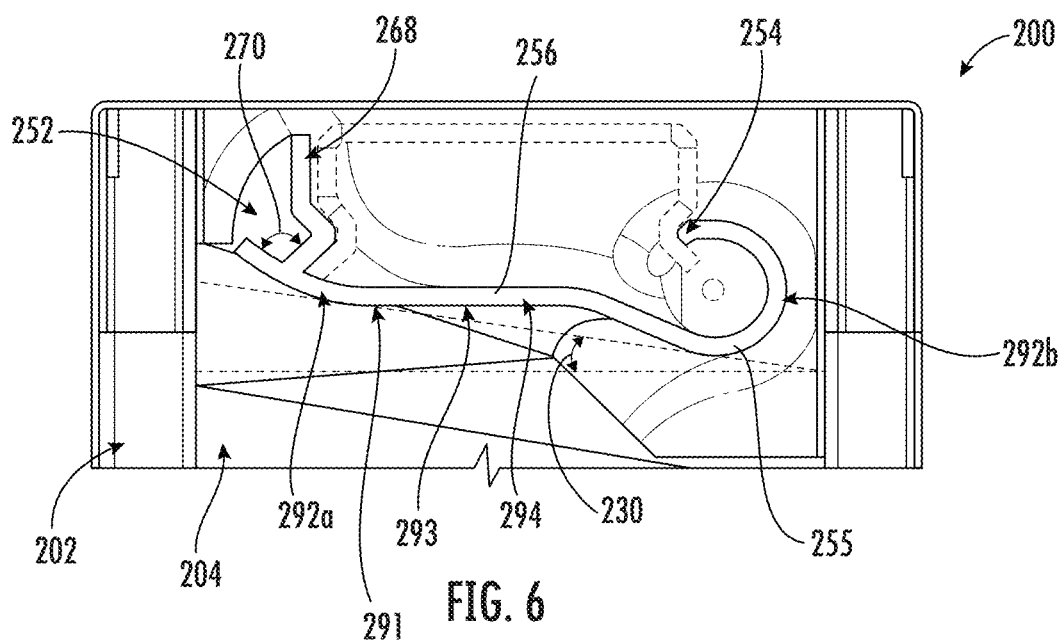
FIG. 6 is a front cross-sectional view of the rail system for the air filter assembly of FIG. 2 at a housing rail of the filter housing.

A first leg 268a of the plurality of legs 268 extends tangent to the connecting member 256 and forms a forms part of a first undulating surface on the media-facing side of the first support element 230. A second leg 268b of the plurality of legs 268 extends substantially axially away from the connecting member 256, so that the second leg 268b is oriented substantially perpendicular to the connecting member 256. In some embodiments, the second leg extends at an angle away from a second undulating surface on a non-media-facing side of the connecting member 256 opposite from the media facing side. In some embodiments, the second leg 268b defines a first support ledge 272 of the first support element 230 that is configured to engage a respective one of a pair of complementary receiving structures (e.g., rails) in filter housing 202. In such embodiments, the first leg 268a may define a portion of the connecting member 256, and the second leg 268b defines the first interface member 252. In other embodiments, only the portion of the second leg 268b that engages the housing rail is considered as being part of the first interface member 252. In some embodiments, a thickness of each of the legs 268 is approximately equal to a thickness of the connecting member 256. Referring to FIG. 6, in some embodiments, the plurality of legs 268 includes a pair of legs extending at leg angle 270 relative to one another.

Referring again to FIG. 5, the second interface member 254 is disposed at a distal end (e.g., an outer end, a free end, etc.) of the connecting member 256. The second interface member 254 is disposed on an opposite end of the connecting member 256 (e.g., an opposite lateral end, etc.) as the first interface member 252. In the embodiment of FIG. 5, the second interface member 254 includes at least a portion of a curved wall 274 that curves back over itself about a central axis 263 extending parallel to the longitudinal direction 258 (see FIG. 2). In some embodiments, the curved wall 274 defines a substantially spiral shape. In the embodiment of FIG. 5, the curved wall 274 has a circular shape or circular curvature (e.g., a circular arc, etc.).

In some embodiments, the curved wall 274 is folded (e.g., rolled, etc.) back over itself and toward the first interface member 252 along the lateral direction 219 so that a lateral end (e.g., a free end, etc.) of the curved wall 274 is disposed above (a central portion of) the connecting member 256 (and between overall lateral ends of the support element 230), and/or so that a second support ledge 276 at a distal end of the connecting member 256 is disposed over (a central portion of) the connecting member 256. In such embodiments, the connecting member 256 passes beneath the second support ledge 276. The curved wall 274 is configured to engage a complementary receiving structure in the housing (e.g., a housing rail, a rail guide, etc.) and to slidably engage the complementary receiving structure to support the filter element in an expanded position within the filter housing 202. In some embodiments, the curved wall 274 is configured to circumscribe (e.g., surround, encompass, etc.) at least a portion of the complementary receiving structure, which can increase the strength of the connection between the support member and the filter housing 202 and can reduce the force required to slide the filter element into and out of the filter housing 202.

The curved wall 274 has an approximately constant radius of curvature, which enables use of the curved wall 274 as part of an alignment feature to facilitate installation of the support element 230 into the filter housing, as will be further described. In other embodiments, the shape of the second interface member 254 may be different (e.g., the curved wall 274 may form an elliptical shape, an oval, etc.). In some embodiments, the curved wall 274 has approximately the same thickness as the connecting member 256, and/or each one of the plurality of legs 268, which can improve manufacturability, and reduce the risk of deformation due to shrinkage when formed from a plastic material.

In the embodiment of FIG. 5, the curved wall 274 (e.g., a portion of the curved wall that defines the second interface member 254, etc.) defines a second support ledge 276 extending along an entire length of the second interface member 254 in the longitudinal direction 258 parallel to the first support ledge 272. The second support ledge 276 is spaced apart from the connecting member 256 along the axial direction 225 and is configured to engage a respective one of a pair of complementary receiving structures (e.g., rails) in filter housing 202 opposite from the first support ledge 272. In such an embodiment, the second interface member 254 may only be the portion of the curved wall 274 that defines the second support ledge 276 (with the remainder of the curved wall forming part of the connecting member 256). In other embodiments, the second interface member 254 includes a greater portion of the curved wall 274, such as a portion of the curved wall 274 that at least partially circumscribes a complementary receiving structure in the filter housing 202.

Among other benefits, such an arrangement of the first interface member 252 and the second interface member 254 as described with respect to FIG. 5 enables the use of a single support element and housing rail 248 design to support different flow directions through the filter housing 202, while maintaining the end pleat 244 at a positive angle relative to the airflow direction through the filter media pack 228, as will be further described.

Referring to FIG. 6, the connecting member 256 is engaged with both the first interface member 252 and the second interface member 254 and extends from the first interface member 252 to the second interface member 254 (e.g., in a substantially lateral direction across the end pleat 244). In the embodiment of FIG. 6, the connecting member 256 includes at least a portion of the curved wall 274 that curves back over itself about a central axis extending parallel to the longitudinal direction 258. In some embodiments, the connecting member 256 is a continuously curved (e.g., undulating, etc.) wall. In other embodiments, the connecting member 256 may have curved and planar portions, or only planar portions (e.g., planar portion that are oriented at an angle when installed into the filter housing 202, etc.), as will be further described with reference to other embodiments herein.

The connecting member 256 engages both the first interface member 252 and the second interface member 254, and couples the first interface member 252 to the second interface member 254. The connecting member 256 defines at least a portion of an angled and/or curved surface (e.g., an undulating surface, etc.) on a media-facing side (e.g., a lower side as shown in FIG. 6) of the connecting member 256. The connecting member 256 extends from the first interface member 252, on an inner lateral side of the first interface member 252, to an inner lateral side of the second interface member 254 (where "inner" is in reference to the outer lateral ends and/or free ends of the support element, etc.).

In at least one embodiment, the connecting member 256 is configured to reduce pressure drop across the air filter assembly 200. In some embodiments, the connecting member 256 includes a concave portion (e.g., a concave extension, a concave wall, etc.) extending from the inner lateral side of the first interface member 252 and toward the second interface member 254. The connecting member 256 also includes a convex portion 294 (e.g., a convex extension, a convex wall, etc.) extending between the concave portion and an inner lateral side of the second interface member 254. In the embodiment of FIG. 6, the connecting member 256 includes a plurality of concave portions, shown as a first concave portion 292a extending from the first interface member 252, and a second concave portion 292b extending from the second interface member 254 and between the second interface member 254 and the convex portion 294. In some embodiments, the curved wall 274 defines at least a portion of the second concave portion 292b that curves back toward the second interface member 254. In such embodiments, the curved wall 274 may define at least a portion (e.g., a lateral end portion, etc.) of an undulating surface on a media-facing side of the connecting member 256. In some embodiments, the curved wall 274 also defines (e.g., circumscribes, etc.) a cylindrically shaped volume that is configured to nestably receive a complementary receiving structure of the filter housing 202 therein (e.g., to receive a cylindrical protrusion 273 of a guide block 253 therein, as will be further described).

Together, the concave portion(s) and the convex portion 294 define an undulating wall or panel between the first interface member 252 and the second interface member 254. In other embodiments, the concave portions and the convex portion 294 may be reversed. In some embodiments, the concave portion(s) and/or the convex portion 294 define at least part of a curved surface 291 on a media-facing side 293 and/or a non-media facing side of the support element 230. For example, the concave portion(s) may define a first curved portion and/or a second curved portion, while the convex portion defines a third curved portion, etc. Such an arrangement provides a smooth transition along an upper wall (e.g., the support element) at the filter element 204 to airflow passing therethrough and can reduce flow separation along the upper wall. The concave portion(s) and/or the convex portion 294 may also define at least part of a curved surface on a non-media facing side (e.g., a housing facing side that faces toward the filter housing 202, etc.) of the support element 230, which can ensure approximately uniform wall thickness across at least a portion of the connecting member 256.

In some embodiments, the concave portion(s) and the convex portion 294 together at least partially define an undulating surface on a media-facing side 293 of the support element 230, which can help guide the flow entering the filter housing through the end pleat, thereby increasing the utilization of filter media across the filter element 204. In some embodiments, the concave portion(s) and/or the convex portion 294 extend into the first interface member 252 and/or the second interface member 254, respectively, which can provide a smoother flow transition across the entire width of the support element 230. It should be understood that the number of concave portions and convex portions defined by the support element 230 and defining the curved surface 291 on the media-facing side 293 of the support element 230 (and/or the non-media facing side) may be different in various embodiments.

In other embodiments, the connecting member 256 may include only one of the concave portion(s) or the convex portion 294. For example, the connecting member 256 may include a curve of approximately constant radius between opposing lateral ends of the connecting member 256, a curve of continuously or semi-continuously varying radius, etc. In other embodiments, the connecting member 256 may include uncurved portions (e.g., linear/planar portions), alone or in combination with curved portions. For example, the connecting member 256 may include two, three, four, or more planar portions that extend in an at least partially lateral direction (e.g., in stepwise fashion, etc.) between the first interface member 252 and the second interface member 254. In other embodiments, the at least one uncurved portion may extend from the concave portion and/or the convex portion 294.

In some embodiments, the concave portion 292 and the convex portion 294 are walls (e.g., a concave wall and a convex wall, respectively) that extend parallel to one another in two different locations along the connecting member 256. In the embodiment of FIG. 6, at least a portion of the first concave portion 292a and the convex portion 294 extend parallel to one another (e.g., adjacent to lateral ends of the connecting member 256, at a location where the concave portion 292a engages or transitions into the first interface member 252 and where the convex portion 294 engages or transitions into the second interface member 254 and/or the second concave portion 292b, etc.).

Referring still to FIG. 6, in some embodiments, at least a portion of the first interface member 252 is positioned vertically above the second interface member 254 when lateral end portions of the connecting member 256 are oriented parallel to a horizontal reference plane extending through the connecting member 256. The filter housing 202 (e.g., the housing rail 248) maintains the support element in an angled orientation such that a first end of the support element at an upstream end of the support element is above a second end of the support element at a downstream end of the support element. The orientation and shape of the connecting member 256 supports the end pleat 244 of the filter media pack 228 in an open orientation after installation into the filter housing 202.

In the embodiment of FIG. 6, a radius of curvature of the first concave portion 292a and/or the second concave portion 292b is approximately equal to a radius of curvature of the convex portion 294 (e.g., by within (+) or (−) 10%, 5%, or 1% of one another). In such an arrangement, the first concave portion 292a and/or the second concave portion 292b may be tangent to the convex portion 294 at a location at which the first concave portion 292a and/or the second concave portion 292b engages the convex portion 294. It should be appreciated that the radius of curvature of one or more portions of the first support element 230 may be different in various embodiments. The combination of the concave portion(s) and the convex portion 294 that is tangent to the concave portion(s) can reduce flow separation along an upper wall of the enclosure 212, which can reduce pressure drop across the air filter assembly 200.

Figure 7:
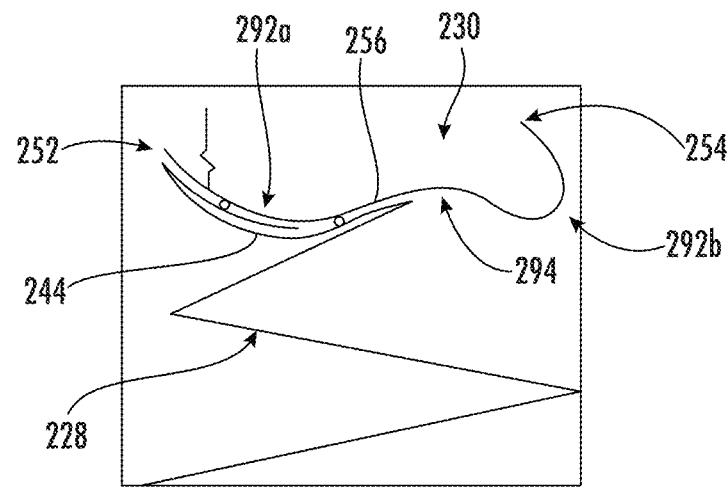
FIG. 7 is a front view of the rail system for the air filter assembly of FIG. 2 near a rail guide for the rail system.

Referring to FIG. 7, the filter media pack 228 extends across the connecting member 256 between the first interface member 252 and the second interface member 254. In at least some embodiments, the end pleat 244 is bonded (e.g., adhered, glued, or otherwise secured in engagement) to the surface of the connecting member 256, which may be bent or otherwise formed into the same shape as the connecting member 256, or a portion thereof. In some embodiments, at least a portion of the filter media pack 228 (e.g., the end pleat 244, etc.) extends across an entire length of the connecting member 256 in the longitudinal direction. In such embodiments, the portion may extend past at least one end of the support element 230 (e.g., the connecting member 256, etc.), and may be configured to engage an end wall of the filter housing 202 to provide sealing in the axial direction along the longitudinal end(s) of the filter housing 202.

In some embodiments, the connecting member 256 also includes a planar portion (e.g., a planar extension, a planar wall, a planar panel, etc.) extending from the first concave portion 292a (and/or the second concave portion 292b) to the convex portion 294. In some embodiments, the filter media is bonded to the planar portion, which can increase the structural integrity of the connection between the filter media pack and the connecting member 256 in certain applications.

In at least one embodiment, such as where the interface members are formed as protrusions, a thickness of the connecting member 256 is less than an overall width/thickness of at least one of the interface members, such that an overall width of the first support element 230 along the axial direction 225 increases moving from a central portion of the first support element 230 toward at least one lateral end of the first support element 230.

In at least one embodiment, the first interface member 252, the second interface member 254, and the connecting member 256 are integrally formed as a monolithic body from a single piece of material. For example, the first support element 230 may be formed from plastic (e.g., polypropylene, nylon, glass-filed nylon, etc.) via an injection molding operation. The uniform cross-sectional shape of the first support element 230 (between opposing longitudinal ends of the first support element 230) also enables forming of the first support element 230 using an extrusion operation. Other materials may be used in various embodiments.

Figure 8:
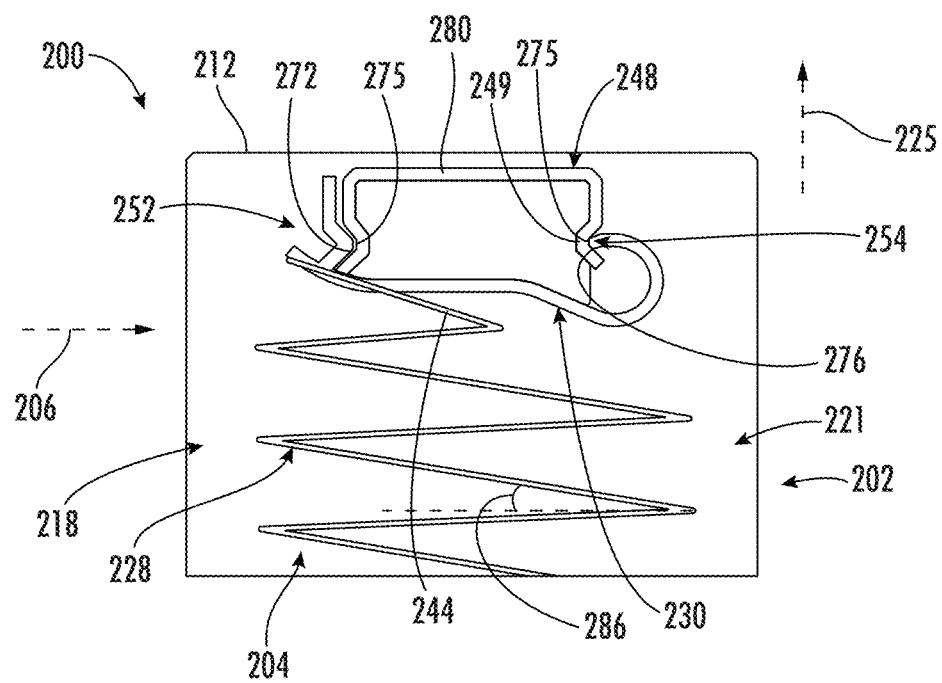
FIG. 8 is a front view of an air filter for use with the air filter assembly of FIG. 2, according to an embodiment.

Referring to FIG. 8, the housing rail 248 is coupled (e.g., welded, fastened, bonded, etc.) to the enclosure 212, to an upper sidewall of the enclosure 212 and extends in a longitudinal direction between the access opening 222 (see FIG. 2) and an opposing longitudinal end of the enclosure 212. The housing rail 248 includes complementary receiving structures 249 (e.g., rail members, rail legs, etc.) that are configured to engage the interface members of the filter element to support the filter element in an expanded position within the filter housing 202.

In some embodiments, at least one of the complementary receiving structures 249 is a track member that defines a track configured to slidably engage a respective one of the first interface member 252 or the second interface member 254. In some embodiments, each track defines multiple receiving ledges that are configured to slidably engage a respective one of the first support ledge 272 or the second support ledge 276. In the embodiment of FIG. 8, each track includes a first receiving ledge defining a first channel facing in the lateral direction 219 toward the opposite track, and a second receiving ledge defining a second channel facing in the lateral direction 219 away from the opposite track. In some embodiments, the second receiving edge is formed by an extension (e.g., a planar wall section, etc.) that extends laterally away from the first receiving ledge, so that the second receiving ledge is disposed farther away from a base 280 (e.g., a base wall, etc.) of the housing rail 248 that connects the tracks to one another and to the filter housing.

In the embodiment of FIG. 8, the tracks are each disposed an equal distance from the base 280 of the housing rail 248. Such an arrangement simplifies manufacturability by enabling installation of the housing rail 248 into the filter housing 202 with either track along the upstream side of the filter housing 202. In some embodiments, the pair of tracks are symmetric about a reference plane that extends between the pair of tracks.

In the embodiment of FIG. 8, the first interface member 252 and the second interface member 254 are structured so that the second support ledge 276 is positioned below the first support ledge 272 along the axial direction 225 when the first support element 230 is installed within the housing rail 248. Such an arrangement enables the use of the same first support element 230 design to ensure proper alignment of the filter element 204 with respect to the flow direction through the filter housing 202, which can be reconfigured based on application requirements by modifying the position of the rail guide 250 (see FIG. 5) with respect to the filter housing 202. For example, to change the orientation of the filter element 204 with respect to the filter housing 202 in FIG. 8, a technician may insert the same rail guide 250 from an opposing longitudinal end of the housing than shown in FIG. 8. Such a design improves modularity of the rail system 246 by eliminating the need for application-specific components that differ depending on the flow path through the filter housing 202. In other embodiments, the rail guide 250 may be permanently affixed to the filter housing 202 before or during installation, which can simplify installation operations, and prevent tampering by an end-user that could cause issues with sealing performance and/or filtration efficiency.

The receiving structures 249 and/or the base 280 may be made from metal or another strong and lightweight material that is welded, fastened, or otherwise coupled to the enclosure 212. The complementary receiving structures 249 (e.g., tracks, etc.) define a pair of channel openings 275 spaced laterally apart from one another. Each one of the pair of channel openings 275 is configured to receive at least a portion of a respective one of the first interface member 252 and the second interface member 254 therein.

The rail system 246 is configured to support the filter media pack 228 within the filter housing 202. In some embodiments, the housing rail 248 is configured to support the first support element 230 at an angle 233 relative to the flow direction 206 through the air filter assembly 200. In some embodiments, the angle 233 is an oblique angle relative to the flow direction 206 such that the first height (see first axial length 247 in FIG. 4) of the filter element 204 at the first lateral end 218 of the filter element 204 (e.g., the first lateral end of the first support element 230 as shown in FIG. 4) is greater than a second height (see second axial length 251 in FIG. 4) of the filter element 204 at the second lateral end 221 (e.g., the second lateral end of the first support element 230 as shown in FIG. 4). In some embodiments, the angle 233 is greater than or equal to an average pleat angle 286 of individual pleats in the filter media pack 228 relative to a reference plane extending parallel to the flow direction 206.

The angled orientation of the first support element 230 increases pleat spacing proximate to the end pleat 244 so that an area (e.g., a flow area perpendicular to the lateral direction 219, etc.) of the first face 240 of the filter media pack 228 is greater than an area of the second face 242 of the filter media pack 228 (see FIG. 4). Increasing the filter media area near the end pleat 244 can increase the effective media area exposed to air flow within the filter housing 202 (e.g., along the cross-section shown in FIG. 8), thereby reducing restriction along an upper wall of the filter housing 202, which can increase the overall performance of the air filter assembly 200.

Figure 9:
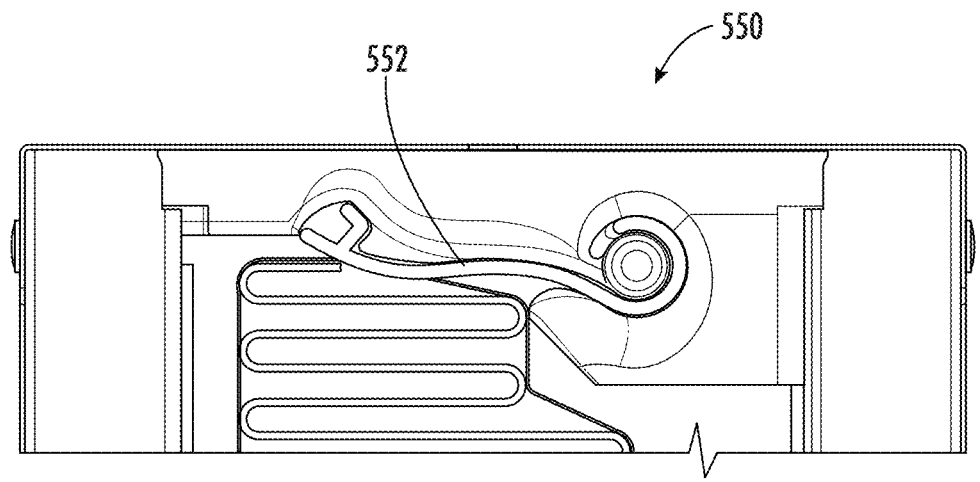
FIG. 9 is a front view of an air filter assembly inclusive of another rail system, according to an embodiment.
Figure 10:
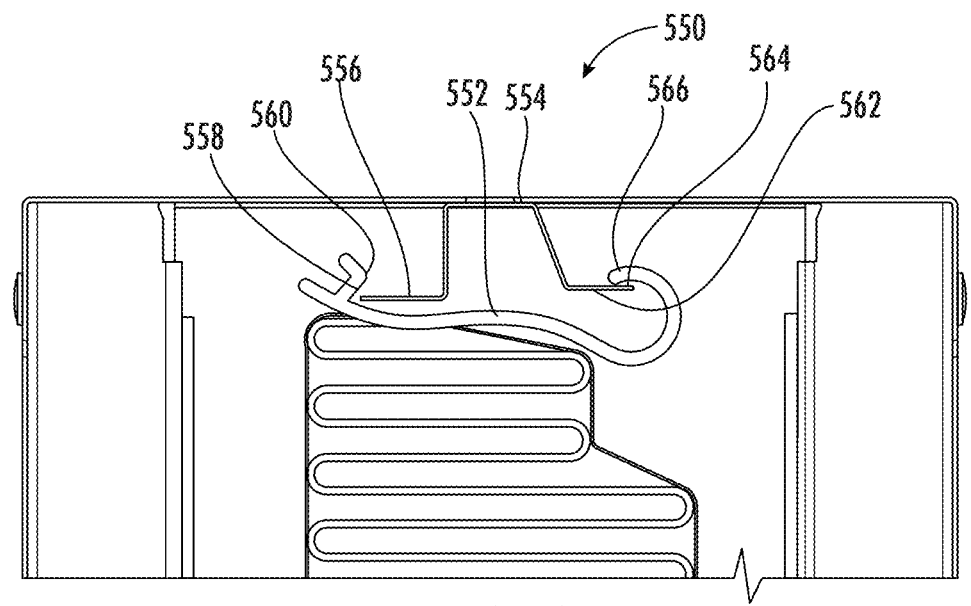
FIG. 10 is a front cross-sectional view of the rail system of the air filter assembly of FIG. 9.

The design and arrangement of the housing rail 248 may be different in various embodiments. For example, referring to FIGS. 9-10, a rail-interface system 550 is shown in which the housing rail 248 has an angled track design, according to an embodiment. The rail-interface system 550 includes a support element 552 and a housing rail 554. The housing rail 554 includes complementary receiving structures, shown as a first track 556 and a second track 562. In the embodiment of FIG. 10, the first track 556 and the second track 562 are planar walls that extend away from one another in opposing lateral directions. The first track 556 and the second track 562 also define a first ledge 558 and a second ledge 564, respectively, that are configured to engage interface members of the support element 552. The first ledge 558 engages a first interface member 560 of the support element 552, and the second ledge 564 engages a second interface member 566 of the support element 552.

In some embodiments, the housing rail 554 also includes ledge supports (e.g., track supports, etc.) that connect the first track 556 and the second track 562 with a base wall of the housing rail 554 (e.g., a base wall that connects the housing rail 554 to the filter housing, etc.). In some embodiments, at least one of the ledge supports is angled away from the other ledge support so that a spacing between the ledge supports increases along the axial direction (e.g., increases moving away from the filter housing). Such an arrangement can prevent the use of non-genuine filter elements in the filter housing, by reducing the number of surfaces that a non-genuine filter element could latch onto. In some embodiments, the ledge supports have different lengths to support the first track 556 and the second track 562 at different heights along an axial direction, which can help to support the support element at an angle within the filter housing.

Rail Guide

Referring to FIGS. 11-14, the rail-interface system 205 (as shown in FIG. 5) also includes a rail guide 250 (e.g., an alignment element, etc.) that is configured to simplify the process of aligning the first support element with the housing rail, and to prevent installation of non-genuine filter elements. The rail guide 250 includes a guide block 253 (e.g., a guide body, etc.), a plurality of guide elements 261, and an extension flange 296. In other embodiments, the rail guide 250 includes additional, fewer, and/or different elements.

The rail guide 250 (e.g., alignment element, alignment block, installation guide, etc.) is configured to simplify installation of the first support element into the housing rail 248. The rail guide 250 (e.g., the guide block 253, etc.) may be welded, fastened, or otherwise coupled to an enclosure 212 (see FIG. 2) of the filter housing 202 proximate to the access opening 222. In other embodiments, the rail guide 250 is directly coupled to the housing rail. In some embodiments, the rail guide 250 defines a portion of the access opening 222.

In at least one embodiment, the rail guide 250 is formed as a separate piece from the housing rail 248 and/or the enclosure and is removably coupled to the enclosure. Such an arrangement can enable retrofit of the filter housing to accommodate different rail guide designs. In other embodiments, the rail guide 250 is permanently affixed to the filter housing.

The rail guide 250 provides a gradual transition extending from the housing rail to the access opening. The rail guide 250 guides the first support element (e.g., the first interface member 252 and the second interface member 254 as shown in FIG. 5) into the housing rail and into channel openings of the housing rail. In some embodiments, the rail guide 250 extends below the housing rail and into the interior cavity of the enclosure, which can prevent the use of filter elements that do not include a complementary support element by blocking a portion of the access opening of the air filter housing.

Figure 11:
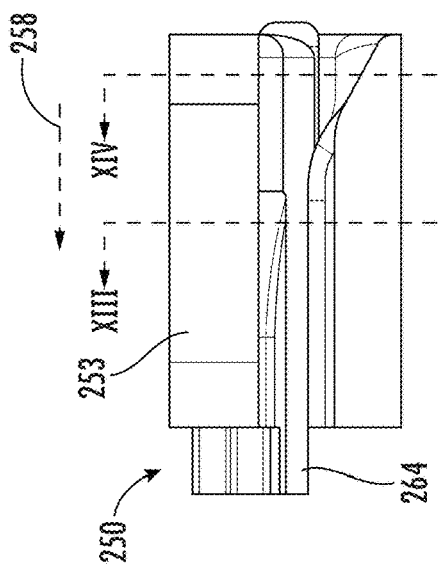
FIG. 11 is a side view of the rail guide of FIG. 7.
Figure 12:
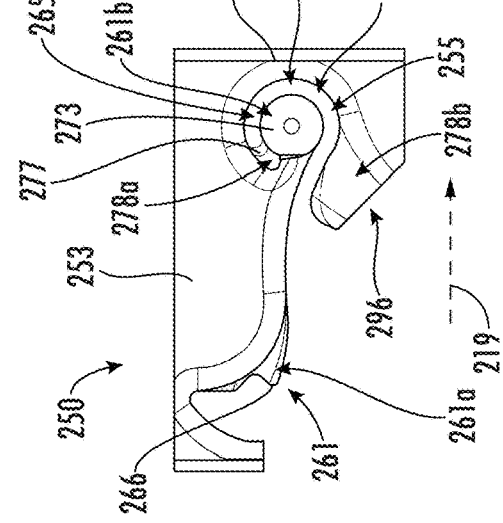
FIG. 12 is a front view of the rail guide of FIG. 7 showing an entry region of a rotational alignment member of the rail guide.

The guide block 253 is configured to engage with a filter housing and to couple the rail guide 250 to the filter housing. Referring to FIG. 11-12, the guide block 253 is a substantially rectangular prism having planar side surfaces on at least three sides of the guide block 253. Referring to FIG. 11, in some embodiments, the rail guide 250 also includes a rail-interface protrusion 264 extending away from the guide block 253 in a substantially longitudinal direction 258. The rail-interface protrusion 264 may have the same or a similar shape as the housing rail and may be insertable within the housing rail to facilitate alignment between the rail guide 250 and the housing rail.

The plurality of guide elements 261 are coupled to the guide block 253 and may be defined by the guide block 253 in some embodiments. The plurality of guide elements 261 are configured to slidably engage the first interface member and/or the second interface member of the support element to the guide block 253, and to guide the first interface member and/or the second interface member toward the complementary receiving structures of the filter housing, as will be further described. In some embodiments, the plurality of guide elements 261 form and/or define at least one cam-interface element that is structured to rotate the support element into alignment with the housing rail during insertion into the guide block 253, as will be further described. In the embodiment of FIG. 12, the plurality of guide elements 261 includes a first guide element 261*a* disposed proximate to a first lateral end of the guide block 253 and a second guide element 261*b* disposed at a second lateral end of the guide block 253.

The first guide element 261*a* includes a lateral protrusion (e.g., a shelf, etc.) disposed proximate to a first lateral end of the guide block 253. The lateral protrusion defines a groove (e.g., a 'U' shaped opening, etc.) facing in a lateral direction toward an upstream side of the filter housing. The first guide element 261*a* defines a first guide ledge 266 that is configured to engage with and support a first support ledge (e.g., the first support ledge 272 of the support element 230 shown in FIG. 5, etc.) thereon. The first guide ledge 266 is aligned with a respective one of the complementary receiving structures of the housing rail and is configured to guide the first interface element of the support element toward the respective one of the complementary receiving structures during installation.

Referring to FIGS. 11-12, the second guide element 261*b* includes a cylindrical protrusion 273 extending along the longitudinal direction 258. The cylindrical protrusion 273 is hemispherical or semi-hemispherical at a longitudinal end of the second guide element 261*b* and defines a capsule shape with increasing diameter moving away from the longitudinal end. The cylindrical protrusion 273 and the guide block 253 together define a first portion 265 of an annular channel 267 that is configured to receive a second interface member of the support element therein.

Referring to FIG. 12, in some embodiments, the rail guide 250 further includes an extension flange 296 configured to nestably engage the first support element. The extension flange 296 is arranged to extend along a media-facing side of the first support element (e.g., along an undulating surface defined by the media-facing side of the first support element) and toward the filter media pack. The extension flange 296 is configured to occupy a portion of an area along the first support element that is adjacent to a chamfer of the filter media pack (e.g., an open area defined by the filter media pack adjacent to an axial end of the filter media pack as shown in FIG. 5), and can prevent incorrect installation of the filter element by ensuring that the chamfer is oriented in the correct direction with respect to the air flow direction through the filter housing.

It should be understood that the design and arrangement of the extension flange 296 may be different in various embodiments, and may extend different distances along the lateral direction 219 depending on the geometry of the filter media pack 228 being used. The extension flange 296 and the second guide element 261*b* together define a second portion 269 of the annular channel 267 that extends from the first portion 265.

Together, the guide block 253, the plurality of guide elements 261, and the extension flange 296 define a funnel shaped channel 255 that is tapered between a first funnel opening at a first end of the rail guide 250, and a second funnel opening at a second end of the rail guide 250.

The funnel shaped channel 255 has a cross-sectional shape that corresponds with (e.g., is the same as or substantially similar to, etc.) the shape of the first support element 230 on at least one end of the funnel shaped channel 255. For example, in the embodiment of FIGS. 5-6, the funnel shaped channel 255 includes a first opening and/or passage at a first lateral end of the funnel shaped channel 255 that substantially matches the cross-sectional shape of the first interface member 252 and is configured to nestably receive the first interface member 252 therein. In some embodiments, the first lateral end of the funnel shaped channel 255 is configured to engage with the first support ledge 272 and to guide the first support ledge 272 into engagement with an upper surface (e.g., a support surface, etc.) of a first track of the housing rail 248.

A second lateral end of the funnel shaped channel 255 includes a second opening and/or passage (e.g., the second portion 269 of the annular channel 267) at a second lateral end of the funnel shaped channel 255 that substantially matches the cross-sectional shape of the second interface member 254 and/or a portion of the connecting member 256 and is configured to nestably receive the second interface member 254 (and/or at least a portion of the connecting member 256) therein. In some embodiments, the second lateral end of the funnel shaped channel 255 is configured to engage with the second support ledge 276 and to guide the second support ledge 276 into engagement with an upper surface (e.g., a support surface) of a second track of the housing rail 248. In some embodiments, the second lateral end of the funnel shaped channel 255 defines a curved opening that is substantially similar to (e.g., matches, corresponds with, etc.) the shape of the second interface member described with reference to FIG. 5. The curved opening forms a circular shape when viewed along the longitudinal direction. The curved opening has an approximately constant radius of curvature, which enables use of the curved opening to facilitate alignment between the support element and the funnel shaped channel 255.

Referring to FIG. 12, the guide block 253 defines an upper surface of the funnel shaped channel 255 having the same shape as the connecting member of the first support element 230. The upper surface of the funnel shaped channel 255 includes at least one concave portion and at least one convex portion extending from the concave portion to an opposing end of the upper surface. In the embodiment of FIG. 12, the guide block 253 also defines a concave portion extending from a lateral end of the funnel shaped channel 255 and between the lateral end and the convex portion.

In at least one embodiment, at least a portion of the plurality of guide elements 261 (e.g., guide rails, etc.) protrude outwardly from sidewalls of the funnel shaped channel 255 (e.g., from the guide block 253). The guide elements 261 may include protrusions or extension pieces forming ledges on either side of the funnel shaped channel 255 and at least partially defining a lower end of the funnel shaped channel 255.

In at least one embodiment, at least one of the guide elements 261 is tapered so that a cross-sectional area of the funnel shaped channel 255, or at least portions adjacent to the guide elements 261, decreases continuously or semi-continuously from the first end of the funnel shaped channel 255 to the second end of the funnel shaped channel 255 that meets up with the housing rail.

Figure 14:
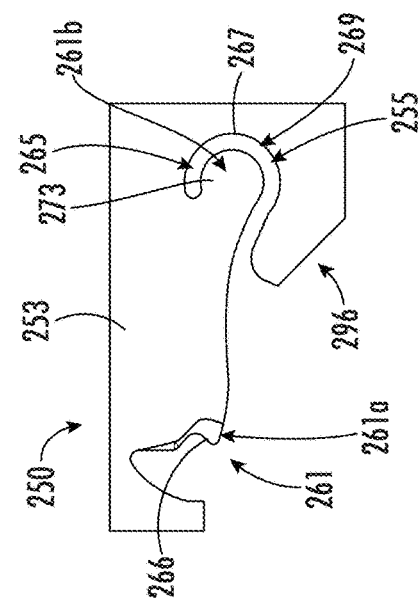
FIG. 14 is a front cross-sectional view of the rail guide of FIG. 7 at an end of a rotational alignment member of the rail guide.
Figure 13:
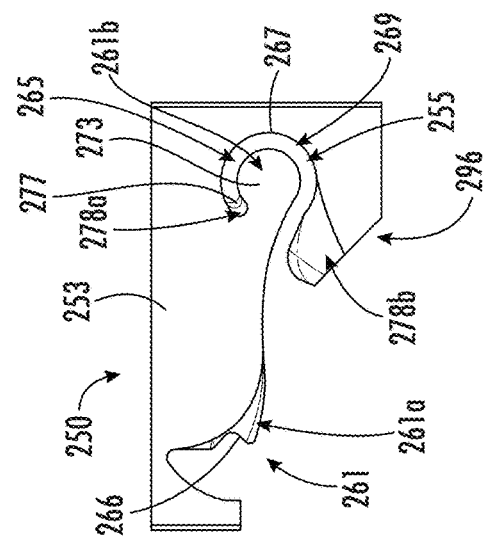
FIG. 13 is a front cross-sectional view of the rail guide of FIG. 7 at a location approximately halfway along a rotational alignment member of the rail guide.

Referring to FIGS. 12-14, in some embodiments, the rail guide 250 includes a rotational alignment member 278 (e.g., at least one cam interface element, cam interface, etc.) that is configured to allow for insertion of the support element at multiple different angles relative to the rail guide 250, and alignment with the housing rail. The rotational alignment member 278 may also be configured to rotate the support element into alignment with complementary receiving structure of the housing rail, to fully expand the filter media pack of the filter element, and/or to open the end pleat of the filter media pack to airflow therethrough.

In the embodiment of FIGS. 12-14, the rail guide 250 includes a plurality of rotational alignment members 278, including a first rotational alignment member 278a (e.g., a first cam element, etc.) and a second rotational alignment member 278b (e.g., a second cam element, etc.). The first rotational alignment member 278a is at least partially defined by the second guide element 261b. The first rotational alignment member 278a is disposed proximate to a first lateral end 279 of the funnel shaped channel that receives an end (e.g., an outer end, etc.) of the first interface member therein. The second rotational alignment member 278b is at least partially defined by the extension flange 296. The first rotational alignment member 278a and the second rotational alignment member 278b each extend from a first end of the rail guide 250 and along a longitudinal direction toward the second end.

The first rotational alignment member 278a and the second rotational alignment member 278b include curved and/or tapered surfaces that guide rotation of the support element (e.g., the second interface member, the connecting member, etc.) and cause alignment between the first interface member and the funnel shaped channel 255. The structure of the first rotational alignment member 278a and the second rotational alignment member 278b may also provide tactile feedback to a user during installation to indicate that the support element is fully aligned with the funnel shaped channel 255 (e.g., due to the reduced insertion force required to press the support element into the funnel shaped channel 255 once fully aligned, etc.).

Referring to FIGS. 12-14, the first rotational alignment member 278a includes a groove 277 that extends along the intersection between the cylindrical protrusion 273 of the first guide element 261a and the guide block 253. The groove 277 defines a helical shape that rotates about the cylindrical protrusion 273 of the first guide element 261a, and about a longitudinal axis extending parallel to the longitudinal direction 258. FIGS. 12-14 show the first rotational alignment member 278a and the second rotational alignment member 278b at different longitudinal positions along the rail guide 250. The first rotational alignment member 278a (e.g., the groove 277, etc.) extends in both the lateral direction 219 and the axial direction 225 when moving along the longitudinal direction so as to cause rotational movement of the support element relative to the rail guide 250 responsive to the support element (e.g., a outer end of a second interface member of the support element, etc.) being pushed against the first rotational alignment member 278a. In some embodiments, the first rotational alignment member 278a (e.g., the groove 277, etc.) defines a helical shape that rotates in a clockwise direction when moving along the longitudinal direction 258 (e.g., into the page as shown in FIGS. 12-14).

Figure 17:
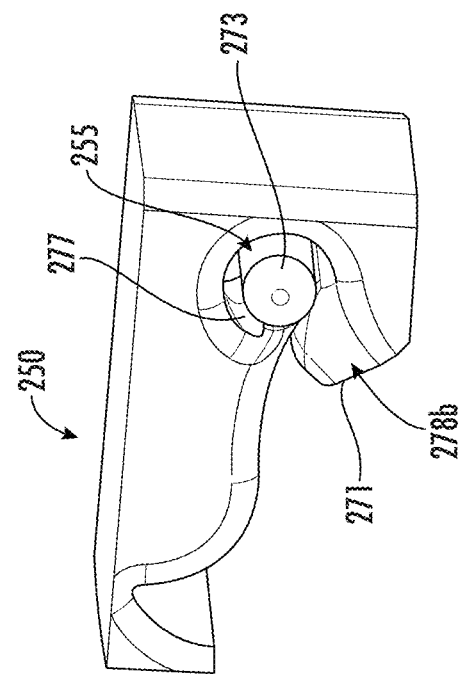
FIG. 17 is a left side perspective view of the rail guide of FIG. 7.
Figure 15:
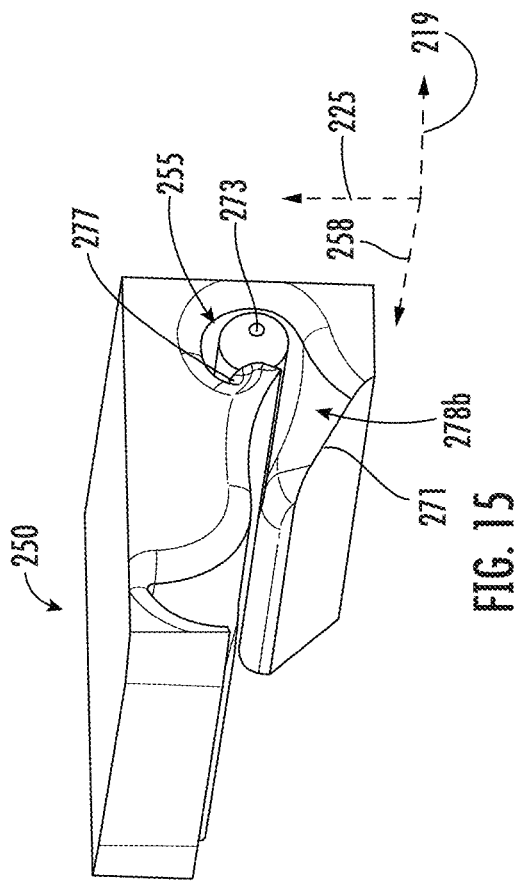
FIG. 15 is a right side perspective view of the rail guide of FIG. 7.
Figure 16:
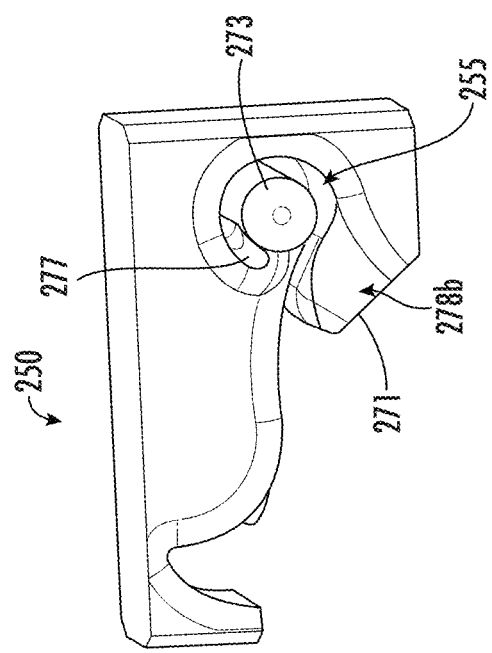
FIG. 16 is a front perspective view of the rail guide of FIG. 7.

Referring to FIGS. 15-17, the second rotational alignment member 278b includes a curved surface that is defined by the extension flange 296. An outer edge 271 of the curved surface (and the extension flange 296) extends in each of the longitudinal direction 258, the axial direction 225, and the lateral direction 219. The curved surface extends in both an axial direction 225 and a lateral direction 219 (e.g., upwardly and to the right as shown in FIGS. 15-17) when moving along a longitudinal direction 258 through the rail guide 250 so as to cause rotational movement of the support element relative to the rail guide 250 when the support element is pushed against the curved surface. In some embodiments, as shown in FIG. 15, a portion of the curved surface defines a conical taper (e.g., a frustoconical shaped surface, a funnel shaped surface, etc.) that increases in dimension moving from an outer edge 271 of the second rotational alignment member 278b and toward the funnel shaped channel 255.

The first rotational alignment member 278a and the second rotational alignment member 278b terminate after an entry distance from a longitudinal end of the rail guide 250 and into a portion of the funnel shaped channel 255 that matches the cross-sectional profile (e.g., the cross-sectional shape, etc.) of the support element along the entire length of the support element.

Figure 20:
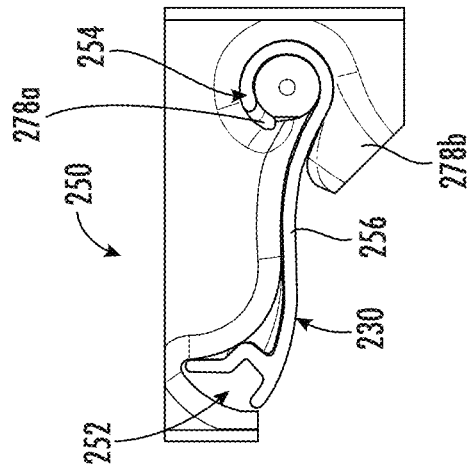
FIG. 20 is a front view of the rail system of FIG. 2 during a third part of the rotational alignment operation.
Figure 19:
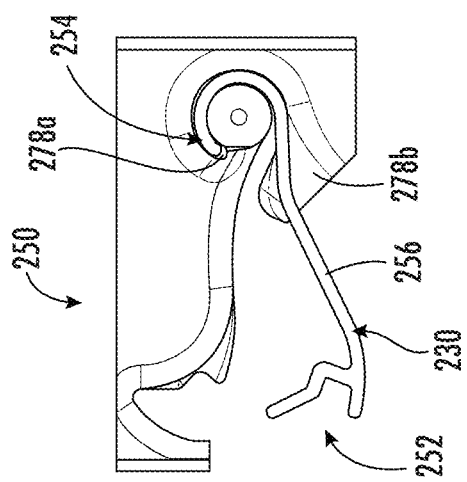
FIG. 19 is a front view of the rail system of FIG. 2 during a second part of the rotational alignment operation.
Figure 18:
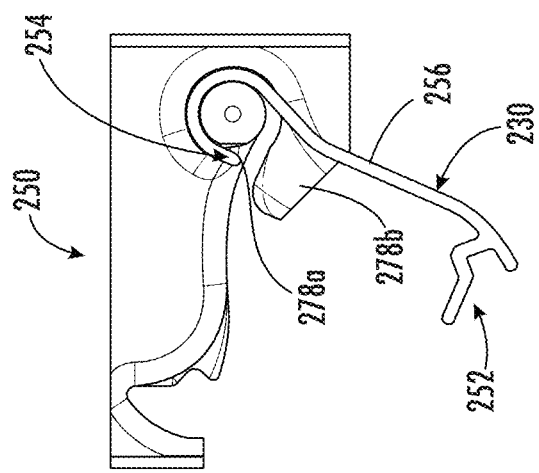
FIG. 18 is a front view of the rail system of FIG. 2 during a first part of a rotational alignment operation of a support element into the rail guide.

Referring to FIGS. 18-20, a method of installing the support element 230 is shown, according to an embodiment. The method includes engaging an end of a curved portion of the support element 230 (e.g., a second interface member 254, a concave portion of the connecting member 256, a convex portion of the connecting member 256, etc.) with the first rotational alignment member 278a and/or the second rotational alignment member 278b.

In at least one embodiment, the method includes engaging the second interface member 254 with the groove 277 of the first rotational alignment member 278a (see FIG. 18). The method may also include engaging at least a portion of the connecting member 256 (e.g., the convex portion, etc.) with the second rotational alignment member 278b. In some embodiments, the first rotational alignment member 278a is positioned so that the support element can engage the first rotational alignment member 278a in advance of the second rotational alignment member 278b (e.g., a leading edge/surface of the second rotational alignment member 278b is recessed into the rail guide farther than a leading edge/surface of the first rotational alignment member 278a, etc.), which can simplify installation by only requiring the user to engage the support element with a single interface at a time.

The method further includes pressing the support element along a longitudinal direction and into the rail guide 250, so that the first rotational alignment member 278a and/or the second rotational alignment member 278b cams (e.g., causes rotation of, etc.) the support element 230 (e.g., along a clockwise direction, etc.) relative to the rail guide 250 (FIG. 19). Rotation continues until the first interface member 252 is brought into alignment with the funnel shaped channel (FIG. 20). Such an arrangement of the rail guide 250 allows for insertion of the support element 230 at multiple different rotational orientations relative to the rail guide 250, which simplifies installation and reduces the amount of pre alignment needed between the rail guide 250 and the support element 230. Such an arrangement also guides the end pleat into an open position to receive flow therethrough, which can increase the overall performance of the air filter assembly.

Among other benefits, the rail guide 250 facilitates alignment between the support element and the housing rail during installation by providing greater clearances to accommodate the support element than the housing rail. Because the user does not need to align the support element with the housing rail manually, the use of the rail guide 250 can also allow for the use of tighter clearances between the support element and the housing rail, which can improve sealing between the filter element and the air filter housing.

Method of Making a Filter Element

Figure 21:
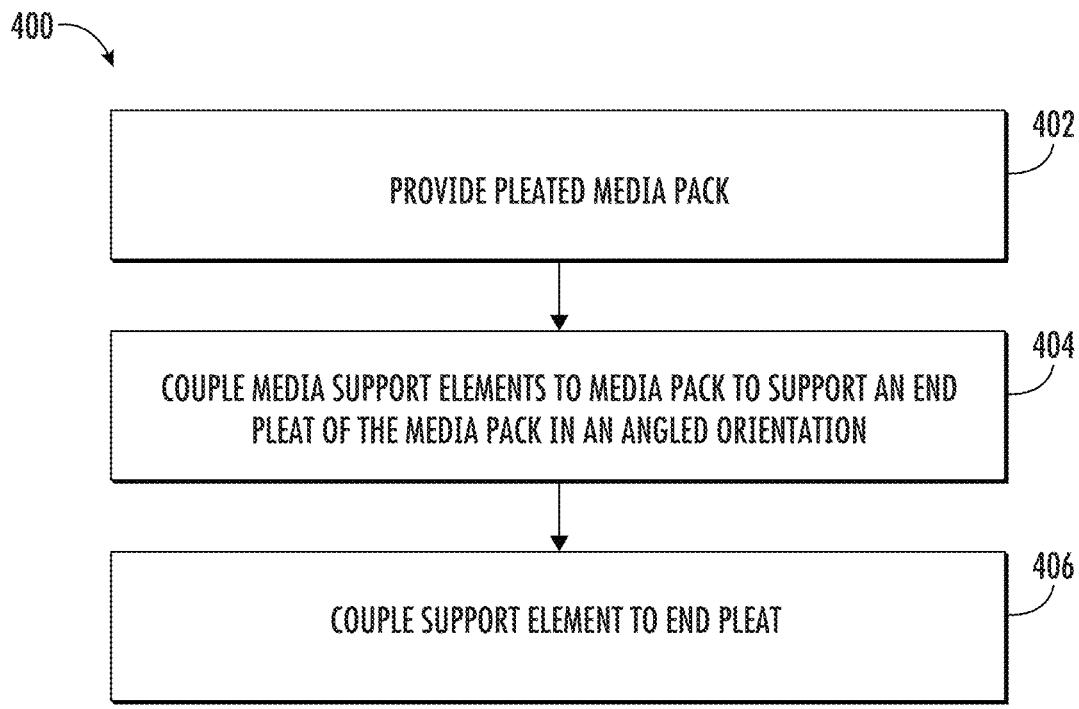
FIG. 21 is a flow diagram of a method of making an air filter for use with the rail system of FIG. 2, according to an embodiment.

Referring to FIG. 21, a method 400 of manufacturing a filter element is shown, according to an embodiment. At 402, a pleated filter media pack is formed. In some embodiments, operation 402 includes forming a layered filter media, for example, by laminating a slit layer and an expanded metal layer to a synthetic media layer and/or another media layer material. The expanded metal layer can increase stiffness of the layered filter media and ensure that the layered filter media holds its shape after a pleating or other forming operation.

Operation 402 may also include pleating the layered filter media, such as by passing the layered filter media through a pleating machine that scores the layered filter media to form bend lines along the layered filter media and then gathers the layered filter media in an accordion shape having the desired average pleat angle across the layered filter media. Operation 402 may include adjusting a score bar position during pleating to produce variable pleat height across the filter media pack, such as at, or adjacent to, an end pleat 508 of the filter media pack 504. For example, operation 402 may include producing a first pleat height across a first portion (e.g., a central portion) of the filter media pack 504, a second pleat height across a second portion (e.g., an end portion adjacent to the end pleat 508, etc.) of the filter media pack 504, and a third height across a third portion (e.g., at the end pleat 508) of the filter media pack 504. Among other benefits, reducing a pleat height at, or adjacent to, the end pleat 508 can reduce the amount of filter media used at areas of low flow velocity across the filter media pack 504, which can improve utilization of the filter media and can result in a more uniform flow velocity in all areas of the filter media pack.

At 404, multiple media support elements are coupled to the media pack to support an end pleat of the filter media pack in an angled orientation. Referring to FIG. 5, operation 404 may include securing (e.g., sewing, bonding, etc.) a first media support element 502 to bend lines across a first face of the pleated filter media pack 504 such that an average angle 506 formed by each adjacent pair of pleats is approximately the same across the entire filter media pack, and/or so that the end pleat 508 of the filter media pack 504 is oriented in a non-perpendicular angle 510 with respect to a reference plane 512 oriented substantially perpendicular to a first face 514 of the filter media pack 504.

In embodiments in which the filter media pack includes a chamfer and/or area of reduced pleat height at, or adjacent to, the end pleat 508 of the filter media pack 504, operation 404 may include securing a second media support element 516 to the filter media pack 504 across a second face 518 of the filter media pack 504 and along bend lines of the filter media pack 504 that define the chamfer and/or area of reduced pleat height. In some embodiments, operation 404 includes using adaptive equipment to enable securing the second media support element 516 at different depths across the second face 518.

In some embodiments, operation 404 includes securing a first flexible ribbon made from a synthetic material, fabric, or another collapsible material to the filter media pack 504 along the first face 514 and/or the second face 518 (e.g., to bend lines across the first face 514 and the second face 518).

In some embodiments, operation 404 also includes cutting the filter media pack and the media support elements to form a filter media pack 504 for each filter element.

Figure 22:
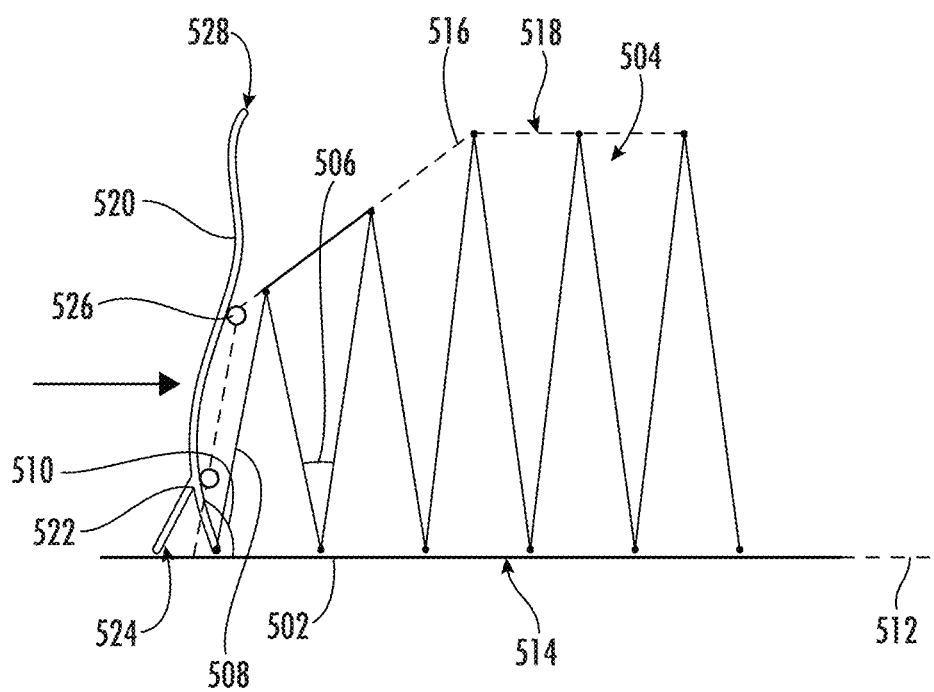
FIG. 22 is a front view of an air filter during an assembly operation in which a media pack is coupled to an endcap of the air filter, according to an embodiment.

At 406, a support element (e.g., an endplate structure, etc.) is coupled to the filter media pack. In some embodiments, operation 406 includes bonding (e.g., adhering, etc.) the support element to the filter media pack such as by using glue or another adhesive material. In such embodiments, and with reference to FIG. 22, operation 406 includes placing the filter media pack 504 on a first fixture having a planar surface, and so that the first face 514 of the filter media pack 504 is adjacent the planar surface (e.g., such that a chamfered side of the filter media pack faces away from the fixture, etc.). Operation 406 includes applying adhesive material in at least two lines along the longitudinal direction (i.e., into the page as shown in FIG. 5) across an undulated surface defined by a media-facing side of the support element 520, and disposed at least partially between a first interface member 524 and a second interface member 528. In some embodiments, operation 406 includes applying a first bead 522 of adhesive material to the support element 520 adjacent to a first interface member 524 of the support element 520, and a second bead 526 of adhesive material to the support element 520 at an intermediate position (e.g., a mid-point, etc.) along a lateral direction between the first interface member 524 and a second interface member 528.

In some embodiments, after applying the adhesive material to the support element 520, operation 406 includes reorienting the support element 520 approximately 90° so that the support element 520 is supported on end by a pair of legs defining the first interface member 524. In such embodiments, operation 406 may further include pressing the filter media pack 504 (e.g., the end pleat 508, etc.) against the support element 520 to engage the end pleat 508 and/or the media support elements on either side of the filter media pack 504, with the undulating surface on the media-facing side of the support element 520, and into the adhesive material. In some embodiments, operation 406 includes maintaining a compressive force holding the filter media pack 504 against the support element 520 until the adhesive material at least partially cures (e.g., dries, hardens, etc.). In some embodiments, the method 400 further includes repeating operation 406 for a second support element on an opposite axial end of the filter media pack. The method 400 may further include collapsing the filter media pack onto itself and placing the collapsed filter element into a box for shipping. In other embodiments, the method 400 may include additional, fewer, and/or different operations.

Figure 23:
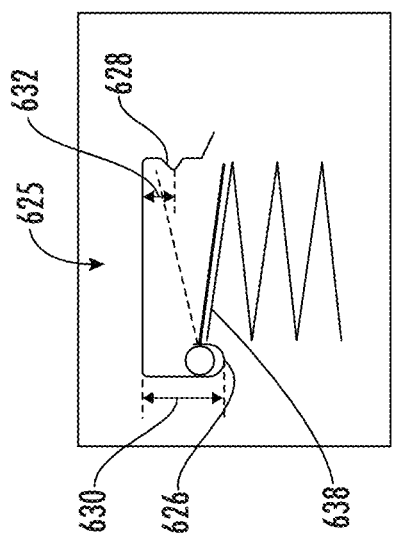
FIG. 23 is a side view of a rail system of a filter housing that is configured to support a frame element at an angle within the filter housing, according to an embodiment.

The design of the support element and housing rail may be different in various embodiments and it should be understood that various alternative designs may be used to maintain portions of the filter element (e.g., the filter media pack) in a curved and/or angled orientation within the housing; for example, such that the end pleat is supported in an angled orientation (e.g., non-horizontal orientation) within the filter housing, and/or so at least a portion of the upstream and/or downstream face of the filter element (e.g., an inlet face, and outlet face, or portions thereof) is non-perpendicular to the flow direction through the filter housing. In some embodiments, the air filter assembly (e.g., the filter housing) includes a frame support(s) that is configured to support the filter media pack in an arched, curved shape, or with at least a portion of an inlet and/or outlet face of the filter media pack in a non-perpendicular orientation relative to the flow direction through the filter housing/filter element. For example, referring to FIG. 23, a frame support 625 (e.g., a housing rail, etc.) of a filter housing is shown that includes an angled interface to support a frame element 638 (e.g., a support element, an endcap, an endplate, etc.) of a filter element at an angle with respect to a flow direction through the filter housing (e.g., at an angle relative to a horizontal sidewall of the filter housing). The frame support 625 defines a first support wall 626 and a second support wall 628 spaced apart from the first support wall 626 along a flow direction through the filter housing. A height 630 of the first support wall 626 is greater than a second height 632 of the second support wall 628. Together, the first support wall 626 and the second support wall 628 define a channel that is sized to receive and support the frame element 638 therein.

In some embodiments, the first support wall 626 and the second support wall 628 define ledges that extend in a horizontal direction (e.g., parallel to a flow direction through the filter housing). The ledges may form a track or guide that is configured to slidably engage the frame element 638 and to prevent movement of the frame element 638 along a direction that is normal to the frame support 625. In some embodiments, at least one of the first support wall 626 and the second support wall 628 includes a flexible vertical wall forming a clip structure that is configured to snap onto a panel of the frame element 638 when pressed vertically against the frame support 625. Such an arrangement can facilitate assembly of the filter element 604 into the filter housing by allowing at least one edge of the frame element 638 to clip or latch onto one of the first support wall 626 and the second support wall 628 after the filter element 604 has been fully inserted into the filter housing.

Figure 24:
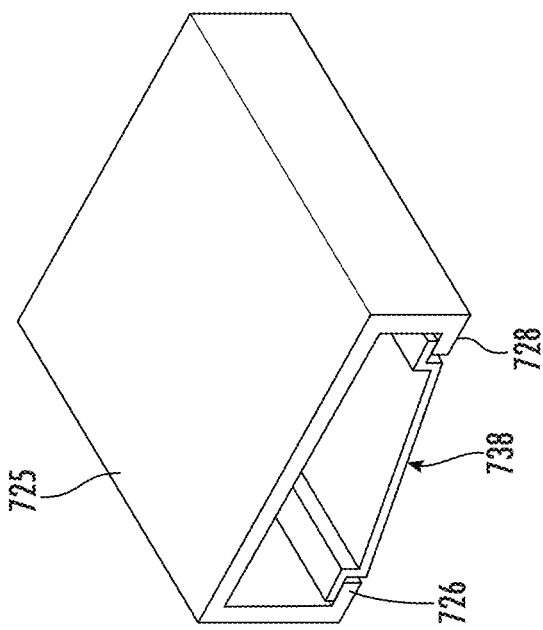
FIG. 24 is a perspective view of a rail system of a filter housing that is configured to support a frame element at an angle within the filter housing, according to another embodiment.
Figure 26:
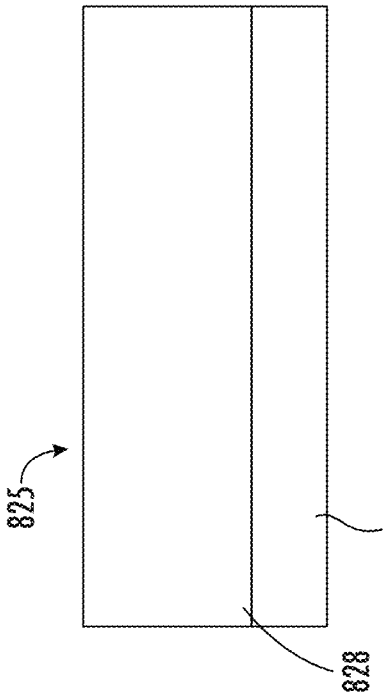
FIG. 26 is a side view of the rail system of FIG. 24.
Figure 25:
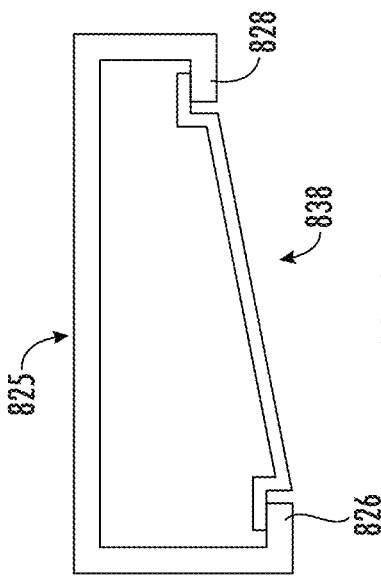
FIG. 25 is a front view of the rail system of FIG. 24.

In other embodiments, the size and/or geometry of the frame support may be different. For example, referring to FIGS. 24-26, a first support wall 726 and a second support wall 728 of the frame support 725 may have rigid sidewalls that allow movement of the frame element 738 relative to the frame support 725 in only one direction. For example, as shown in FIGS. 27-28, the frame support 725 may define a channel, track, or guide rail that prevents the frame element 738 from rotating out of the frame support 725 (e.g., past either one of the first support wall 726 and the second support wall 728).

Figure 28:
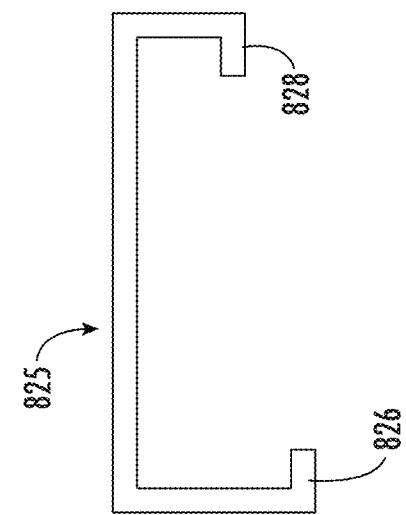
FIG. 28 is a front view of the frame support of the filter mount assembly of FIGS. 24-26.
Figure 27:
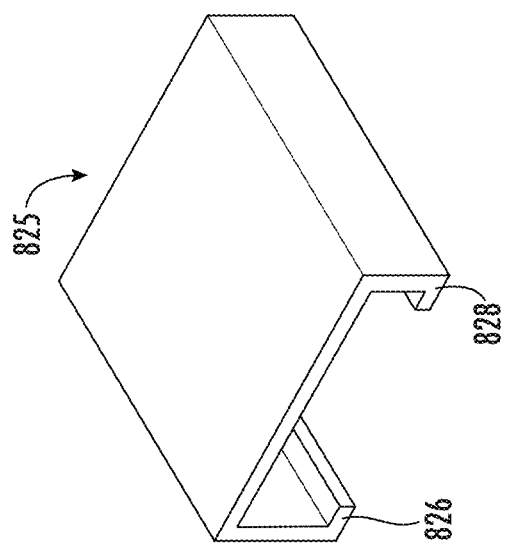
FIG. 27 is a perspective view of the frame support of the filter mount assembly of FIGS. 24-26.

Referring to FIGS. 27-28, the first support wall 726 defines a first horizontally-extending ledge that is configured to engage with the frame element 738 along a first edge of the frame element 738. The second support wall 728 defines a second horizontally-extending ledge that is configured to engage with a frame element 738 along a second edge of the frame element 738. The frame element 738 is configured to slidably engage the first and second ledges to allow lateral movement of the frame element 738 relative to the frame support 725.

Figure 30:
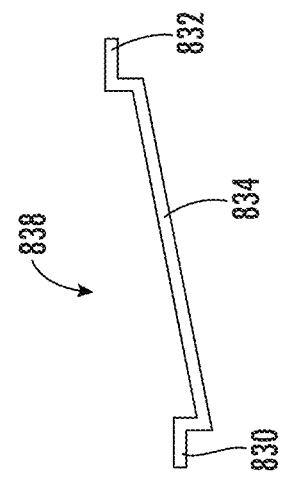
FIG. 30 is a front view of a frame element for use in the filter mount assembly of FIGS. 24-26.
Figure 29:
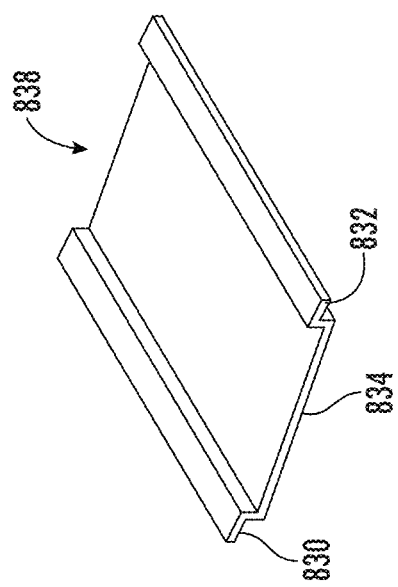
FIG. 29 is a perspective view of a frame element for use in the filter mount assembly of FIGS. 24-26.

Referring to FIGS. 29-30, the frame element 738 includes a first interface portion 730, a second interface portion 732, and an intermediate portion 734 engaged with and extending at an angle between the first interface portion 730 and the second interface portion 732 (e.g., at an angle relative to a flow direction through the filter element). The first and second interface portions extend horizontally away from the intermediate portion 734 and are configured to engage the first support wall 726 and the second support wall 728, respectively, to support the frame element 738 within the frame support 725 (see FIG. 25). Among other benefits, the arrangement of the frame support 725, in multiple sections, can increase the surface area of contact between the frame element 738 and the frame support 725, thereby increasing the strength of the interconnection between the frame element 738 and the frame support 725 under load. The angled orientation of the frame support 725 also supports the outermost pleats in an open or otherwise spaced apart orientation, which can increase the effective surface area of the filter media and reduce flow resistance therethrough.

Figure 31:
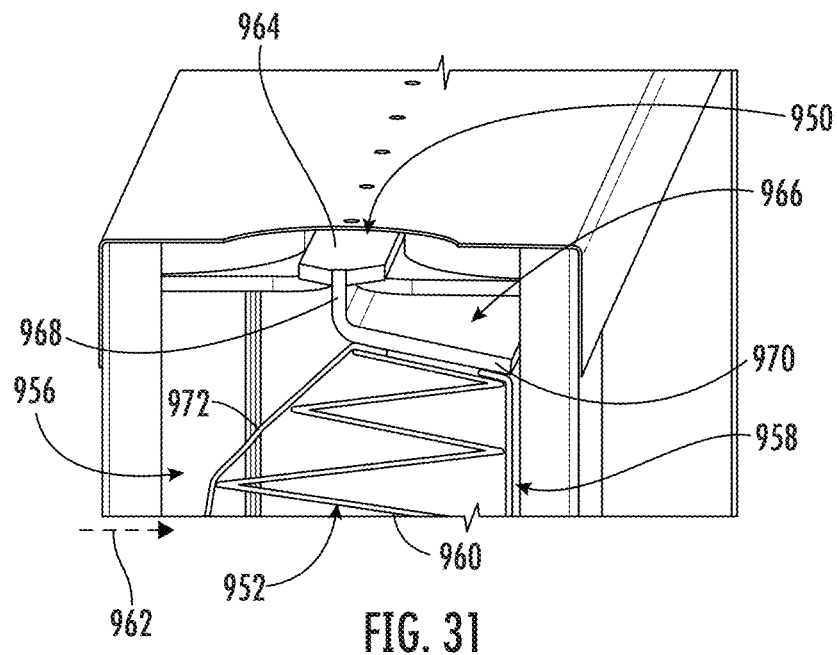
FIG. 31 is a perspective view of a filter mount assembly for a filter element having a non-rectangular pleat profile, according to an embodiment.
Figure 32:
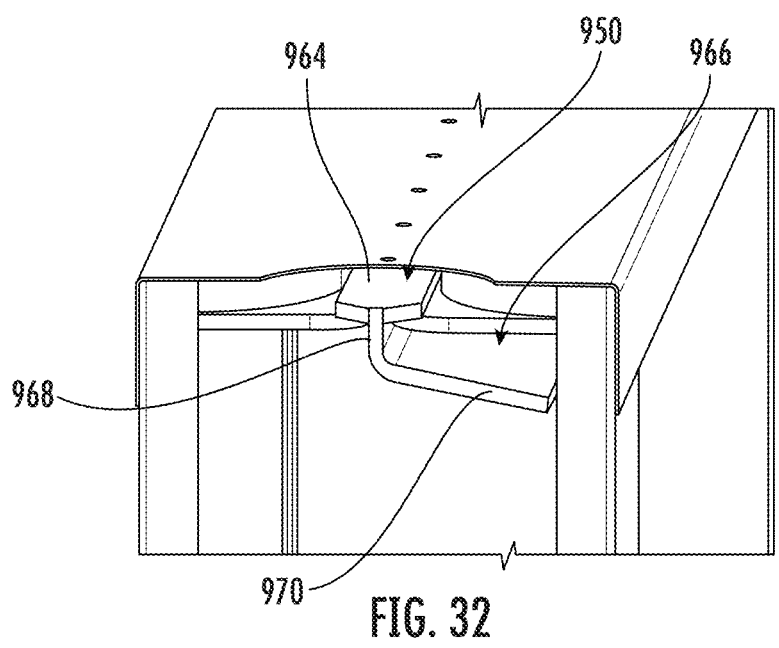
FIG. 32 is another perspective view of the filter mount assembly of FIG. 31.

Referring to FIGS. 31-32, another support element 950 (e.g., an end plate, a frame element, a frame support, a frame member, a frame element, etc.) for a filter element 952 is shown, according to an embodiment. The support element 950 is configured to support at least a portion of the inlet face 956 and/or outlet face 958 of a filter media pack 960 a non-perpendicular angle relative to a flow direction 962 through the filter housing. The support element 950 is an endplate of the filter element that is coupled (e.g., bonded, adhered, etc.) to an end of the filter media pack 960. The support element 950 extends across an entire edge of the filter media pack 960. The support element 950 includes a 'T' shaped housing interface portion 964 and an end plate interface portion 966. The housing interface portion 964 is a rectangular tab that extends along an entire length of the support element 950 and that is configured to engage with opposing ledges forming a slotted opening in the filter housing. Contact between the tab and the opposing ledges substantially prevent rotation of the support element 950 after insertion into the filter housing.

The end plate interface portion 966 of the support element 950 is disposed at a central position along the housing interface portion 964 (along a flow direction through the filter element). The end plate interface portion 966 includes a first extension 968 that extends axially away from the housing interface portion 964 and a second extension 970 that extends at an angle relative to the first extension 968, at least partly along the flow direction 962 through the housing. In some embodiments, the second extension 970 is directly coupled to an end pleat of the filter media pack 960 via glue or another adhesive material. The second extension 970 supports the outer pleats of the filter media pack 960 in an open position and enables use of a filter media pack 960 having at least one angled face portion 972 along the inlet face 956, to thereby increase flow area across the filter media pack 960. Engagement between the 'T' shaped housing interface portion 964 and the slotted opening in the housing prevents rotation of the end plate interface portion 966 when the filter element is installed into the housing. In this way, the second extension 970 forms an arcuate support member for the filter element.

Additional Implementations of the Rail System

The design and arrangement of the rail systems described with respect to FIGS. 2-32 should not be considered limiting, and it should be appreciated that various alterations and design changes are possible without departing from the inventive principles disclosed herein.

Figure 34:
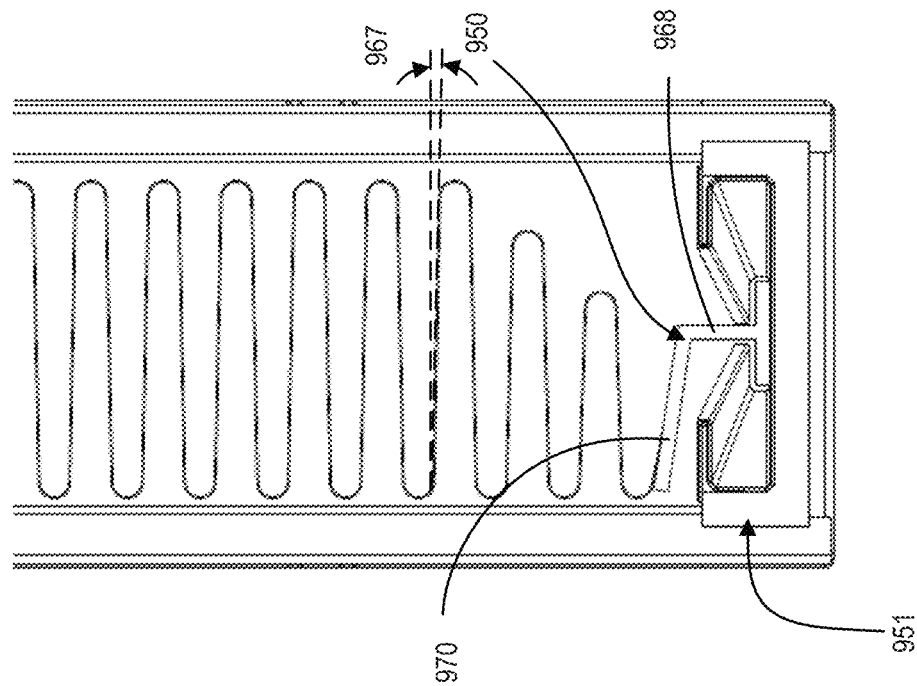
FIG. 34 is a side view of the rail system of FIG. 33.
Figure 33:
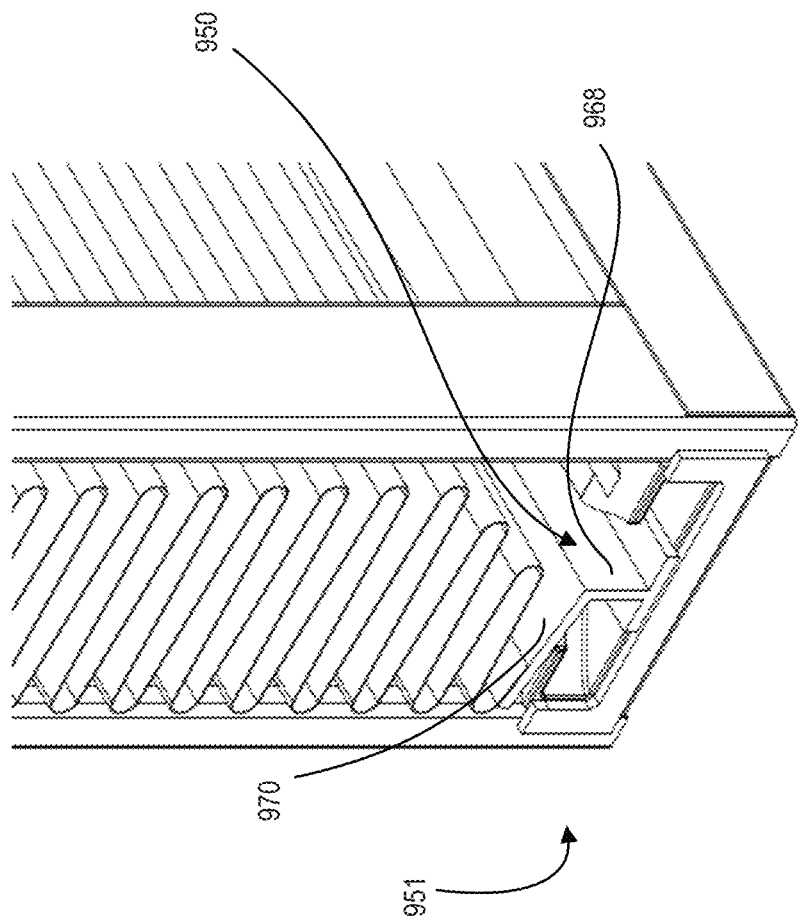
FIG. 33 is a perspective view of a rail system for an air filter assembly, according to yet another embodiment.
Figure 36:
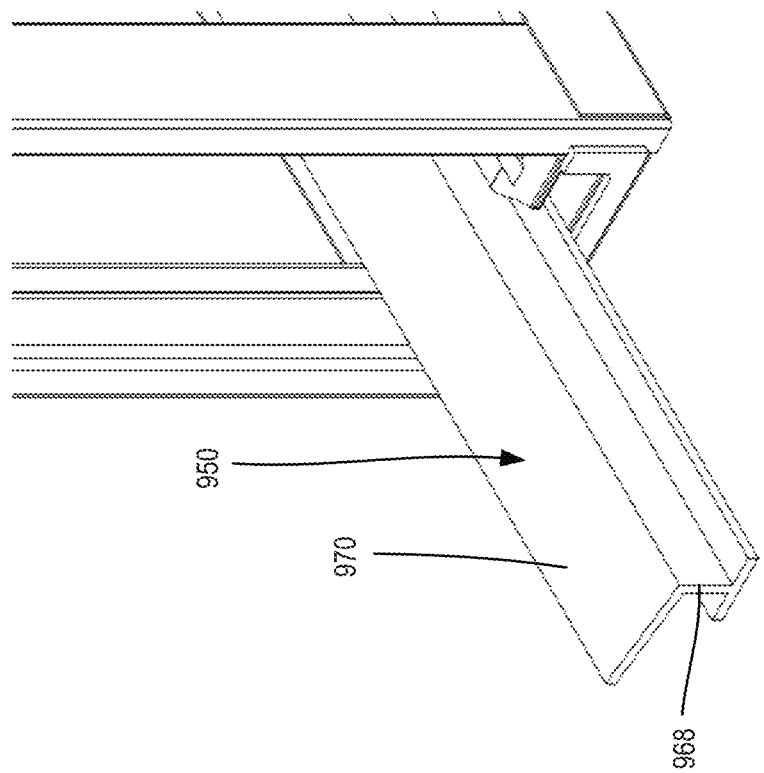
FIG. 36 is a perspective view of the rail system of FIG. 33 during installation of a frame element of the rail system into a rail member of the rail system.
Figure 35:
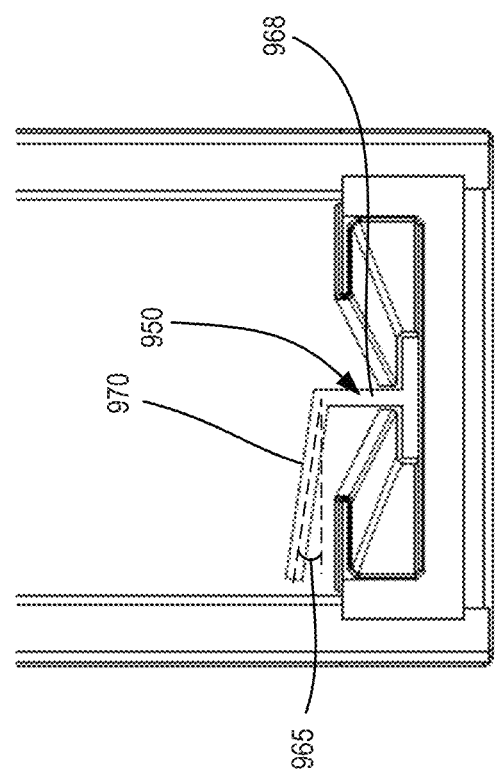
FIG. 35 is a side view of the rail system of FIG. 33 without a filter media pack.

Referring to FIGS. 33-34, a rail system 951 for use with the support element 950 having a 'T' shaped rail insert is shown, according to an embodiment. The second extension 970 (e.g., an endcap base wall) extends away from the first extension 968 that is coupled to, and extends between, an attachment member (e.g., the 'T' shaped rail insert) and the second extension 970. As shown in FIGS. 35-36, the second extension 970 is a non-horizontal leg of the support element 950 extending toward, and protruding beyond, one side of the rail insert. The second extension 970 extends away from the first extension 968 at an oblique angle, shown as angle 965 in FIG. 35. In certain embodiments, the angle 965 may be within a range from 10 degrees to 40 degrees, or within another range in other embodiments. In some embodiments, the angle 965 is greater than or equal to an average pleat angle 967 of individual pleats in the media pack (see FIG. 34).

The 'T' shaped attachment member is configured to support the second extension 970 in a non-perpendicular orientation within the enclosure, so that the second extension 970 is angled toward a rear wall of the enclosure and/or a rear opening of the enclosure. As shown in FIGS. 33-34, the second extension 970 is bondable to an end pleat of a chamfered media pack, having a reduced pleat height at outer ends of the media pack, to thereby open the end pleat and reduce restriction to airflow through the end pleats. Using a chamfered and/or variable pleat height media pack geometry can also increase performance by reducing the amount of filter media in areas of low flow velocity through the air filter housing, such as in areas experiencing flow separation due to transitions in the flow path and wall effects.

Figure 37:
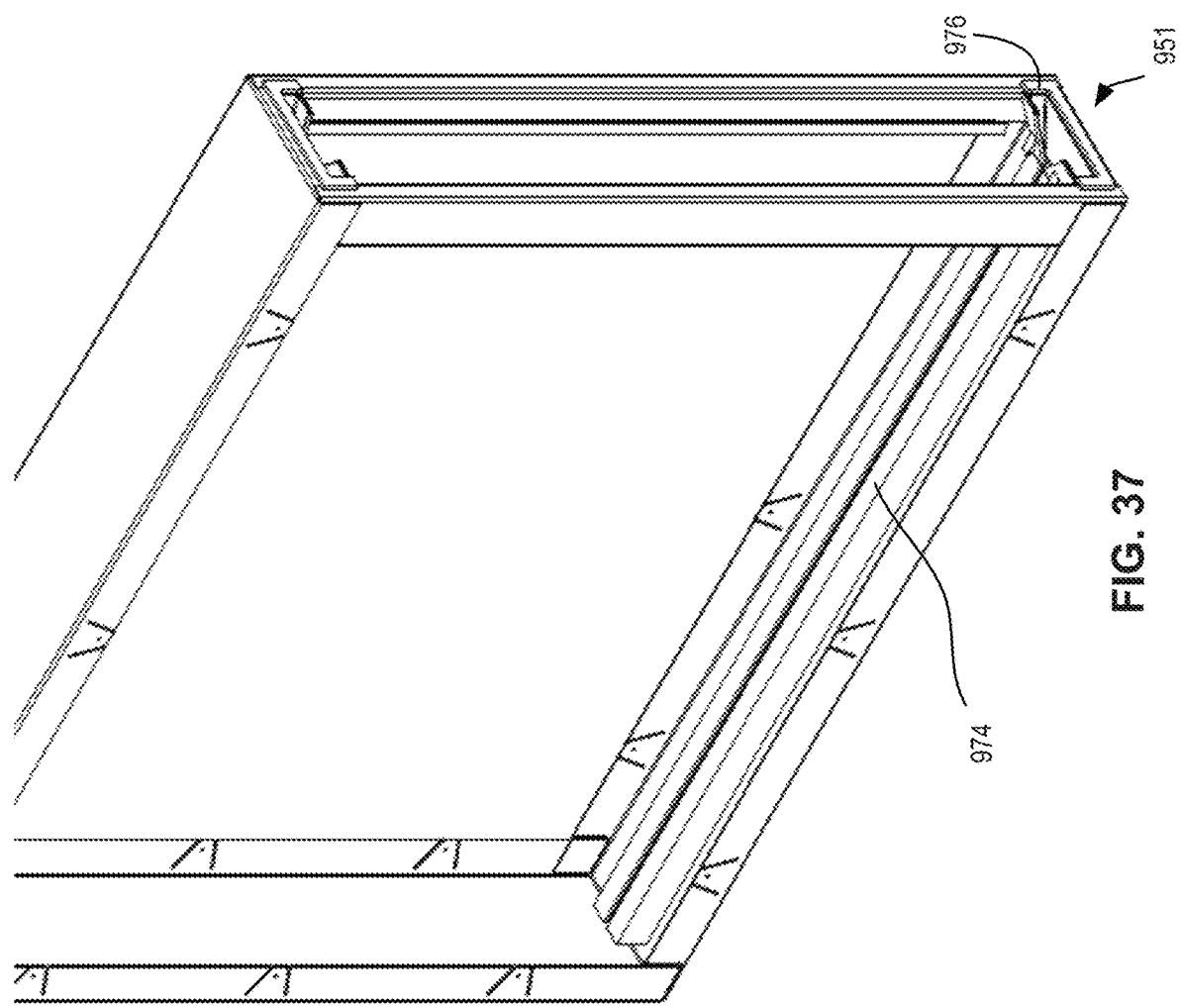
FIG. 37 is a perspective view of an air filter housing that includes the rail system of FIG. 33.
Figure 39:
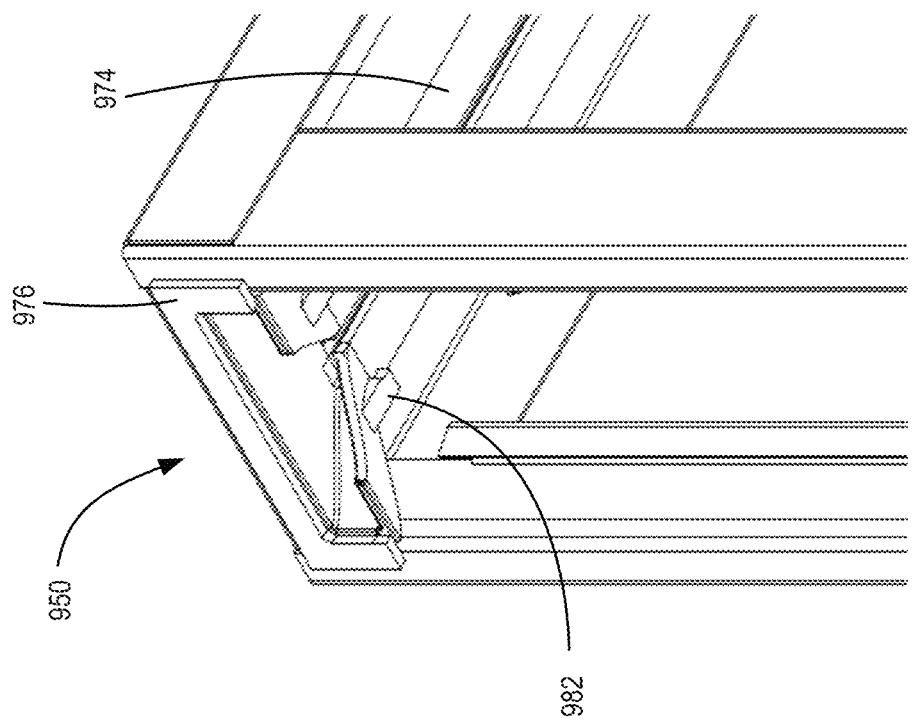
FIG. 39 is a perspective view of the rail system of the air filter housing of FIG. 37.
Figure 38:
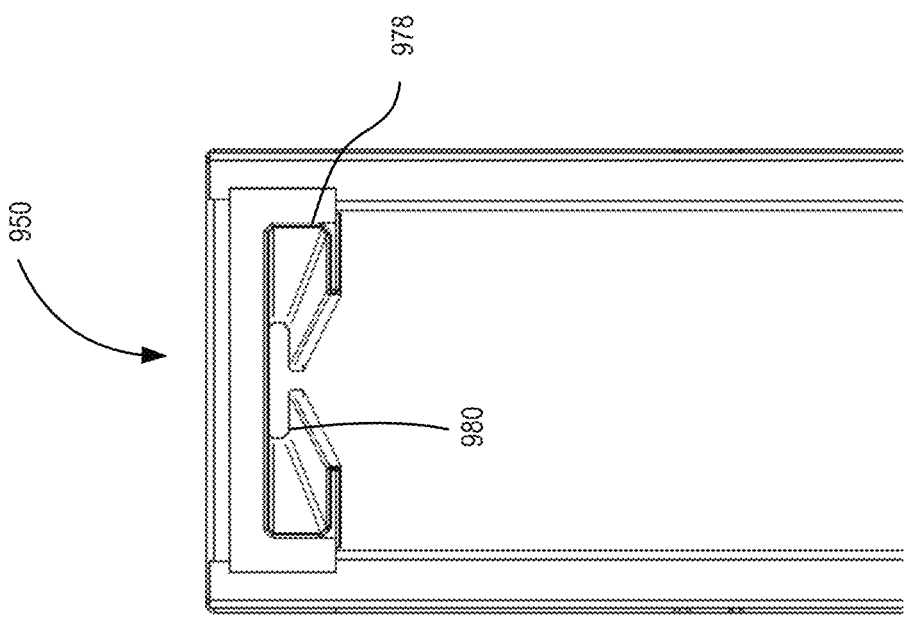
FIG. 38 is a side view of the air filter housing of FIG. 37.

FIGS. 37-39 show an air filter housing that includes a pair of rail members 974 (e.g., tracks, rail elements, etc.) of the rail system 951. Rail members 974 are coupled to both an upper and lower wall of the air filter housing. The rail members 974 may be made of metal or another strong and lightweight material. The rail system 951 also includes an alignment element 976 (e.g., a rail guide, a guide funnel, etc.) that is structured to facilitate installation of the support element 950 (e.g., the first extension 968) into a rail opening of the rail member 974. In one embodiment, as shown in FIG. 39, the alignment element 976 defines a funnel shaped channel that is tapered between a first funnel opening 978 at a first end of the alignment element 976, and a second funnel opening 980 at a second end of the alignment element 976.

The funnel shaped channel may have a cross-sectional shape that corresponds with (e.g., is the same as, etc.) the shape of the first extension 968 and the rail insert (e.g., a "T" shape). In one embodiment, a lower wall and sidewalls of the funnel shaped channel are tapered so that a cross-sectional area of the funnel shaped channel decreases continuously from the first end of the alignment element 976 to the second end of the alignment element 976. In such implementations, the alignment element 976 extends below the rail members 974, which can prevent the use of non-genuine filter elements by blocking a portion of the access opening of the air filter housing.

In one embodiment, the alignment element 976 is made from a plastic material by injection molding or another forming operation. In other embodiments, the alignment element 976 is formed from metal or another lightweight and durable material. The alignment element 976 is coupled to the rail members 974. In one embodiment, the alignment element 976 clips onto the air filter housing. The alignment element 976 may include multiple tabs 982 or another extension piece to facilitate alignment between the alignment element 976 and the air filter housing and/or rail members 974. In at least one embodiment, the alignment element 976 has the same color as the frame element, and is different from a color of the air filter housing (e.g., a brighter color than the air filter housing), which can facilitate assembly operations by guiding a user to areas of the air filter housing that engage with the frame element. The alignment element 976 can allow for the use of tighter clearances between the attachment member and the rail members 974, which can improve sealing between the filter element and the air filter housing.

Figure 40:
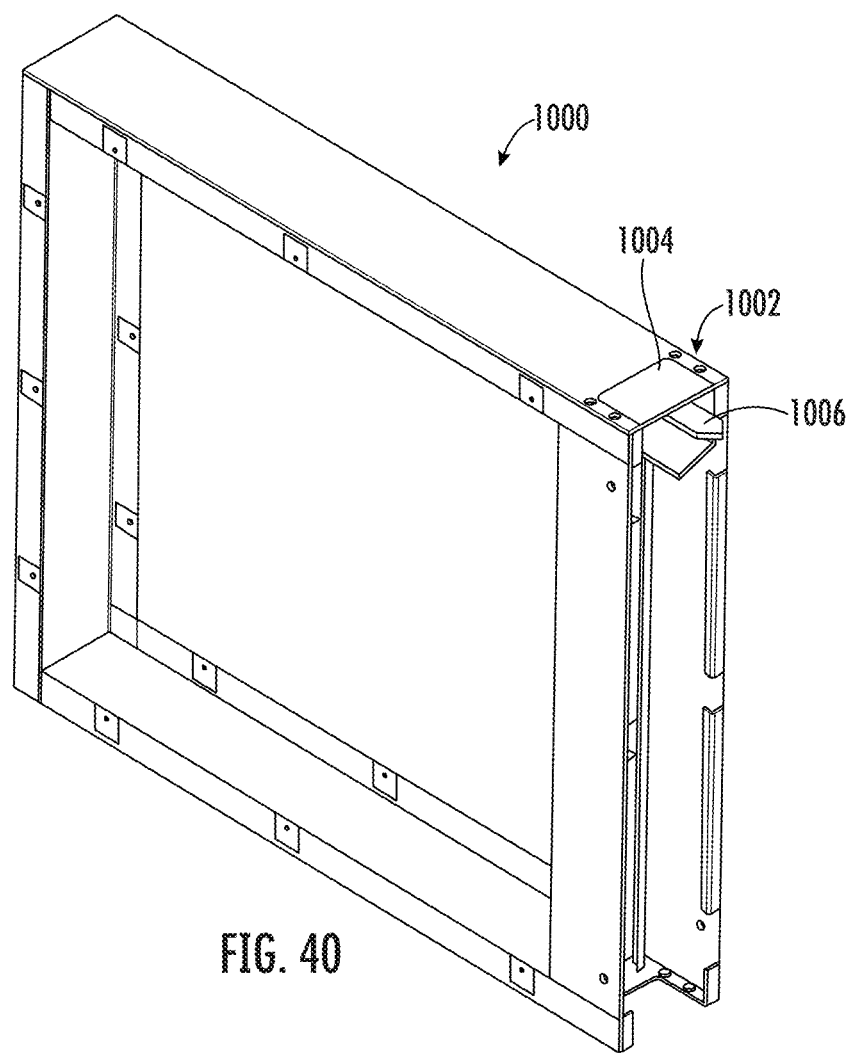
FIG. 40 is a perspective view of an air filter assembly inclusive of a cantilevered support element, according to an embodiment.
Figure 41:
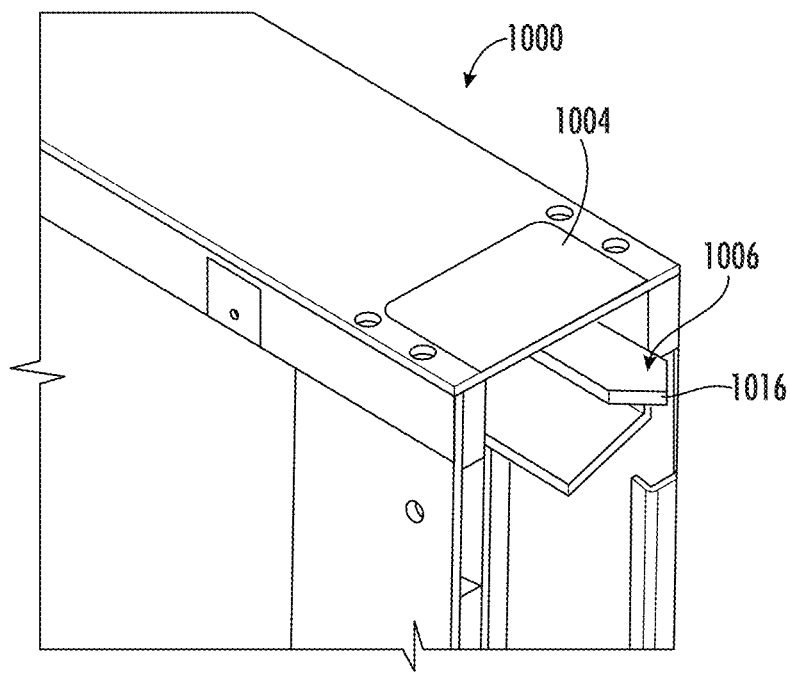
FIG. 41 is a perspective view of a rail interface portion of the air filter assembly of FIG. 40.
Figure 42:
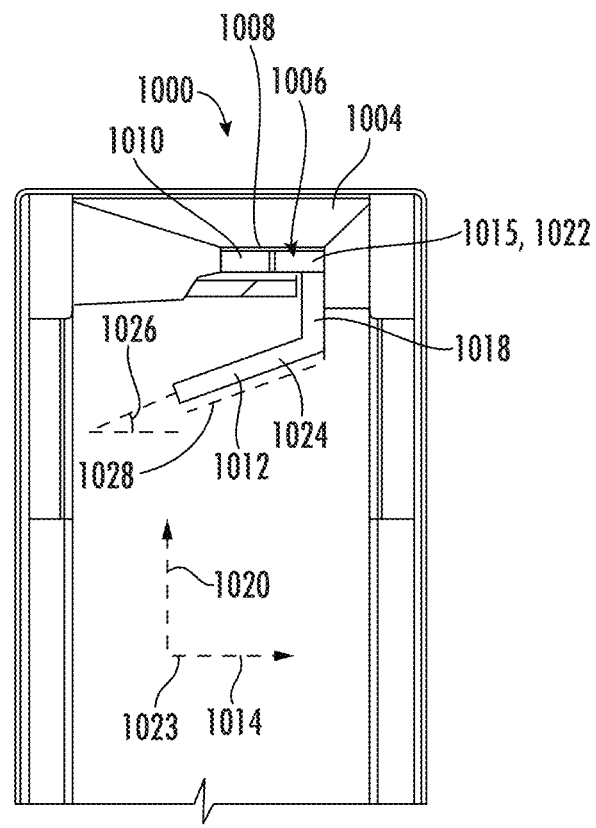
FIG. 42 is a front view of the air filter assembly of FIG. 40.

Referring to FIGS. 40-42, a rail-interface system, shown as rail system 1002, for an air cleaner assembly 1000 is shown that is configured to support an end pleat of a filter media pack at an angle without requiring an angled channel or track in a rail guide 1004 or a housing rail.

Referring to FIG. 42, the rail system 1002 includes the rail guide 1004, and a support element 1006. The rail system 1002 also includes a housing rail (not shown). The support element 1006 is configured to engage the rail guide 1004, at a funnel opening 1008 of the rail guide 1004, which guides the support element 1006 into engagement with the housing rail.

The support element 1006 includes a rail-interface element 1010 (e.g., a rail interface, an attachment element, etc.) and a media-interface element 612 (e.g., a an endcap base wall, etc.). The rail-interface element 1010 is engageable with the rail guide 1004 in a non-angled orientation with respect to the rail guide 1004 and the housing rail, so that the rail-interface element 1010 is oriented substantially parallel to a lateral direction 1014 (e.g., an airflow direction, etc.) through the filter housing. In the embodiment of FIG. 42, the rail-interface element 1010 includes a first planar portion 1015 (e.g., a first planar wall, etc.) that extends substantially parallel to the lateral direction 1014. In some embodiments, as shown in FIG. 41, the rail-interface element 1010 is tapered at a longitudinal end of the rail-interface element 1010 defining at least one V-shaped end 1016 when viewed from above (e.g., when viewed from an axial end of the filter element). Such an arrangement can facilitate alignment between a leading edge of the rail-interface element 1010 (e.g., the first planar portion, etc.) and the rail guide 1004 along the lateral direction 1014.

Referring again to FIG. 42, in some embodiments, the rail-interface element 1010 further includes a second planar portion 1018 (e.g., a second planar wall, a connecting leg, a connecting extension, etc.) that secures the first planar portion 1015 to the media-interface element 1012 and that also ensures the proper orientation of the filter element within the filter housing. In the embodiment of FIG. 42, the second planar portion 1018 extends parallel to an axial direction 1020 that is perpendicular to the lateral direction 1014. The second planar portion 1018 extends from a lateral end 1022 of the first planar portion 1015 toward the filter media pack. In some embodiments, the second planar portion 1018 is coextensive with the first planar portion 1015 and extends along an entire length of the first planar portion 1015. In the embodiment of FIG. 42, the first planar portion 1015 and the second planar portion 1018 together define an 'L' shaped structure when viewed along the longitudinal direction that is perpendicular to both the lateral direction 1014 and the axial direction 1020.

The rail guide 1004 defines a funnel opening 1008 having a cross-sectional shape that substantially matches the cross-sectional shape of the rail-interface element 1010 and is configured to guide the rail-interface element 1010 toward the housing rail. In the embodiment of FIG. 42, the funnel opening 1008 is an 'L' shaped opening that is configured to nestably engage the first planar portion 1015 and to support the first planar portion parallel to a reference plane 1023 that extends along both the lateral and longitudinal directions.

The second planar portion 1018 supports the media-interface element 1012 in a cantilevered arrangement with respect to the first planar portion 1015 so that forces/loads applied to the media-interface element 1012 transfer a rotational force to the rail-interface element 1010. In the embodiment of FIG. 42, the media-interface element 1012 includes a third planar portion 1024 (e.g., a third planar wall, etc.) that extends at an angle relative to the second planar portion 1018. The third planar portion 1024 also extends at an angle 1026 relative to the lateral direction 1014.

The media-interface element 1012 is configured to couple an end pleat 1028 of the filter media pack to the support element 1006 and to maintain the end pleat 1028 at the same angle as the media-interface element 1012. In some embodiments, the end pleat 1028 is bonded to a surface defined by a media-facing side of the media-interface element 1012 (e.g., a lower surface of the third planar portion 1024 as shown in FIG. 42), such that an end face of the end pleat 1028 is engaged with the surface. Among other benefits, such an arrangement of the support element 1006 enables installation of the rail-interface element 1010 in a non-angled orientation into the filter housing, while maintaining the end pleat 1028 in an angled orientation, which can improve overall flow performance through the air cleaner assembly 1000.

It should be appreciated that the geometry of the support element 1006 and the arrangement of the support element 1006 relative to the filter housing can be different in various embodiments. For example, referring to FIGS. 43-45, a rail system 1102 is shown that includes a rail guide 1104 defining a funnel opening 1108 that is disposed adjacent to a rear lateral end (e.g., a downstream end, etc.) of an access opening 1130 of the filter housing. Among other benefits, such an arrangement can allow for greater average pleat depth across the filter element by positioning a bend line of the end pleat of the filter media pack adjacent to the downstream end of the access opening 1130. Such an arrangement can be particularly beneficial for designs using a chamfered filter media pack design or other designs in which the pleat depth increases from the end pleat toward a central region along the filter media pack.

Figure 43:
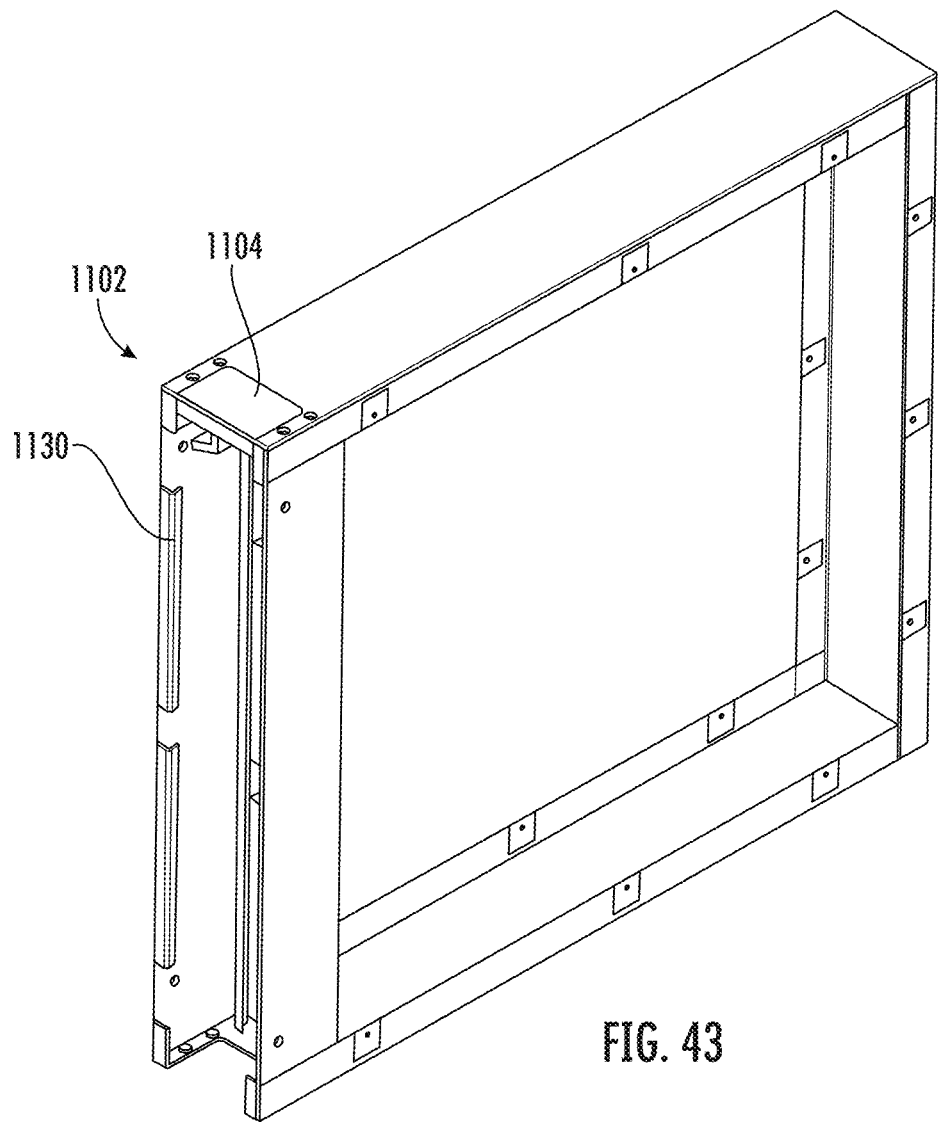
FIG. 43 is a perspective view of an air filter assembly, according to an embodiment.
Figure 44:
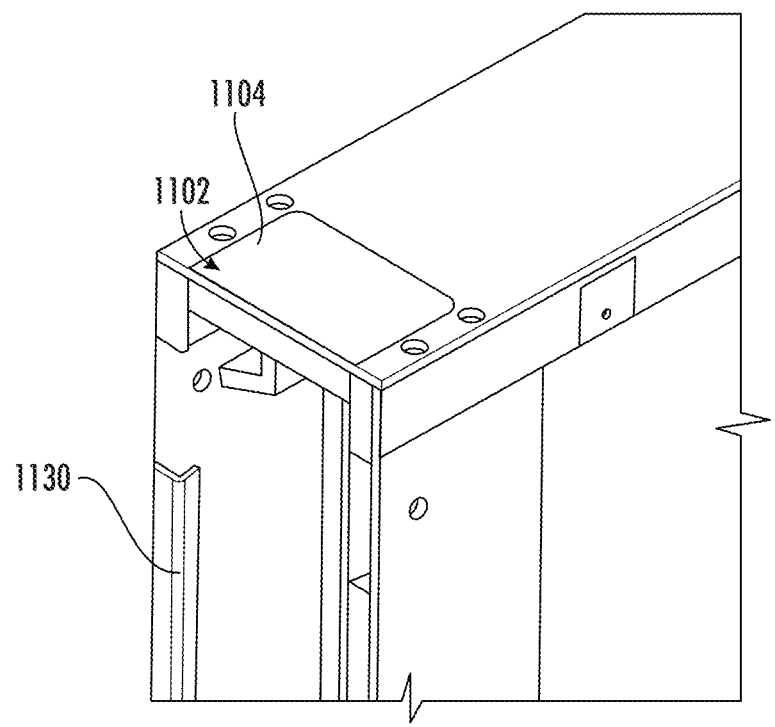
FIG. 44 is a perspective view of a rail interface portion of the air filter assembly of FIG. 43.
Figure 45:
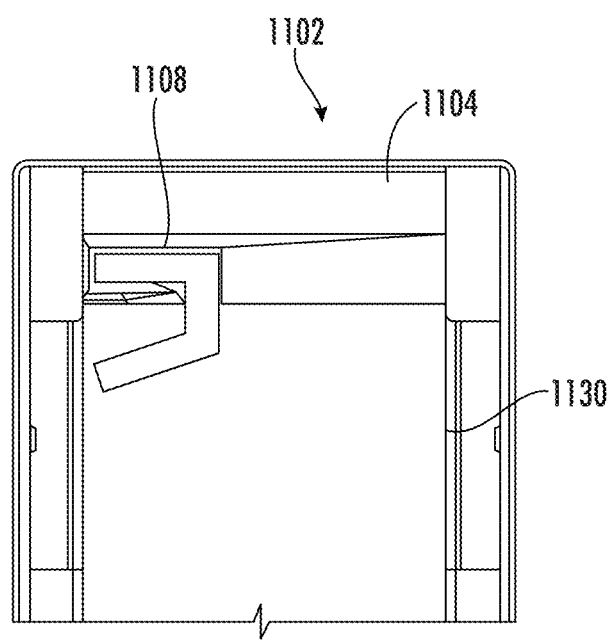
FIG. 45 is a front view of the air filter assembly of FIG. 43.
Figure 46:
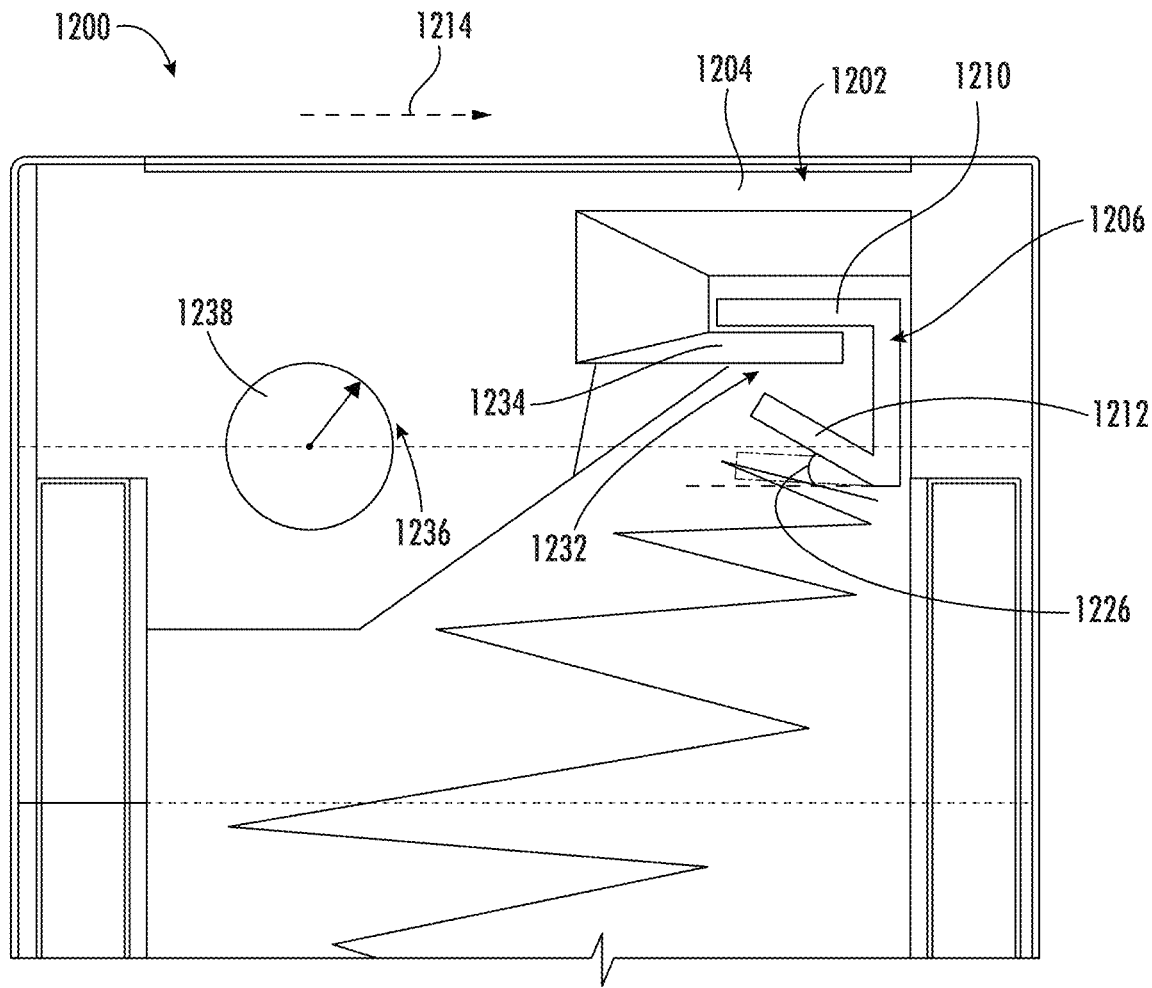
FIG. 46 is a front view of a rail system for an air filter assembly inclusive of another implementation of a cantilevered support element, according to an embodiment.

Referring to FIG. 46, a rail-interface system, shown as rail system 1202, for an air cleaner assembly 1200 is shown in which an orientation of the support element 1206 is reversed as compared with the rail system 1102 of FIGS. 43-45. A rail-interface member 1210 of the support element 1206 and a media-interface member 1212 of the support element 1206 together define a channel 1232 facing toward an upstream end of the filter housing. Such an arrangement can provide a more intuitive user interface in some applications, and can also reduce the likelihood of the support element 1206 becoming dislodged from the funnel opening 1208 during operation (e.g., as a result of moving a location at which the force is transferred along an extension flange 1234 of a rail guide 1204 to an innermost region of the extension flange 1234.

In the embodiment of FIG. 12, the filter element includes a filter media pack that is chamfered along a region adjacent to the end pleat of the filter media pack. In such embodiments, the chamfered region defines a void 1236 (e.g., an open volume, etc.) which can be used to accommodate a filter service indicator 1238 (e.g., a filter replacement dial, a pressure indicator, etc.) for the air cleaner assembly 1200. In some embodiments, the filter service indicator 1238 is supported by the rail guide 1204. In other embodiments, the filter service indicator 1238 is supported by a cover of the filter housing. In still further embodiments, the filter service indicator 1238 includes a perforated tube extending through the void 1236 parallel to the longitudinal direction across the filter housing. The perforated tube can be used to facilitate determination of static or dynamic pressure upstream of the filter element and, by occupying the void 1236, can prevent the use of non-genuine filter element designs that do not include a chamfered filter media pack.

Referring to FIG. 46, the support element 1206 is oriented at an angle 1226 relative to the lateral direction 1214 (e.g., the air flow direction, etc.) so as to maintain a media channel adjacent the end pleat in an open position, and to promote airflow therethrough. It should be understood that the angle 1226 may vary in different embodiments and depending on application requirements to ensure substantially uniform flow across the filter media pack and to reduce overall pressure drop across the air cleaner assembly 1200.

Figure 47:
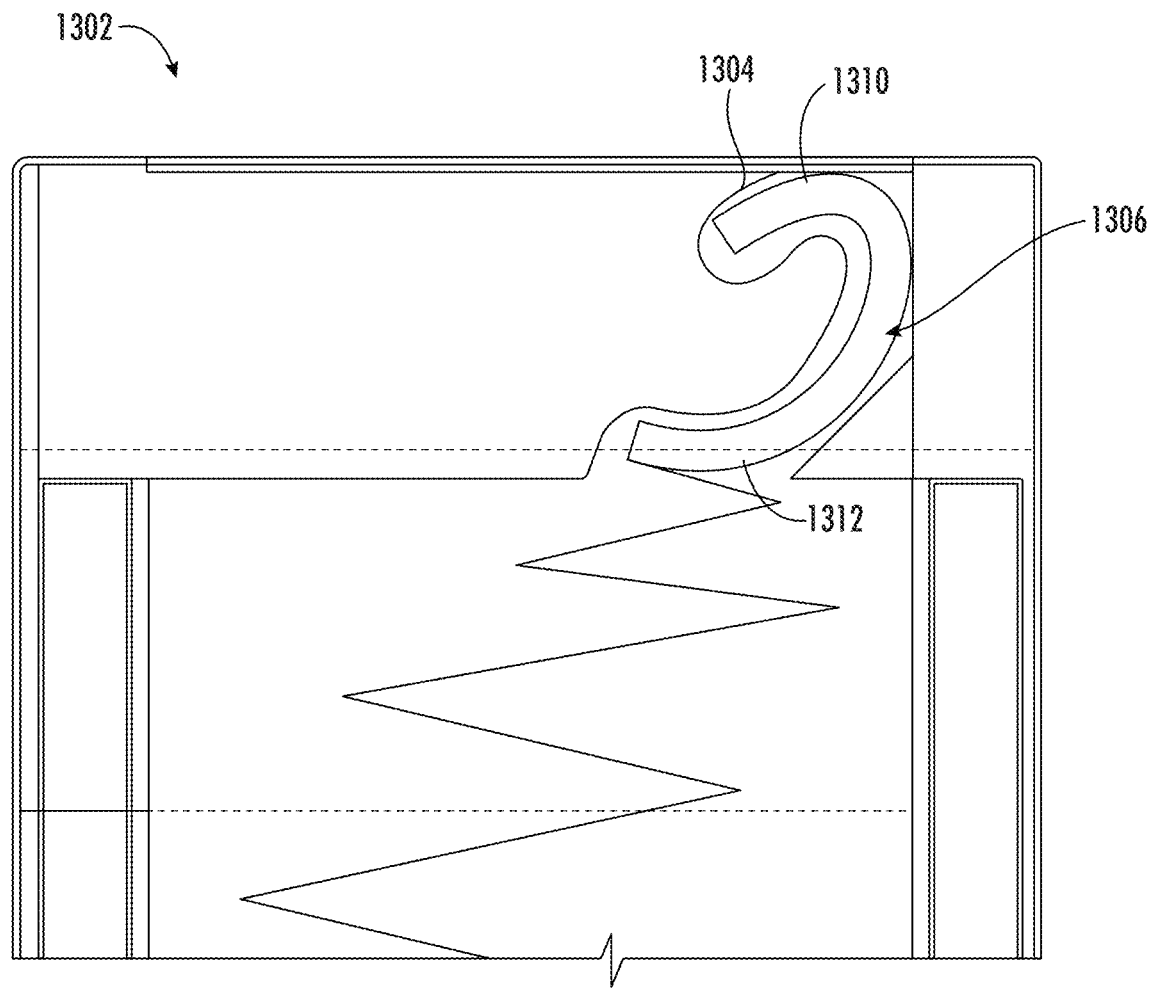
FIG. 47 is a front view of a rail system for an air filter assembly inclusive of a curved cantilevered support element, according to an embodiment.

Referring to FIG. 47, a rail-interface system, shown as rail system 1302, is shown that includes a support element 1306 having a substantially 'C' shaped profile when viewed along the longitudinal direction. The support element 1306 includes an arcuate wall having a variable radius of curvature along the 'C' shaped profile, between a rail-interface element 1310 of the support element 1306 and a media-interface element 1312 of the support element 1306. In some embodiments, the support element 1306 has a greater radius of curvature proximate to the rail-interface element 1310 than proximate to the media-interface element 1312, which can reduce the size of the support element 1306 while maintaining a smooth transition for air flow adjacent the end pleat as compared to other configurations. In the embodiment of FIG. 13, the support element 1306 defines a channel having an open end that faces toward an upstream end of the filter housing, which can increase the strength of the connection between the support element 1306 and the rail guide 1304 during operation. In other embodiments, the orientation of the support element 1306 and channel may be reversed.

In the embodiment of FIG. 47, the end pleat of the filter media pack engages the media-interface element 1312 along a curved surface that extends upwardly toward the rail guide 1304. In some embodiments, the curved surface extends to a lower edge of the rail guide 1304, which can reduce areas of flow recirculation adjacent to the rail guide 1304. It should be understood that a similar arrangement could be implemented in other embodiments disclosed herein. For example, an angled lower surface of the media-interface element 1012 of FIG. 42 could also extend to, or upwardly through a portion of the funnel opening 1008 at a lower axial edge of the rail guide 1004.

Figure 48:
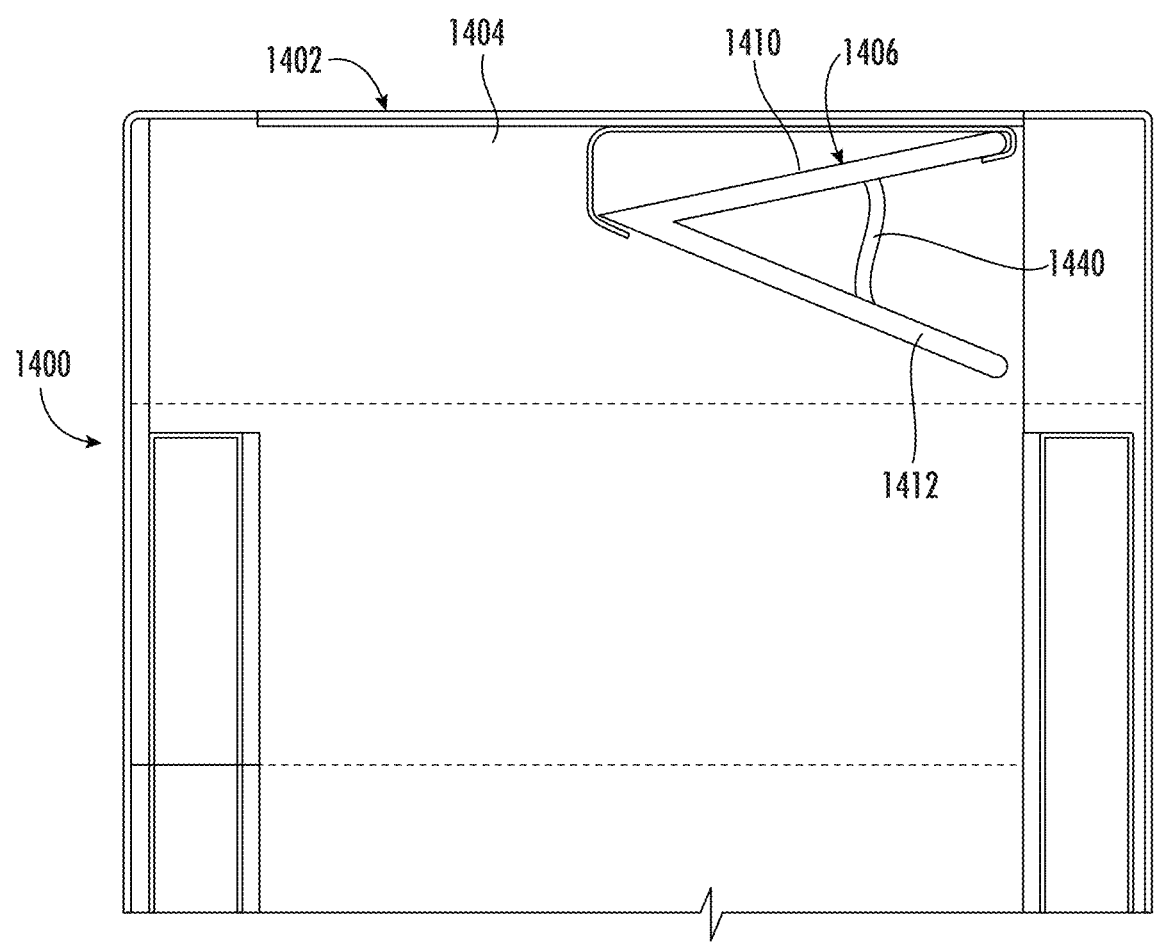
FIG. 48 is a front view of a rail system for an air filter assembly inclusive of a support element defining an installation orientation, according to an embodiment.

Referring to FIG. 48, a rail-interface system, shown as rail system 1402, is shown that includes a support element 1406 having a sharp transition along a leading edge of the support element 1406. The support element 1406 includes a rail-interface member 1410 and a media-interface member 1412 in the form of individual planar wall sections that intersect one another at an adjacent lateral end of the planar walls. Together, the rail-interface member 1410 and the media-interface member 1412 define a V-shaped cross-section when viewed along a longitudinal direction. In some embodiments, the rail-interface member 1410 and the media-interface member 1412 converge at a sharp transition and/or point along an upstream end of the support element 1406. Such an arrangement can improve flow performance of the air filter assembly 1400 by reducing areas of flow recirculation in areas upstream of the support element 1406 during operation.

In some embodiments, the support element 1406 further includes an extension element 1440 that extends between the individual planar wall sections to structurally support the support element 1406 and to prevent excessive bending of the media-interface member 1412 relative to the rail-interface member 1410.

The extension element 1440 is disposed within a channel defined between the rail-interface member 1410 and the media-interface member 1412. In some embodiments, the extension element 1440 is a planar wall section that is coupled to each of the media-interface member 1412 and the rail-interface member 1410, such as at a mid-point location between opposing lateral ends of each of the media-interface member 1412 and the rail-interface member 1410. In such embodiments, the rail-interface member 1410, the media-interface member 1412, and the extension element 1440 together define a substantially 'A' shaped cross-section when viewed along the longitudinal direction. In other embodiments, the extension element 1440 includes a plurality of ribs extending between the rail-interface member 1410 and the media-interface member 1412. In yet other embodiments, a thickness of the support element 1406 at the intersection between the rail-interface member 1410 and the media-interface member 1412 is greater than a thickness of other portions of the support element 1406.

The rail guide 1404 and housing rail are configured to maintain the support element 1406 at an angle relative to a lateral direction (e.g., an air flow direction) through the filter housing during operation. In some embodiments, as shown in FIG. 48, the rail guide 1404 and/or housing rail engage the support element 1406 at the sharp transition (e.g., at a proximal end of the rail-interface member 1410) and at a distal end (e.g., an outer end, etc.) of the rail-interface member 1410 opposite from the sharp transition. In other embodiments, the angle formed between the rail-interface member 1410 and the media-interface member 1412 may be adjusted to support the rail-interface member 1410 parallel to the lateral direction (e.g., parallel to an upper wall of the housing), which can reduce void volume between the rail-interface member 1410 and the housing, and thereby further reduce pressure drop across the support element 1406.

Figure 49:
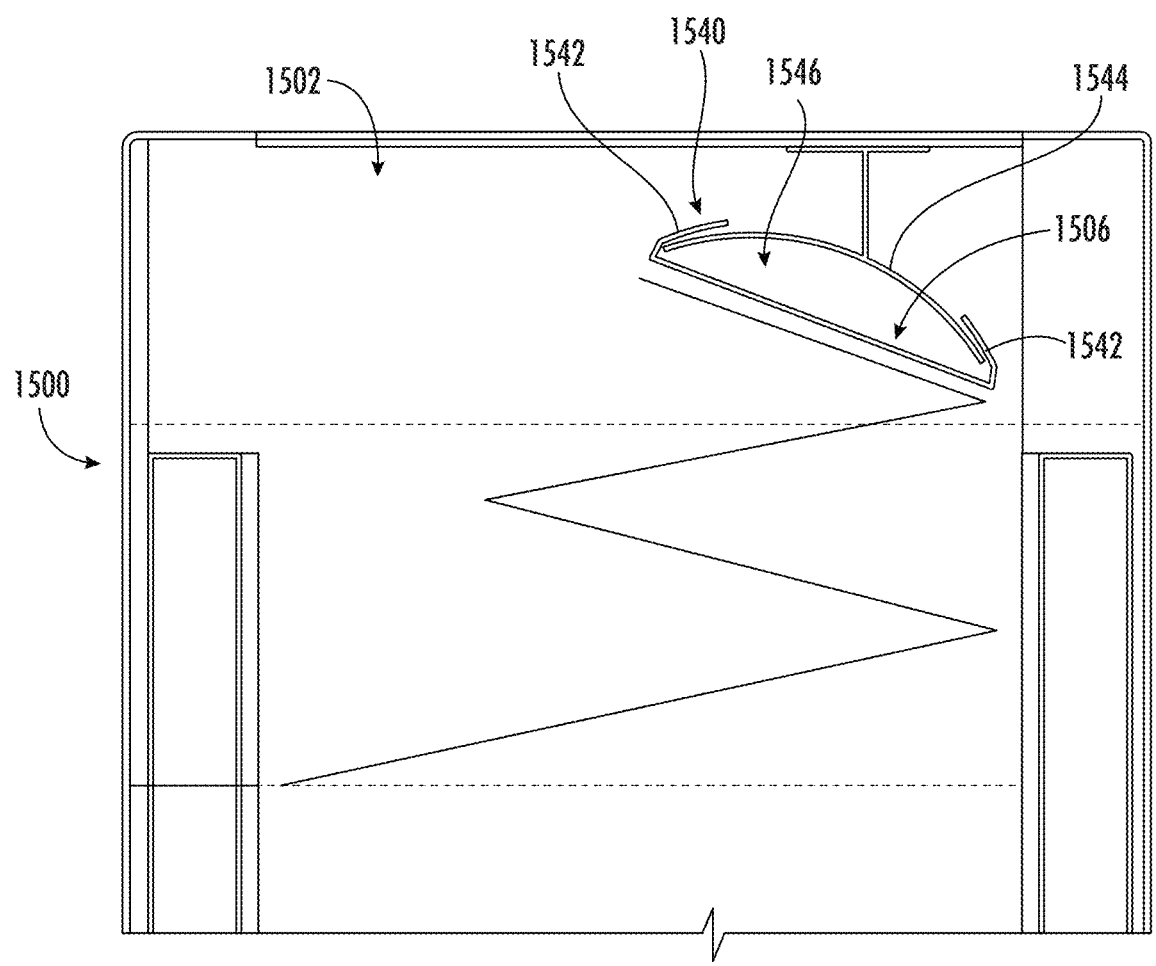
FIG. 49 is a front view of a rail system for an air filter assembly inclusive of a support element having a snap and slide connection arrangement, according to an embodiment.

Referring to FIG. 49, a rail-interface system, shown as rail system 1500, is shown that includes multiple rail-interface features to support the filter element within the filter housing. The rail system 1500 includes a first interface 1540 that facilitates installation, and removal of a support element 1506 from the filter housing. In the embodiment of FIG. 49, at least one support element 1506 of the filter element includes a pair of rail legs 1542 (e.g., rail latches, etc.) that are curved or bowed inwardly toward one another along the lateral direction so that a width of a gap between the pair of rail legs 1542 is smallest at a distal end (e.g., an outer end, etc.) of the rail legs 1542. Each of the rail legs 1542 defines a convex surface facing inwardly toward one another. The rail legs 1542 together define a clip member that is configured to clip (e.g., snap, latch, etc.) or otherwise grab onto a housing rail 1544 to slidably engage the support element 1506 along a first direction and to allow movement of the support element 1506 relative to the housing rail 1544 along a second direction (e.g., the longitudinal direction, an installation direction, etc.).

The housing rail 1544 is configured to nestably engage the rail legs 1542 to slidably engage the support element 1506 with the housing rail 1544. In some embodiments, the housing rail 1544 includes an elongated arcuate wall that extends in a longitudinal direction along the entire length of the filter housing. In the embodiment of FIG. 49, the elongated arcuate wall has a cross-sectional shape when viewed along the longitudinal direction that corresponds with the shape defined by the rail legs 1542, so that the elongated arcuate wall is nestably received within a channel 1546 defined between the rail legs 1542. In the embodiment of FIG. 49, the arcuate wall has an approximately uniform radius of curvature along its length. In other embodiments, the radius of curvature may vary across the arcuate wall.

In some embodiments, the rail system 1502 further includes a rail guide that is configured to facilitate alignment between the support element 1506 and the housing rail 1544 during installation operations. The combination of the rail guide and the first interface 1540 can simplify installation operations and can improve sealing due to the more tortuous air flow path across the first interface 1540.

The arrangement of the first interface can be different in various embodiments. For example, referring to FIG. 50, another example rail system 1602 for an air filter assembly 1600 is shown that includes a snap-fit interface 1640. The snap-fit interface 1640 has a similar design as the first interface described with respect to FIG. 49. However, the locations of the rail legs 1642 and the housing rail are reversed so that the rail legs 1642 are defined by the support element 1606 and a rail member 1644 is defined by the support element 1606. Additionally, in the embodiment of FIG. 50, a width of the channel formed between the pair of rail legs 1642 is less than that used in the design of FIG. 49.

Figure 50:
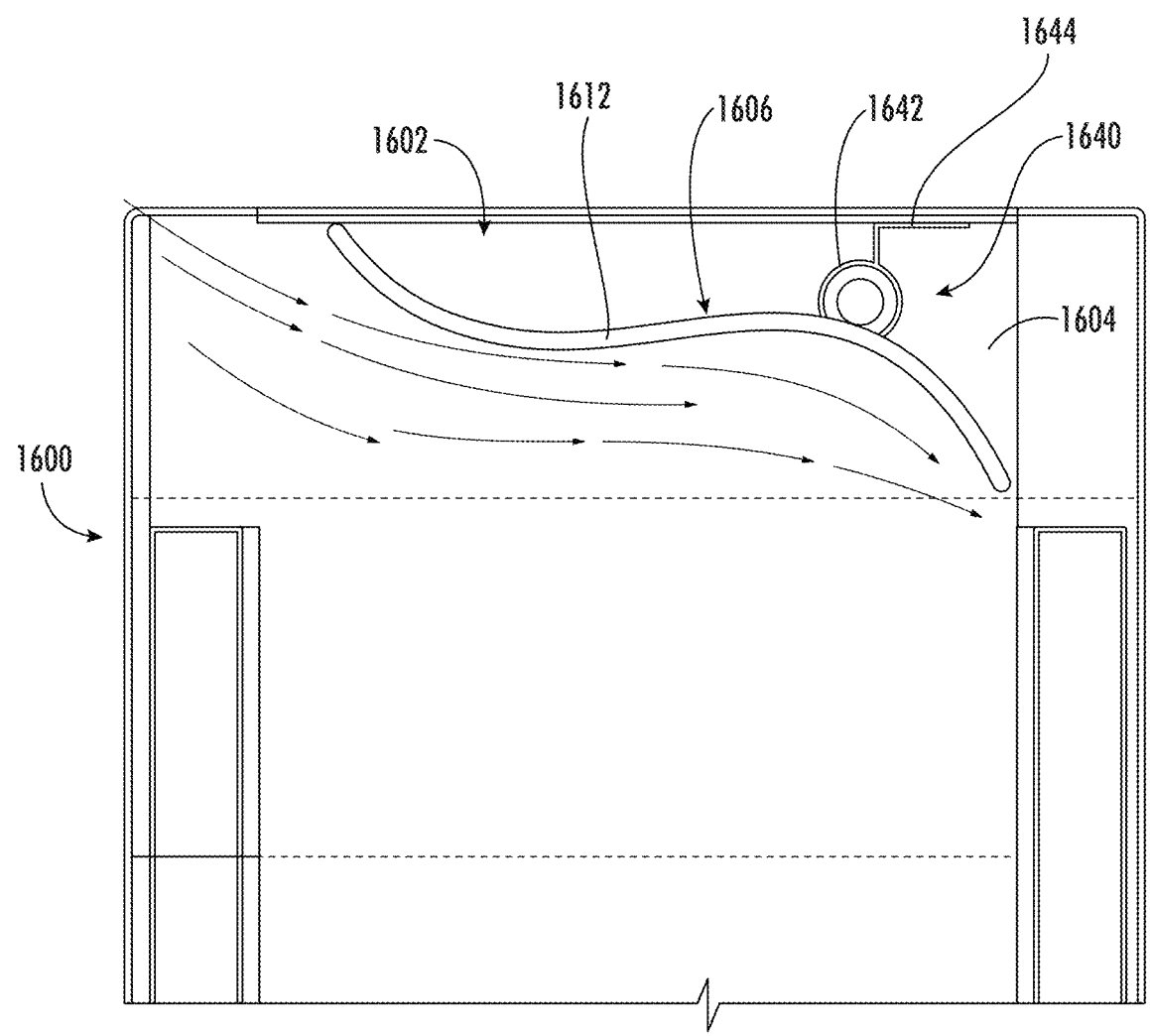
FIG. 50 is a front view of a rail system for an air filter assembly inclusive of another implementation of a support element having a snap and slide connection arrangement, according to an embodiment.

In the embodiment of FIG. 50, the rail member 1644 has a rounded outer end defining a club shape of approximately constant outer radius when viewed normal to the access opening. In some embodiments, the rail member 1644 is at least partially formed as an elongated cylindrical rail having uniform cross-section along the entire longitudinal length of the support element 1606. In other embodiments, a cross-sectional shape of the rail member 1644 may be different. For example, the rail member 1644 may be elliptical, or another shape having a curved outer perimeter.

A method of installing the rail legs 1642 into the rail member 1644 includes pressing the support element 1606 upwardly (e.g., substantially axially) against the rail legs 1642 along a first direction to slidably engage the support element 1606 with the housing rail along a second direction that is perpendicular to the first direction. The upward force causes the rail legs 1642 to bend or otherwise deform away from one another and nestably engage the rail member 1644. In some embodiments, the method further includes sliding the support element 1606 along the second direction and through a rail guide 1604 defining a funnel opening having a shape that corresponds with a cross-sectional shape of other portions of the support element 1606, such as a media-interface element 1612 of the support element 1606.

Among other benefits, the design of the support elements described with reference to FIGS. 49 and 50 enable the use of various different geometries for the media-interface element. In the embodiment of FIG. 50, the design of the media-interface element 1612 is substantially the same as the design of the connecting member 256 described with reference to FIGS. 2-8 and FIGS. 11-20. The media-interface element 1612 includes a convex portion extending in a lateral direction from a first lateral end of the support element 1606, and a concave portion extending laterally away from the concave portion to a second lateral end of the support element 1606. In some embodiments, as shown in FIG. 50, a lateral end of the support element 1606 on an upstream side of the filter element, may be configured to engage an upper wall of the filter housing when installed within the filter housing. Such an arrangement reduces areas of flow recirculation along the upper wall and directs the flow toward an end of the filter media pack that is adjacent the support element 1606. It should be appreciated that the profile of the media-interface element 1612 may be different in various embodiments.

In some embodiments, the filter assembly includes a support member that is configured to support at least a portion of the filter media pack of the filter element in a non-perpendicular orientation relative to a flow direction through the filter housing (e.g., in a curved position and/or in a position providing support to angled and/or non-parallel faces of the filter media pack, such that at least a portion of the filter media pack protrudes along the flow direction, etc.) within an interior cavity of the filter housing. For example, the filter housing may include an arcuate support member that extends between opposing ends of the frame and protrudes, along a central portion of the arcuate support member, into the interior cavity to support the inlet and/or outlet faces of the filer media pack in a curved shape along the flow direction through the filter housing.

Figure 51:
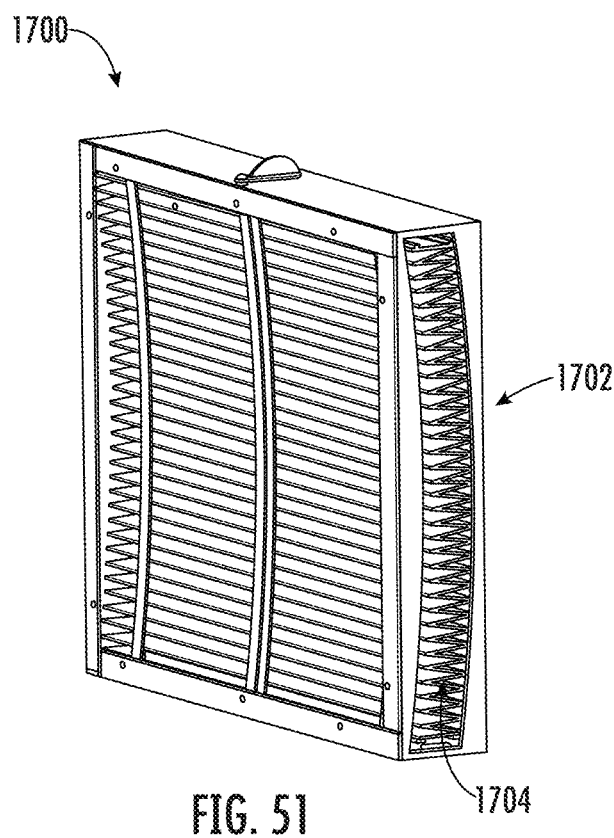
FIG. 51 is a perspective view of a filter assembly inclusive of a filter housing having a curved inlet opening and an arcuate support, according to an embodiment.
Figure 52:
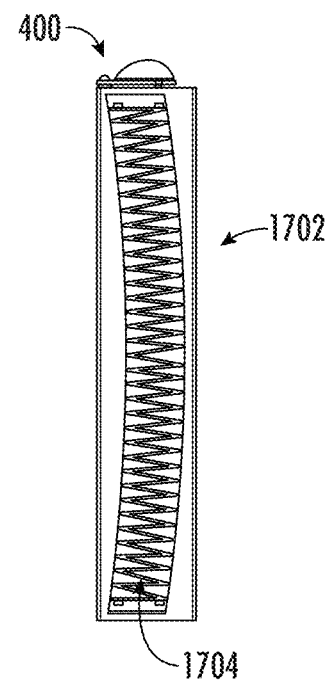
FIG. 52 is a side view of the filter assembly of FIG. 51.

Referring to FIGS. 51-52, a filter assembly 1700 is shown that includes, or is adapted to support, a curved filter element and/or a filter element having a filter media pack with angled and/or non-parallel faces, according to an embodiment. The filter assembly 1700 includes a filter housing 1702 and a filter element 1704 coupled to the filter housing 1702. The filter assembly 1700 may be part of an HVAC system as described above with respect to FIG. 1. For example, the filter assembly 1700 may be configured for use in a residential or commercial building, such as an apartment, an office building, a house, or another building type. The filter assembly 1700 may be disposed along ductwork of the HVAC system, between a heating and/or cooling element and an inlet air duct that is configured to supply air to the heating and/or cooling element. The inlet air duct may be coupled to a vent line that fluidly couples the HVAC system with an environment surrounding the building, and/or a return line that is configured to recirculate air from within the building to the heating and/or cooling element. The heating and/or cooling element may include a furnace, an air conditioner, a dehumidifier, or another piece of air quality and/or conditioning equipment.

In some embodiments, the filter housing may be directly coupled to an inlet of the heating and/or cooling element of the HVAC system. In other embodiments, the filter housing may be disposed in an area of the inlet air duct that is spaced apart from the heating and/or cooling element. In other embodiments, the filter housing may be disposed in another location of the HVAC system, such as at an opening of a vent line for the HVAC system, a return grill location(s) in which air from a space within the building is returned to the HVAC system, or any other location at which a source of clean, filtered air is desired.

The filter housing 1702 of FIGS. 51-52 is configured to house the filter element 1704 therein, and to facilitate installation of the filter element 1704 into the filter housing 1702, and removal therefrom. Referring to FIGS. 53-54, another example filter housing 1802 is shown that is similar to the filter housing 102 of FIGS. 51-52. The filter housing 1802 includes a frame 1806, and a plurality of sidewalls 1808 coupled to the frame 1806. The sidewalls 1808 enclose at least three sides of the frame 1806, including a lower side (e.g., horizontally-oriented side, a floor of the filter housing 1802, etc.), a lateral side extending perpendicular to a flow direction 1810 through the filter housing 1802 (e.g., a vertically-oriented side), and an upper side that is spaced vertically apart from, and oriented parallel to, the lower side. Together, the frame 1806 and the plurality of sidewalls 1808 define an interior cavity 1812 that is sized to receive a filter element therein, such as the filter element 1704 shown in FIGS. 51-52. The frame 1806 and the plurality of sidewalls 1808 further define an inlet opening 1814 at a first lateral end 1816 of the interior cavity 1812, and an outlet opening 1818 at a second lateral end 1820 of the interior cavity 1812 opposite the first lateral end 1816.

In some embodiments, the inlet opening 1814 is fluidly coupled to the inlet air duct and the outlet opening 1818 is fluidly coupled to the heating and/or cooling element of the HVAC system. In other embodiments, the orientation of the inlet opening 1814 and the outlet opening 1818 may be reversed (e.g., the inlet opening 1814 may be arranged as the outlet opening 1818 for the filter assembly, etc.). The frame 1806 and the plurality of sidewalls 1808 also define an access opening 1822 at a longitudinal end 1823 of the interior cavity 1812 that is configured to receive a filter element therethrough.

During installation of the filter element into the filter housing 1802, a user inserts a longitudinal end of the filter element into the access opening 1822, engaging a frame element(s) with a frame support 1825 within the filter housing 1802, which secures the filter element within the interior cavity 1812. Referring to FIG. 54, in some embodiments, the frame support 1825 includes a track(s) (e.g., a housing rail, etc.) that extends along an upper or lower sidewall of the filter housing 1802 along a longitudinal direction between opposing longitudinal ends of the filter housing 1802. The track(s) may include ridges or another filter frame interface that engages with frame element(s) (e.g., the support element, etc.) to allow alignment between the filter element and the filter housing 1802, and to guide insertion of the filter element along the longitudinal direction into the interior cavity 1812.

The filter housing 1802 is configured to support the filter element in a curved orientation in which at least one of an inlet face or an outlet face of a filter media pack of the filter element (e.g., the inlet face and/or the outlet face) is curved along a flow direction through the filter housing 1802. In other embodiments, the filter housing 1802 is configured to support the filter element or portions thereof in an angled orientation (e.g., non-perpendicular to the flow direction). In yet other embodiments, the filter housing 1802 is configured to support various faces of a filter element (e.g., faces of the filter media pack, etc.) that are oriented at different angled with respect to the flow direction (e.g., non-parallel faces of the filter element, etc.). In the embodiment of FIG. 54, the filter housing 1802 includes an arcuate support member that is coupled to the frame 1806. The arcuate support member extends between opposing ends of the frame 1806 (e.g., opposing lateral ends, opposing longitudinal ends, etc.) and protrudes from the frame 1806 and/or sidewalls 1808 into the interior cavity 1812.

For example, referring to FIGS. 53-54, the arcuate support member incudes the access opening 1822. The access opening 1822 has a curved (e.g., arcuate, etc.) shape when viewed normal to the access opening 1822. The access opening 1822 is shaped to correspond with (e.g., match, etc.) a cross-sectional shape of the filter element. The access opening 1822 is at least partially defined by a longitudinal sidewall of the filter housing 1802 and includes a first edge 1826 extending between the upper and lower sidewalls of the filter housing 1802, a second edge 1828 offset from the first arcuate edge 1826 along the flow direction. The first arcuate edge 1826 and the second arcuate edge 1828 are arcuate edges have matching radius of curvature along their length between the upper and lower sidewalls of the filter housing 1802. The first edge 1826 and the second edge 1828 are connected along substantially linear edges (e.g., extending substantially parallel to the flow direction through the filter housing 1802) proximate to the upper and lower sidewalls of the filter housing 1802.

In other embodiments, the geometry of the access opening 1822 may be different. For example, in some embodiments, only one of the first edge 1826 and the second edge 1828 is an arcuate edge. In other embodiments, the radius of curvature of the first edge 1826 and/or the second edge 1828 may different. In some embodiments, the connecting edges between the first edge 1826 and the second edge 1828 are oriented at an angle relative to the flow direction through the filter housing 1802.

Among other benefits, the geometry of the access opening 1822 prevents the use non-genuine filter elements within the filter housing 1802, which may have reduced performance relative to genuine filter element designs. The access opening 1822 may also support the filter element in a curved orientation within the filter housing 1802, which can improve flow performance and dust holding capacity of the filter element, as will be further described.

In some embodiments, as shown in FIG. 51, the acuate support member includes an arcuate shaft 1728 that is engaged with the inlet face and/or outlet face of the filter media pack to support the media pack in a curved orientation within the interior cavity. The shaft 1728 is coupled to the filter housing 1702 at opposing ends of the filter housing 1702. The shaft 1728 may be coupled to frame members that extend between the sidewalls and support the sidewalls. In other embodiments, the shaft 1728 may be directly coupled to the sidewalls, or a combination of the frame and the sidewalls.

The arcuate shaft 1728 is curved along the flow direction and protrudes into the interior cavity 1712 between opposing ends of the shaft 1728. Still referring to FIG. 51, the shaft 1728 may have a radius of curvature that is equal to a radius of curvature of at least one of the first edge 1726 or the second edge 1727 of the access opening 1722.

In some embodiments, the arcuate shaft 1728 is moveable within the filter housing 1702 to engage the filter element 1704. The arcuate shaft 1728 may be configured to deform or otherwise reposition the filter element 1704 into a curved orientation. For example, the arcuate shaft 1728 may be configured to press against a central portion of the filter media pack to move the central portion relative to the ends of the filter media pack, or otherwise expand the filter media pack along the flow direction through the filter housing 1702.

For example, referring to FIGS. 55-56, the arcuate shaft 1728 or other arcuate support member of the filter housing 1702 may be rotatably coupled to the frame 1706 and may be configured to rotate relative to the frame 1706 between a first position 1730 (a disengaged position as shown in FIG. 55) in which the arcuate support member is substantially flush with and/or parallel to the inlet opening (or outlet opening), and a second position 1732 (e.g., an engaged position as shown in FIG. 56) that is rotationally offset from the first position 1730 in which the arcuate support member protrudes or otherwise extends into the interior cavity 1712 from the inlet opening (or outlet opening) of the filter housing 1702. In the first position 1730, the arcuate support member (e.g., the arcuate shaft 1728 of FIGS. 55-56) is spaced apart from the filter media pack. In the second position 1732, the arcuate support member engages the filter media pack, along at least a portion of the inlet face or outlet face of the media pack, to support the filter media pack in the curved or arched orientation. In some embodiments, the arcuate shaft 1728 may be configured to cause movement of a central portion of the filter element 1704 after installation of the filter element 1704 into the filter housing 1702 (e.g., to press or otherwise form the filter element 1704 into a curved shape).

While the support member is described in various embodiments herein as being an arcuate support member, it should be appreciated that other shapes for the support member may be used in other embodiments to support curved, angled, and/or non-parallel faces of the filter media pack within the filter housing 1702. For example, in some embodiments, the support member may include a shaft having angled portions and/or that is otherwise non-linear along its length so that the support member protrudes along a flow direction through the filter housing 1702.

In some embodiments, the filter housing 1702 includes a cam, knob, lever, or other mechanical actuator that is operatively coupled to the arcuate support member and that enables a user to reposition the arcuate support member from outside of the filter housing 1702. Referring to FIGS. 55-56, the cam may include a rotatable knob 1736 that is coupled to the arcuate shaft 1728 through an opening in the upper sidewall of the filter housing 1702. The rotatable knob 1736 may be rotated by a user from outside of the filter housing 1702 between the first position 1730 and the second position 1732 to engage the shaft 1728 with the filter element 1704. The filter housing 1702 may include detents or another mechanical interface that engages the knob 1736 in the second position 1732 after actuation and maintain engagement between the shaft 1728 and the filter element 1704. In other embodiments, the filter housing 1702 and/or knob 1736 may include another feature to maintain engagement between the shaft 1728 and the filter element 1704 after actuation.

The size and geometry of the arcuate support member may be different in various embodiments. For example, the support member may be an extension piece that extends away from a shaft. In other embodiments, the support member is a protrusion coupled to a central portion of a linear shaft that is rotatably coupled to the filter housing 1702. In other embodiments, support member may be slidably engaged with the filter housing 1702 and may be pushed against the filter element 1704 by moving a knob or another mechanical actuator along a flow direction through the filter housing 1702. In yet other embodiments, the filter assembly may include an electromechanical actuator that is configured to cause movement of the arcuate support member automatically in response to control signals from a user input device.

Referring still to FIGS. 55-56, a method of installing the filter element 1704 into the filter housing 1702 includes aligning the filter element 1704 with an opening of the filter housing 102. For example, the method may include aligning a longitudinal end of the filter media pack with the access opening 1722 in the filter housing 1702. The method may include engaging a frame element (e.g., the support element, etc.) of the filter element 1704 with a frame support (e.g., a track(s) of a housing rail, a guide, etc.) that extends in a longitudinal direction away from the access opening 1722 along an upper or lower sidewall of the filter housing 1702. The method may include positioning a portion of the frame element within the frame support to slidably couple the frame element to the frame support, and inserting the filter element into the interior cavity 1712 by sliding the frame element along the frame support.

The method may further include engaging at least one of an inlet face and an outlet face of the filter element 1704 with an arcuate support element of the filter housing 1702 so that at least a portion of the media pack is curved along a flow direction (e.g., a lateral direction) through the filter housing. Referring to FIG. 56, engaging the filter element 1704 with the arcuate support member may include moving (e.g., rotating, etc.) the rotatable knob 1736 or another mechanical actuator that is operatively coupled to the arcuate support member to rotate or otherwise move the arcuate support member into engagement with the filter media pack of the filter element 1704 (e.g., to move the arcuate support member from the first position to a second position that is rotatably offset from the first position, and in which the arcuate support member engages the filter media pack).

In other embodiments, the method includes automatically engaging the arcuate support member with the filter media pack in response to insertion of the filter element 1704 into the filter housing 1702. For example, the method may include sliding or otherwise inserting the filter element 1704 into an opening of the filter housing 1702, and engaging a portion of the filter element with a cam, lever, or another mechanical actuator that is operatively coupled to the arcuate support member to rotate or otherwise move the arcuate support member into engagement with the filter media pack of the filter element 1704. The method may include engaging an endcap (e.g., an end plate, a frame element, a frame support, a side cover, a frame member, etc.) of the filter element 1704 with the cam/lever. The method may include deforming or otherwise expanding a portion of the filter element into a curved or arched shape by rotating or otherwise moving the arcuate support member to apply pressure to the filter element 1704.

The filter element 1704 is a curved filter element having a media pack that is curved along a flow direction therethrough. Referring to FIG. 55, the filter element 1704 includes a first frame element 1738 (e.g., a first support element, etc.), a second frame element 1740 (e.g., a second support element, etc.), a filter media pack 1742, and at least one media support element 1744. In other embodiments, the filter element 1704 may include additional, fewer, and/or different components.

The second frame element 1740 may be substantially similar to (e.g., identical to, etc.) the first frame element 1738. The first frame element 1738 includes a base 1751, and a plurality of connecting elements 1753 extending away from the base 1751. The base 1751 may include a panel that is coupled to, and extends across, an end of the filter media pack 1742. The base 1751 may be bonded to the media pack 1742 via an adhesive material, or otherwise sealingly engaged to the media pack 1742 to prevent flow bypass between the base 1751 and the media pack 1742.

The plurality of connecting elements 1753 are configured to couple the first frame element 138 with a frame support (e.g., a housing rail, etc.) disposed on the filter housing 1702. The plurality of connecting elements 1753 may include track elements or extension pieces that are configured to engage with a track(s) or guide(s) in the filter housing 1702. In some embodiments, the plurality of connecting elements 1753 are integrally formed with the base 1751 as a monolithic piece (e.g., from a single piece of material, such as by injection molding or another suitable operation).

The media pack 1742 is coupled to and extends between the first frame element 1738 and the second frame element 1740. The media pack 1742 is formed from a pleated filter media 1749. The media pack 1742 may include a collapsible extended surface pleated media (CESPM) filter that is shipped to an end user in a collapsed state—in which the pleats of the filter media are pressed together to reduce the overall package size of the filter element 1704—and is expanded by a user prior to installation in the filter housing 1702. The filter element 1704 may then be expanded by separating opposing filter frame elements to expose channels between pleats of the filter media 1749. The filter media 1749 may be a fibrous filter media made from a mat of synthetic fibers. In other embodiments, the filter media 1749 may be made from another filter media material including, but not limited to, synthetic fiber non-woven sheets, glass fiber non-woven sheets, combined synthetic and glass fiber non-woven sheets, natural fiber non-woven sheets, or combinations thereof. In other embodiments, the filter media 1749 may be made from another type of filtration material.

Referring to FIGS. 57-58, the media pack 1742 is formed in an arch shape to increase surface area along a flow direction through the filter housing 1702. The media pack 1742 includes filter media 1749 that is pleated or folded back onto itself in an accordion pattern/shape. The filter media 1749 is folded along a first plurality of bend lines 1746 and a second plurality of bend lines 1748. The first plurality of bend lines 1746 and the second plurality of bend lines 1748 extend linearly along the filter media 1749 and are oriented substantially parallel to one another. The second plurality of bend lines 1748 is disposed in alternating arrangement with the first plurality of bend lines 1746. The first plurality of bend lines 1746 and the second plurality of bend lines 1748 are spaced in approximately equal intervals across a surface of the filter media 1749.

The filter media pack 1742 includes substantially linear wall segments 1743 of filter media extending between adjacent ones of the first plurality of bend lines 1746 and the second plurality of bend lines 1748. The plurality of wall segments 1743 define a plurality of channels 1747 that each extend between lateral ends (e.g., horizontally in FIG. 58) of the filter media 1749. The channels 1747 define 'V' shaped openings at lateral ends of the filter media pack 1742.

Referring to FIG. 58, the first plurality of bend lines 1746 together define an inlet face 1750 (e.g., an inlet surface, a first surface, etc.) of the filter media pack 1742. The second plurality of bend lines 1748 together define an outlet face 1752 (e.g., an outlet surface, a second surface, etc.) of the filter media pack 1742. The inlet face 1750 and the outlet face 1752 each include a reference surface passing through one of the first plurality of bend lines 1746 or the second plurality of bend lines 1748 and through which flow enters or exits the filter media 1749 along the flow direction through the filter housing 1702.

Still referring to FIG. 58, the outlet face 1752 is spaced apart from the inlet face 1750 along the flow direction through the filter media pack 1742. The inlet face 150 and the outlet face 152 are each curved along the flow direction, into an arch shape when viewed along a cross-section taken normal to the flow direction. The inlet face 1750 has a first radius of curvature 1754 that is approximately equal to a second radius of curvature 1756 of the outlet face 1752. In other embodiments, the shape of the inlet face 1750 and/or the outlet face 1752 may be different.

The inlet face 1750 and the outlet face 1752 extend between pleats and/or wall segments 1745 of the filter media pack 1742 at opposing ends of the filter media pack 1742. For example, the inlet face 1750 and/or outlet face 1752 may extend between opposing upper and lower ends of the filter media pack 1742 at which the filter media pack 1742 engages the first frame element 1738 and the second frame element 1740 as shown in FIG. 55. In some embodiments, the wall segments 1745 at the upper and/or lower ends of the filter media pack 1742 are oriented substantially parallel to the flow direction through the filter media pack 1742.

Figure 59:
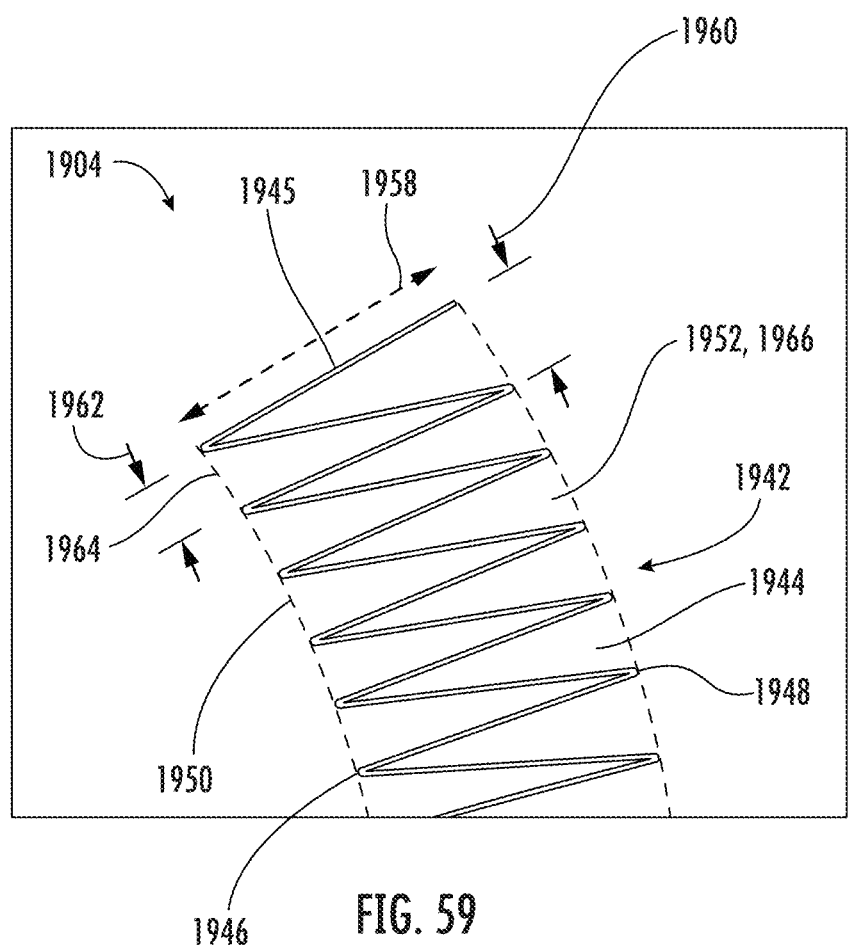
FIG. 59 is a side view of another curved filter element that can be used with the filter assembly of FIG. 51.

Referring to FIG. 59, in some embodiments, the wall segments 1945 at the upper and/or lower ends of the filter media pack 1942 (e.g., at the axial ends of the filter media pack 1942) are angled relative to the flow direction through the filter media pack 1942, which can increase pleat separation at the ends of the filter media pack 1942 (e.g., a distance of separation between adjacent ones of the first plurality of bend lines 1946 or the second plurality of bend lines 1948 proximate to the upper and/or lower ends of the filter media pack 1942). Among other benefits, such an arrangement can increase flow area and reduce pressure drop through the filter media pack 1942 by increasing the effective surface area of the filter media 1949 that is exposed to air flow through the filter housing. In some embodiments, the wall segments 1945 at the upper and/or lower ends of the filter media pack 1942 are angled relative to the flow direction to maintain approximately uniform spacing between plates along the inlet face 1950 and/or outlet face 1952 of the filter media pack 1942.

Among other benefits, curving, bowing, arching, or otherwise expanding at least a portion of the inlet face and/or the outlet face of the filter media pack along the flow direction provides greater surface area of filter media without increasing the cross-sectional size of the filter housing. The arches (e.g., curved lines) formed by the inlet face and the outlet face have greater length than a straight-line distance between upper and lower ends of the filter housing, resulting in greater filter media surface area and volume while maintaining similar pleat separation as compared to a rectangular media pack design. Additionally, the curved profile of the outlet face reduces filter media volume by maintaining approximately uniform separation between the inlet face and the outlet face across the surface of the filter media pack.

Still referring to FIG. 59, the media support element(s) 1944 is configured to maintain at least a portion of the inlet face of the filter media pack 1942 and/or the outlet face of the filter media pack 1942 in a non-perpendicular orientation relative to a flow direction through the filter housing (e.g., to maintain curvature and pleat spacing of the filter media pack 1942) when the filter element 1904 is arranged in a fully expanded position (e.g., when the filter element 1904 is installed within the filter housing). In some embodiments, the media support element(s) 1944 includes a plurality of ribbons that extend across, and are bonded or otherwise coupled to, the first plurality of bend lines 1946 or the second plurality of bend lines 1948. For example, the media support element(s) 1944 may include a first plurality of ribbons 1964 coupled to the first plurality of bend lines 1946 and a second plurality of ribbons 1966 coupled to the second plurality of bend lines 1948. A length of the first plurality of ribbons 1964 may be less than a length of the second plurality of ribbons 1966, resulting in greater pleat spacing along the outlet face 1952 than the inlet face 1950. In other embodiments, the arrangement may be reversed.

In other embodiments, the design of the media support element(s) 1944 may be different. For example, the media support element(s) 1944 may include a shaft or another rigid support member that extends between the first frame element or the second frame element (see FIG. 5). In other embodiments, the media support element(s) 1944 includes arcuate (e.g., curved, bowed, arched, etc.) side caps and/or end caps that engage the filter media pack along lateral ends of the filter media pack to maintain the filter media pack, or portions thereof, in an arched or curved orientation within the filter housing.

In some embodiments, a depth 1958 of the channels 1947 is within a range between approximately 1.5 and 3.5 inches (e.g., approximately 2.5 inches, etc.). A first width 1960 of the channels 1947 proximate to the outlet face 1952 (e.g., a tip-to-tip pleat spacing at the outlet face 352) may be approximately 1.2 times, 1.3 times, 1.4 times, 1.5 times, or greater than a second width 1962 of the channels 1947 proximate to the inlet face 1950. In other embodiments, the size of the channels 1947 and/or average pleat spacing between the inlet face 1950 and the outlet face 1952 may be different.

Referring to FIGS. 60-61, a velocity profile 2000 through a filter housing is shown, according to an embodiment. As shown, air flow entering the filter housing passes through one or more curved inlet sections of inlet duct upstream of the filter housing before passing through the filter element. Such geometry, and the wall effects associated with channel flow through the inlet duct, result in regions of low air flow velocity adjacent to the walls of the inlet duct, and at a lower end of the transition into the filter housing. The velocity of the air flow increases approaching the middle or central portion of the filter housing. Among other benefits, arching the filter media pack to correspond with the velocity profile of air entering the filter housing or otherwise reducing media surface area in location of low air velocity can increase flow performance, for example, by increasing the overall media volume and surface area as described with reference to FIGS. 57-59.

The geometry of the filter housings and filter element of FIGS. 51-59 is provided for illustrative purposes only. It should be understood that a variety of alternatives and combinations are possible without departing from the inventive principles disclosed herein.

Figure 62:
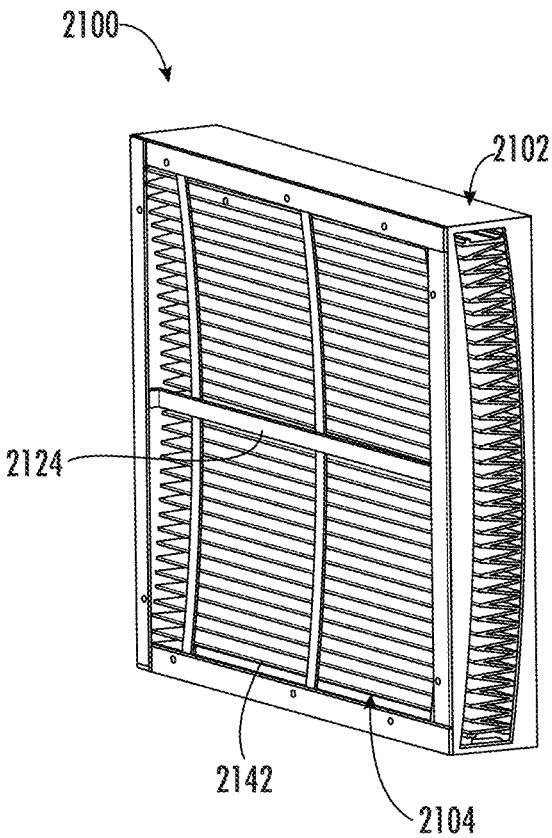
FIG. 62 is a perspective view of a filter assembly inclusive of a filter housing having a curved inlet opening, according to another embodiment.
Figure 63:
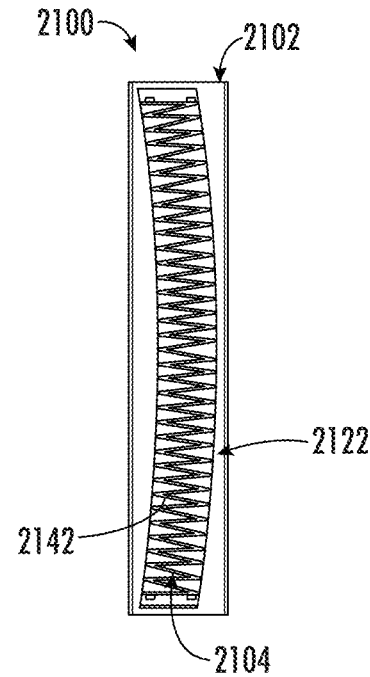
FIG. 63 is a side view of the filter assembly of FIG. 62.
Figure 64:
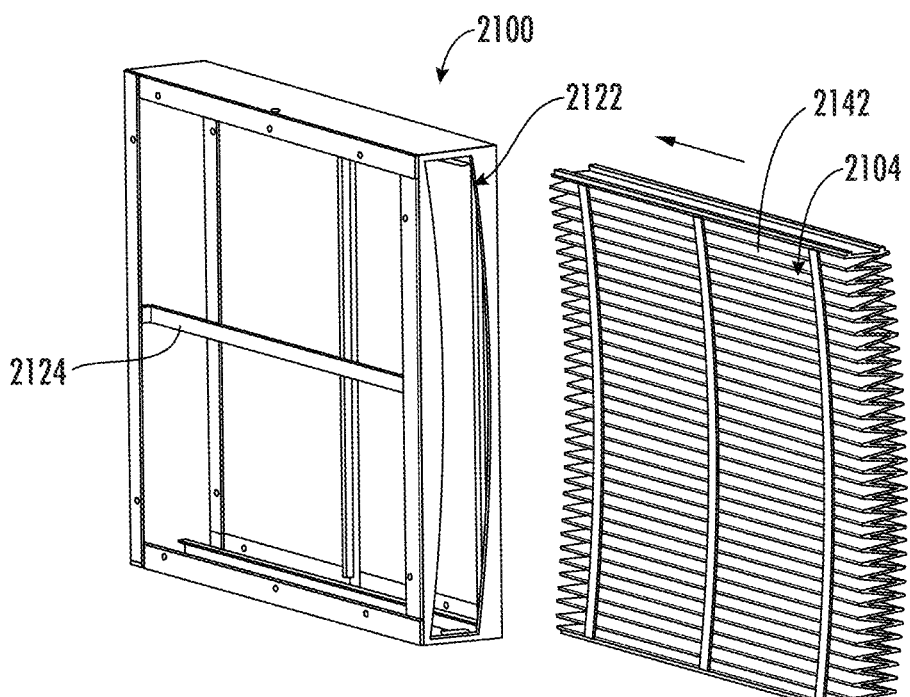
FIG. 64 is a perspective view of the filter assembly of FIG. 62 showing insertion of a filter element of the filter assembly.

Referring to FIGS. 62-64, a filter assembly 2100 is shown that includes a filter housing 2102 having an access opening 2122 having curved edges. The filter housing 2102 also includes an arcuate support member 2124 that extends in a lateral direction between opposing ends of the filter housing 2102. The arcuate support member 2124 is a shaft that is disposed at a midpoint or central region between upper and lower ends of the filter housing 2102 (e.g., between horizontally-oriented ends of the filter housing 2102). The shaft protrudes at opposing edges into the filter housing 2102 and has a substantially linear portion that engages the filter element 2104 at a peak of the curve or arch formed by the filter media pack 2142. In some embodiments, the shaft is rotatable relative to a frame or sidewalls of the filter housing 2102 to enable relative rotation between the shaft and the frame, similar to the filter housing structure described with reference to FIGS. 51-52.

Referring to FIGS. 65-67, a filter assembly 2200 is shown that includes a filter element 2204 having a curved or arcuate support structure 2206. The arcuate support structure 2206 includes an arcuate support element and curved side caps 2208. The arcuate support element extends between, and is coupled to, a first frame element 2238 (e.g., a first support element, etc.) and a second frame element 2240 (e.g., a second support element, etc.) of the filter element 2204. The arcuate support element is a rigid shaft having a curved profile that matches a curved shape of an inlet face 2250 of the filter media pack 2242. The shaft may be clipped or otherwise fastened onto the first frame element 2238 and the second frame element 2240, or directly to the filter media pack 2242.

The curved side caps 2208 are engaged with opposing longitudinal ends of a filter media pack 2242. The curved side caps 2208 each include a cup shaped body defining a recessed area sized to receive a longitudinal end of the filter media pack 2242 therein. The recessed area has an arched or curved cross-sectional shape to support the arch formed into the filter media pack 2242. The curved side caps 2208 may be bonded to the longitudinal ends of the filter media pack 2242 using an adhesive material to prevent air flow from bypassing the filter element 2204 through an interface between the filter media pack 2242 and the curved side caps 2208. In some embodiments, the side caps 2208 includes a seal member (e.g., a gasket, etc.) to prevent air bypass around the sides of the filter element 2204 during operation.

Figure 68:
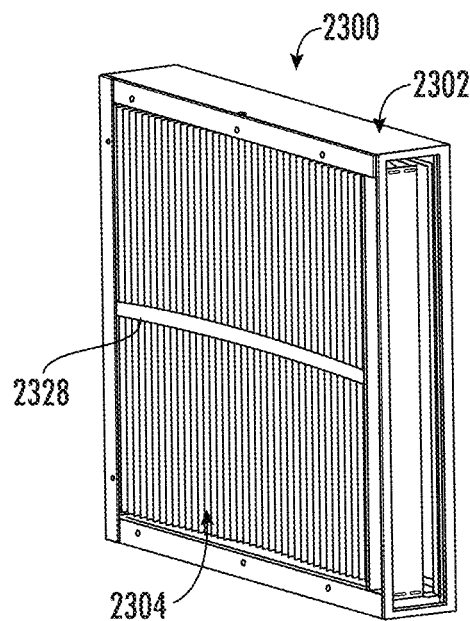
FIG. 68 is a perspective view of a filter assembly inclusive of a filter housing having an arcuate support extending along a lateral direction, according to another embodiment.
Figure 69:
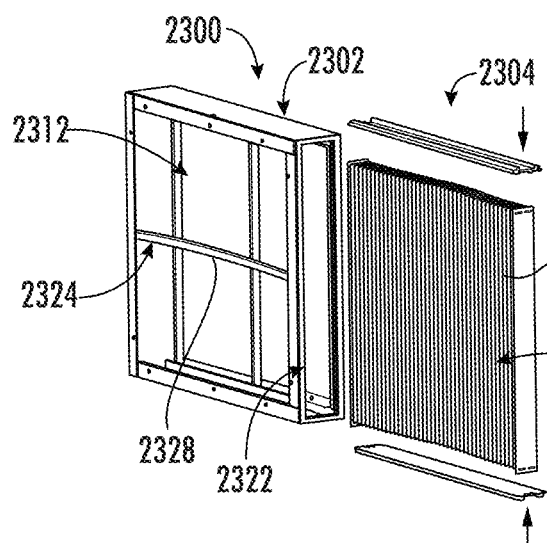
FIG. 69 is a perspective view of the filter assembly of FIG. 68 showing an assembly operation for a filter element of the filter assembly.
Figure 70:
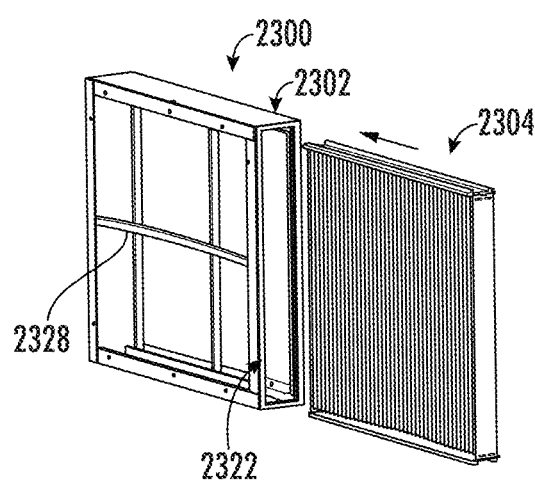
FIG. 70 is a perspective view of the filter assembly of FIG. 68 showing installation of a filter element of the filter assembly into the filter housing.

Referring to FIGS. 68-70, a filter assembly 2300 is shown that includes a filter element 2304 that is curved between longitudinal ends of the filter element 2304 when installed into a filter housing 2302 (e.g., such that the filter element 2304 is arched when viewed along a cross-section taken through a horizontal reference plane through the filter element 2304). The filter element 2304 includes a filter media pack 2342 having a plurality of bend lines 2346 oriented vertically (e.g., along an axial direction) between upper and lower ends of the filter element 2304. The filter housing 2302 includes an access opening 2322 having a rectangular cross-sectional shape, with edges oriented at approximately 90 degree angles with respect to one another.

The filter housing 2302 further includes a support member, shown as arcuate support member 2324 that extends in a longitudinal direction between opposing longitudinal ends of the filter housing 2302 (e.g., where one of the longitudinal ends defines an access opening 2322 of the filter housing 2302), and perpendicular to the bend lines 2346 of the filter media pack 2342. The arcuate support member 2324 is a rigid shaft 2328 that is disposed at a midpoint or central region between upper and lower ends of the filter housing 2302 (e.g., between horizontally-oriented sidewalls of the filter housing 2302). The shaft 2328 protrudes into an interior cavity 2312 of the filter housing 2302 and engages the filter element 2304 to impose a curved shape onto an inlet face 2350 of the filter media pack 2342. In some embodiments, the filter element 2304 includes frame elements (e.g., support elements, etc.) that are formed in an arch or curved shape that substantially matches the arch or curved shape of the filter media pack 2342. In other embodiments, the frame elements are formed from a flexible material that is configured to bend or otherwise deform to match the shape of the filter media pack 2342.

Figure 71:
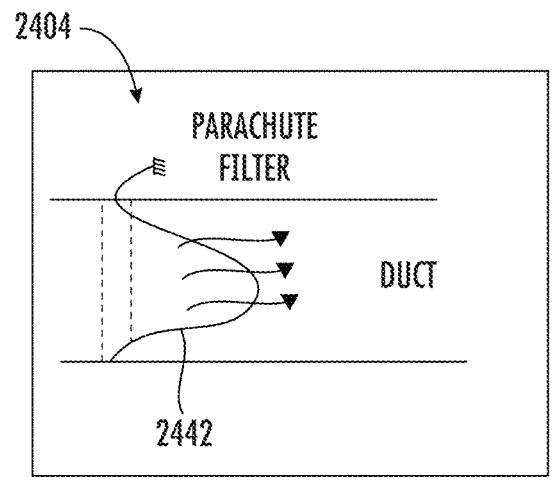
FIG. 71 is a side cross-sectional view of an expandable filter element, according to an embodiment.
Figure 72:
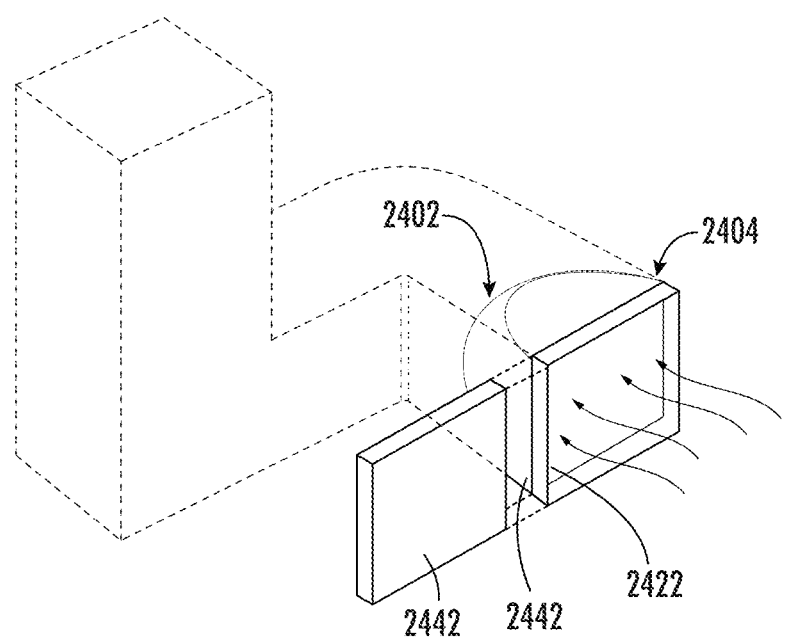
FIG. 72 is an isometric view of a filter assembly that includes an expandable filter element, according to an embodiment.

In some embodiments, the filter element is configured to move or otherwise deform in response to an applied fluid pressure across the filter element instead being curved or arched during installation into a filter housing. For example, referring to FIGS. 71-72, a filter element 2404 is shown having a filter media pack 2442 that is configured to expand along an air flow direction during operation to thereby increase flow area through the filter element 2404. The filter element 2404 includes a filter media pack 2442 that is shaped or otherwise formed as a right rectangular prism that may be inserted through a substantially rectangular-shaped access opening 2422 of the filter housing 2402. The filter media pack 2442 may be supported by at least one frame support that extends along at least one sidewall of the filter housing 2402. The filter media pack 2442 may be pleated along one or more directions so as to allow expansion of a central portion of the filter media pack 2442 under an applied fluid pressure across the filter media pack 2442. The central portion may expand along the flow direction, such that the filter media pack 2442 forms a curved or arcuate shape when viewed along a horizontal and/or vertical cross-section through the filter media pack 2442. In some embodiments, the filter element 2404 includes at least one media support element (e.g., a plurality of ribbons, etc.) that prevent over-expansion of the filter media pack 2442 along the flow direction during operation.

Figure 73:
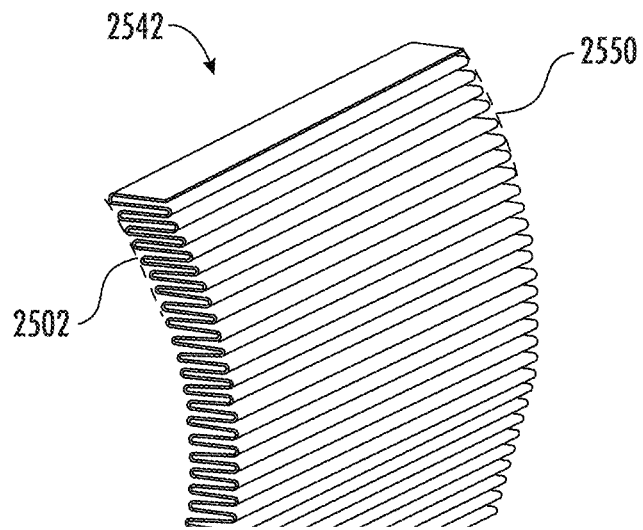
FIG. 73 is a perspective view of a portion of a curved filter media pack, according to another embodiment.
Figure 74:
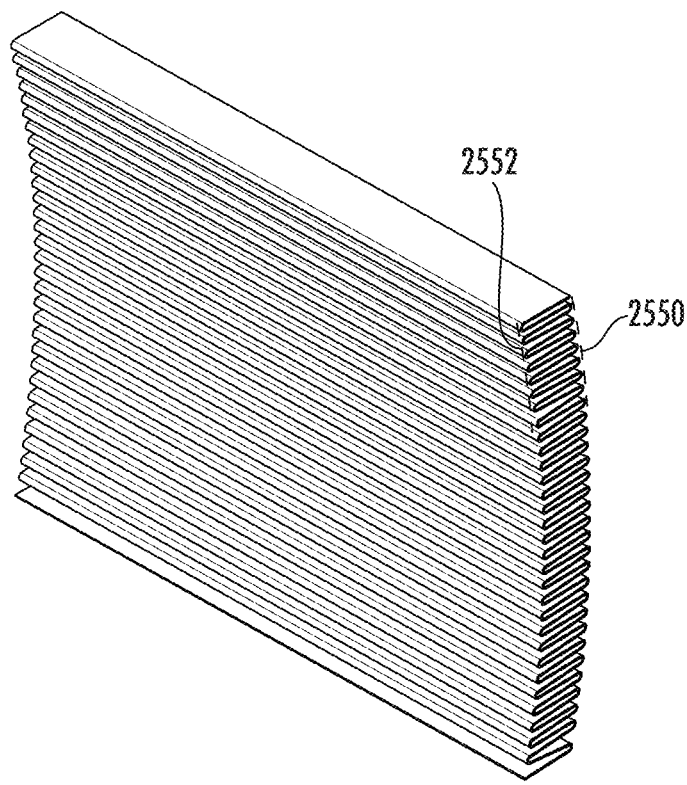
FIG. 74 is a perspective view of a curved filter media pack of FIG. 73.
Figure 75:
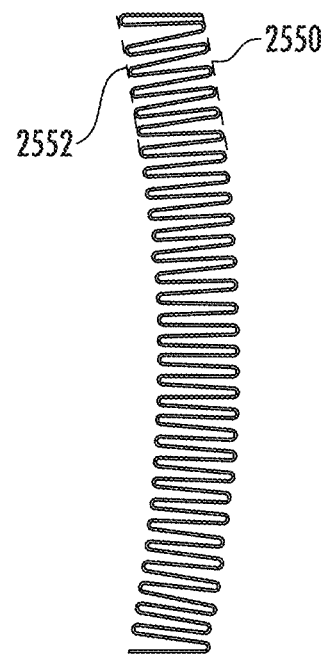
FIG. 75 is a side view of the curved filter media pack of FIG. 73.

Referring to FIGS. 73-75, another embodiment of a curved (e.g., arched, etc.) filter media pack 2542 is shown. The filter media pack 2542 has a similar design as the filter media pack described with reference to FIGS. 57-58 but is arranged so that a central portion of the filter media pack 2542 curves, arcs, or otherwise protrudes toward an inlet opening of the filter housing. In other words, the filter media pack 2542 is arranged such that an inlet face 2550 of the filter media pack 2542 has a greater radius than an outlet face 2552 of the filter media pack 2542. Such an arrangement—which increases the overall volume and surface area of the filter media within the filter housing due to the curvature of the filter media pack 2542—can reduce pressure drop across the filter media pack 2542 during operation. Additionally, curving the central portion of the filter media pack 2542 toward an upstream side of the filter housing increases pleat separation along the inlet face 2550 (e.g., a separation distance between bend lines on an upstream side of the filter media pack 2542) and improves resistance to deformation and/or pleat collapse due to air flow passing through the filter media pack 2542.

Figure 76:
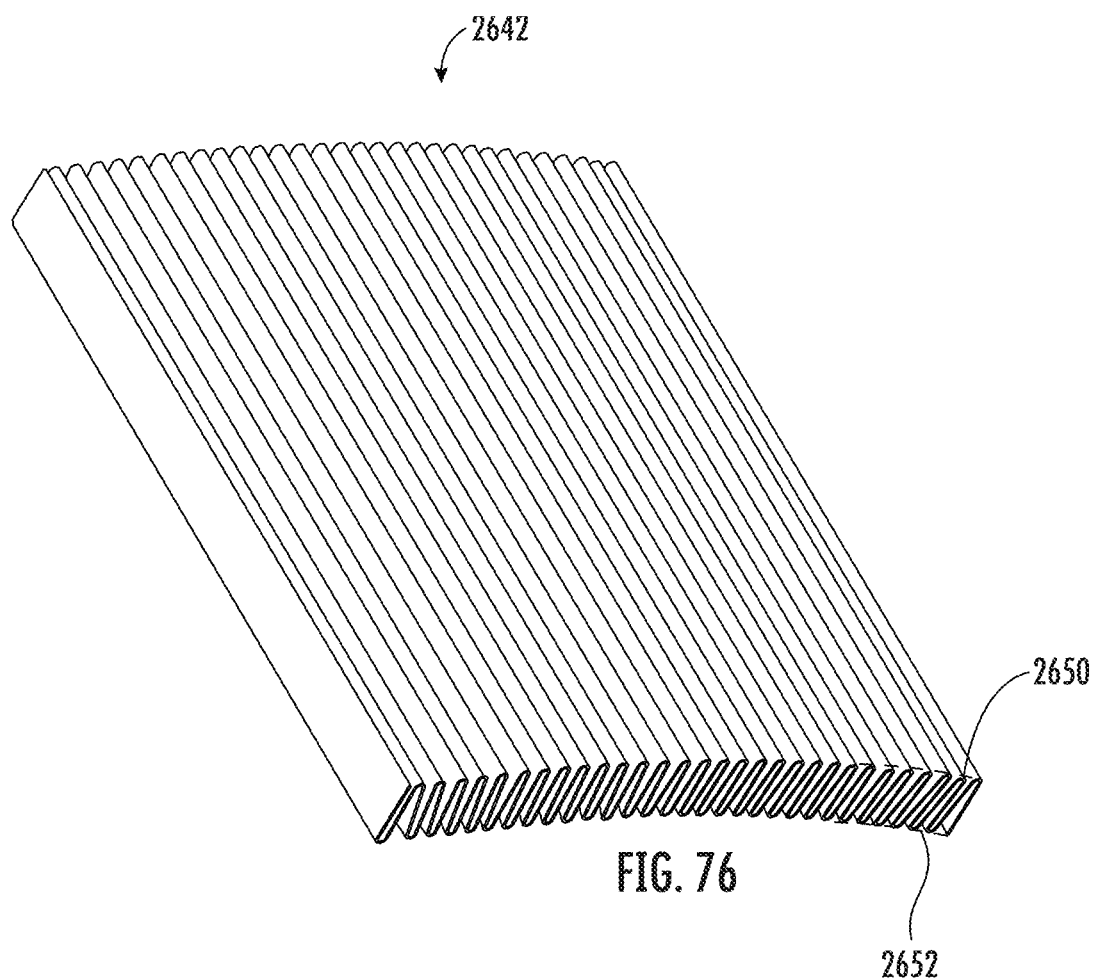
FIG. 76 is a perspective view of a curved filter media pack, according to another embodiment.
Figure 77:
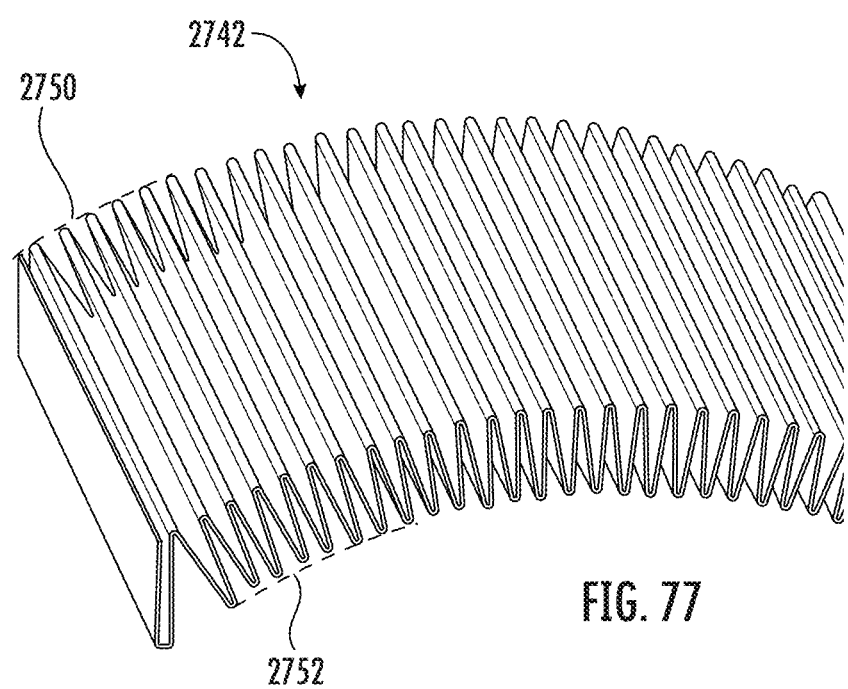
FIG. 77 is a perspective view of a curved filter media pack, according to yet another embodiment.

Referring to FIGS. 76-77, a radius of an inlet face 2650, 2750 of the filter media pack 2642, 2742 may be different in various embodiments. In some embodiments, the filter media pack 2642, 2742 is curved so that a central portion (e.g., a midpoint, etc.) of the inlet face 2650, 2750 protrudes approximately 0.5 times, 0.4 times, or 0.3 times the depth of the filter media pack 2642, 2742 beyond the outer ends of the filter media pack 2642, 2742 (e.g., beyond the outermost pleats of the filter media pack 2642, 2742). Among other benefits, such an arrangement increases media area without significantly reducing the strength of the filter media pack 2642, 2742. In other embodiments, the curvature of the filter media pack 2642, 2742 may be different.

Referring to FIGS. 78-79, a filter media pack 2842 is shown that includes chamfered portions (e.g., chamfers, etc.) near outer ends (e.g., axial ends, etc.) of the filter media pack 2842 (i.e., in which the variation in pleat height of the filter media pack along the axial direction defines chamfered portions and/or open regions above and/or below the filter media pack 2842). The chamfers are formed on opposing ends of an inlet face 2850 of the filter media pack 2842 but may be formed on an outlet face 2852 of the filter media pack 2842 in other embodiments.

Referring to FIG. 79, the filter media pack 2842 includes a plurality of wall segments 2843 that extend between bend lines along an inlet face 2850 and an outlet face 2852 of the filter media pack 2842. The plurality of wall segments 2843 define a plurality of channels 2847 that extend linearly along the filter media pack 2842. The chamfers are arranged so that a first height 2860 of a first channel proximate to one of (i) the first axial end of the filter media pack 2842 and (ii) a second, opposing axial end of the filter media pack 2842 is greater than a second height 2862 of a second channel that is disposed at a center portion (e.g., midpoint, centermost pleat, etc.) of the filter media pack 2842 between the first axial end and the second axial end of the filter media pack 2842. In some embodiments, the plurality of channels 2847 increase approximately linearly in height along the chamfers. In other embodiments, and as shown in FIGS. 9-10, a height of the plurality of channels 2847 decreases in a stepwise manner approaching an axial end of the filter media pack 2842.

Referring still to FIG. 79, the chamfers form a wedge shape having a wedge angle 2864 on either end of the filter media pack 2842. The inlet face 2850 includes curved or angled outer portions 2844 proximate outer axial ends of the filter media pack 2842, and a substantially linear central portion 2846 extending in between the outer portions 2844. The outer portions 2844 are disposed proximate to end pleats of the filter media pack 2842 that extend along outer ends of the filter media pack 2842 (upper and lower ends of the filter media pack 2842 as shown in FIGS. 78-79). An outlet face 1352 of the filter media pack 2842 is substantially planar and extends linearly between opposing axial ends of the filter media pack 2842.

The chamfers and/or open regions reduce the amount of media surface area and volume at the outer ends of the filter media pack 2842, where the air flow velocity is reduced. The media surface area and volume increase gradually (e.g., linearly, etc.) moving away from the end pleats of the filter media pack 2842, along the chamfer. This increase in media area, approaching the center of the filter media pack 2842, follows the trend in air flow velocity approaching the center of the inlet duct (see FIGS. 60-61), resulting in a more consistent media velocity and filtration performance across the entire axial length of the filter media pack 2842. Because air flow is reduced at the outer axial ends of the filter media pack 2842, the pleat/channel depth and the amount of filter media used can be reduced without a significant reduction in filter media life. Such an arrangement can improve filter-performance-to-material-usage ratio for the filter media pack 2842.

Figure 81:
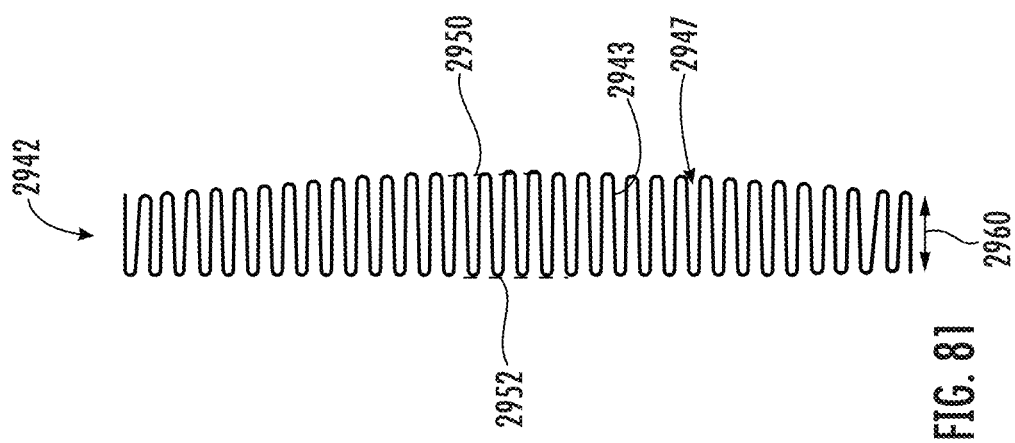
FIG. 81 is a side view of the filter media pack of FIG. 80.
Figure 80:
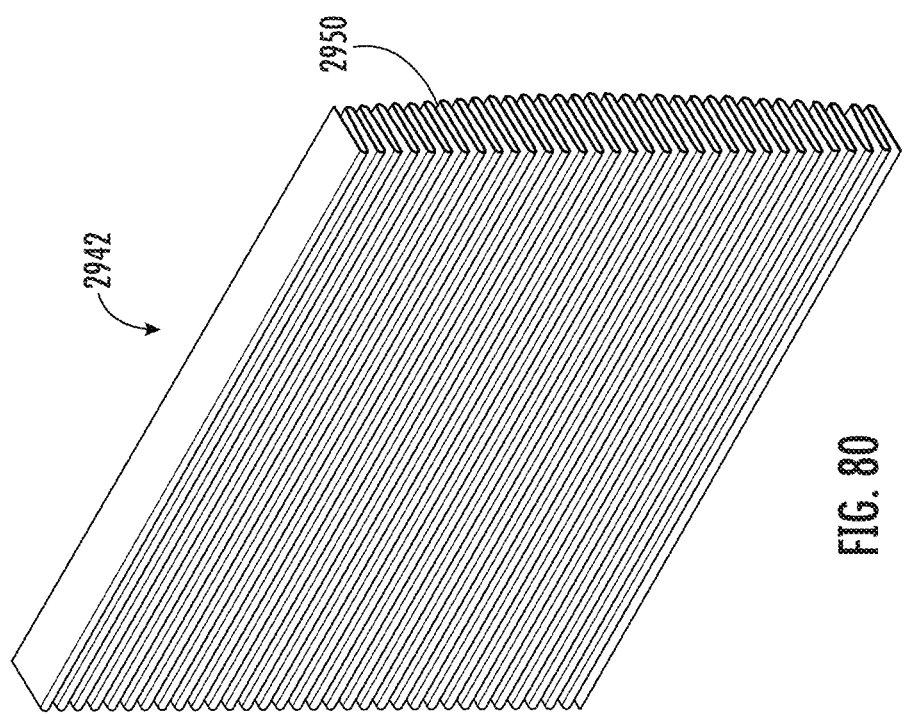
FIG. 80 is a perspective view of a filter media pack having a curved inlet face and a substantially planar outlet face, according to an embodiment.

The geometry of the inlet face and/or the outlet face of the filter media pack may be different in various embodiments. Referring to FIGS. 80-81, another filter media pack 2942 having a curved inlet face 2950 is shown. The filter media pack 2942 includes a plurality of wall segments 2943 that extend between bend lines along the inlet face 2950 and an outlet face 2952 of the filter media pack 2942. The plurality of wall segments 2943 define a plurality of channels 2947 that extend linearly along the filter media pack 2942, between longitudinal ends of the filter media pack 2942. The outlet face 2952 is substantially planar and extends linearly between opposing ends of the filter media pack 2942. The inlet face 2950 is curved so that a central portion of the inlet face 2950 arcs, bows, or otherwise protrudes away from the outlet face 2952. In other embodiments, the arrangement of the filter media pack is reversed so that the inlet face is substantially planar and the outlet face is curved. Although described as having a particular arrangement with respect to a flow direction through the filter element, it should be appreciated that the arrangement of any of the filter media pack and/or filter element may be reversed in any of the embodiments described herein.

Figure 82:
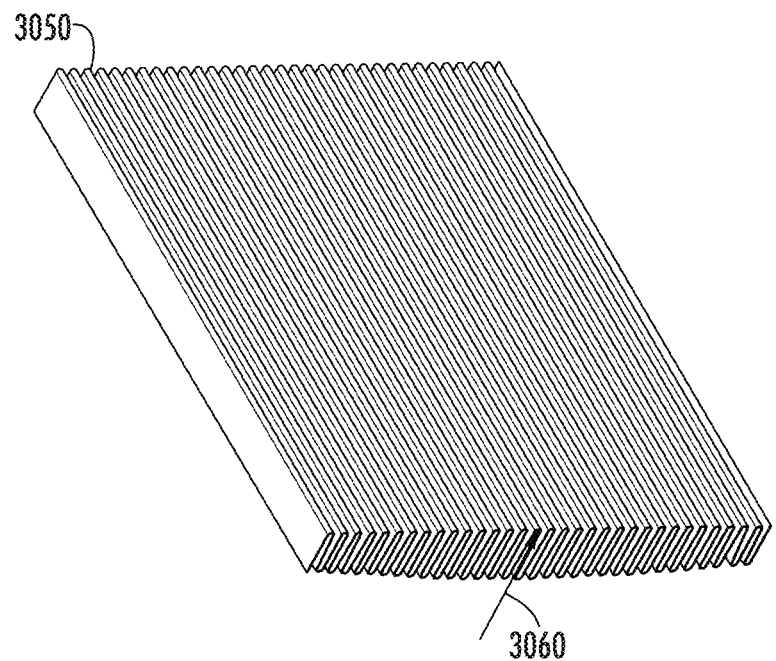
FIG. 82 is a perspective view of a filter media pack having a curved inlet face and a substantially planar outlet face, according to another embodiment.
Figure 83:
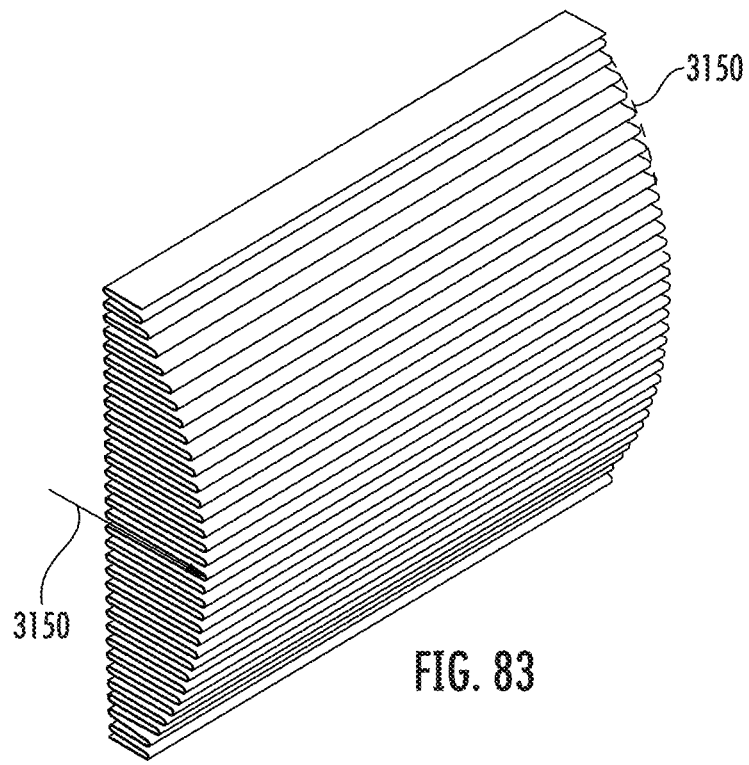
FIG. 83 is a perspective view of a filter media pack having a curved inlet face and a substantially planar outlet face, according to yet another embodiment.

In some embodiments, a height 2960 of the plurality of channels 2947, between the inlet face 2950 and the outlet face 2952, varies continuously along the filter media pack 2942 between opposing ends of the filter media pack 2942. In some embodiments, the inlet face 2950 has an approximately uniform radius of curvature between opposing ends of the filter media pack 2942. Such an arrangement, in which the media area varies continuously between opposing ends of the filter media pack 2942, may correspond with a fully developed air flow velocity profile across the inlet duct (such as when the filter element is disposed downstream from a straight section of duct, instead of downstream of a curved portion of the inlet duct). Referring to FIGS. 82-83, a radius 3060, 3160 of the inlet face 3050, 3150 can be different and/or reversed in various embodiments.

Figure 85:
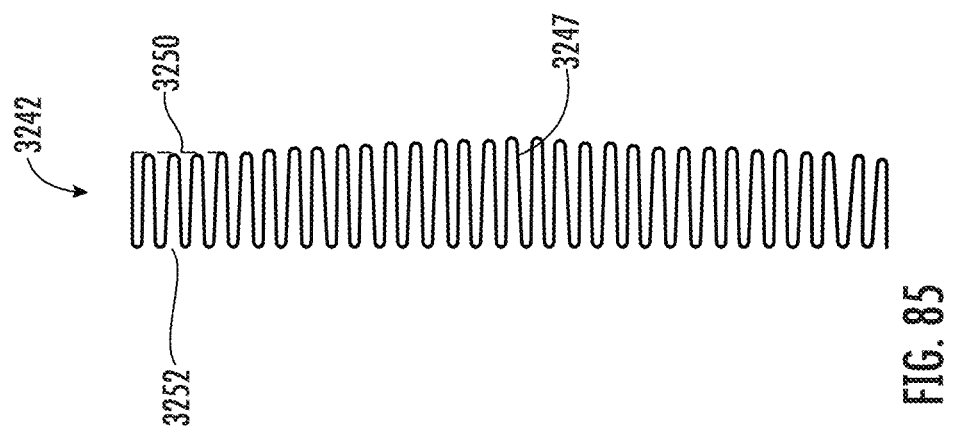
FIG. 85 is a side view of the filter media pack of FIG. 84.
Figure 84:
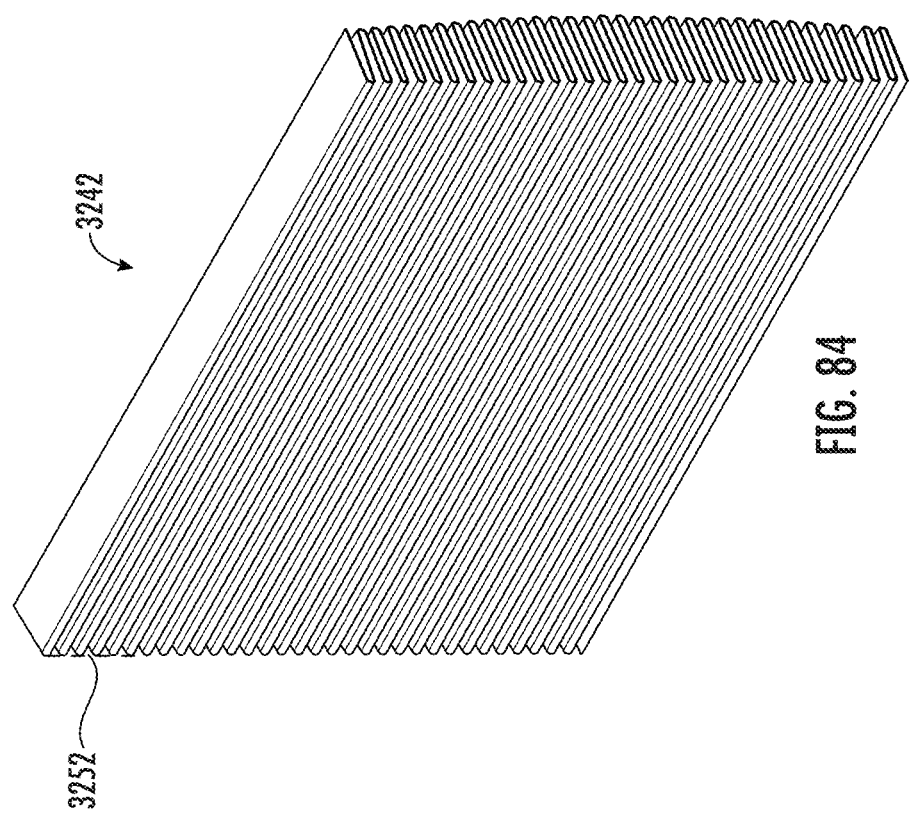
FIG. 84 is a perspective view of a filter media pack having a wedge-shaped inlet face, according to an embodiment.

FIGS. 84-85 show yet another example filter media pack 3242. The filter media pack 3242 includes a substantially planar outlet face 3252 that extends linearly across the filter media pack 3242. The filter media pack 3242 includes an inlet face 3250 that defines a wedge-shaped profile or 'V' shape profile when viewed along a cross-section taken perpendicular to the plurality of wall segments 3247 extending between the inlet face 3250 and the outlet face 3252. Such an arrangement provides a different rate of increase in media surface area (moving from the outer ends of the filter media pack toward a central portion of the filter media pack, such as a substantially linear increase in flow rate between the outer ends and the central portion of the filter media pack) relative to the curved outlet face arrangements described with reference to FIGS. 80-83, which may be desirable under certain inlet duct arrangements and can also improve manufacturability of the filter media pack. Additionally, in some embodiments, the substantially planar outlet face 3252 can simplify alignment and installation of the filter element into a filter housing by providing a reference surface that can be aligned with a straight edge of the access opening in the housing.

Figure 86:
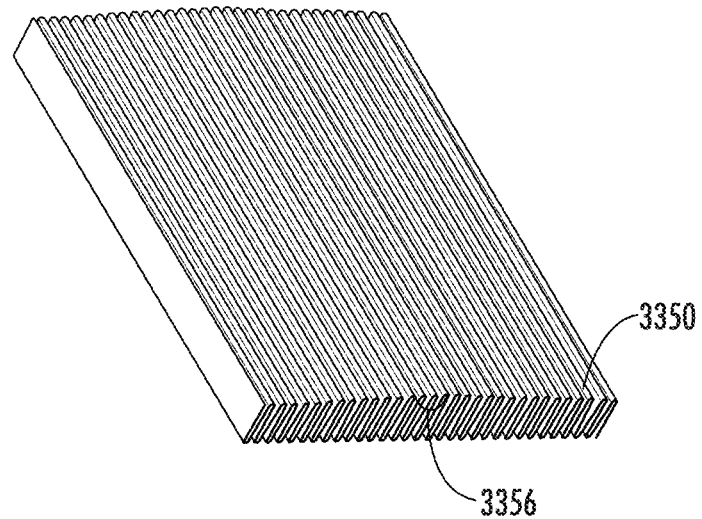
FIG. 86 is a perspective view of a filter media pack having a wedge-shaped inlet face, according to another embodiment.
Figure 87:
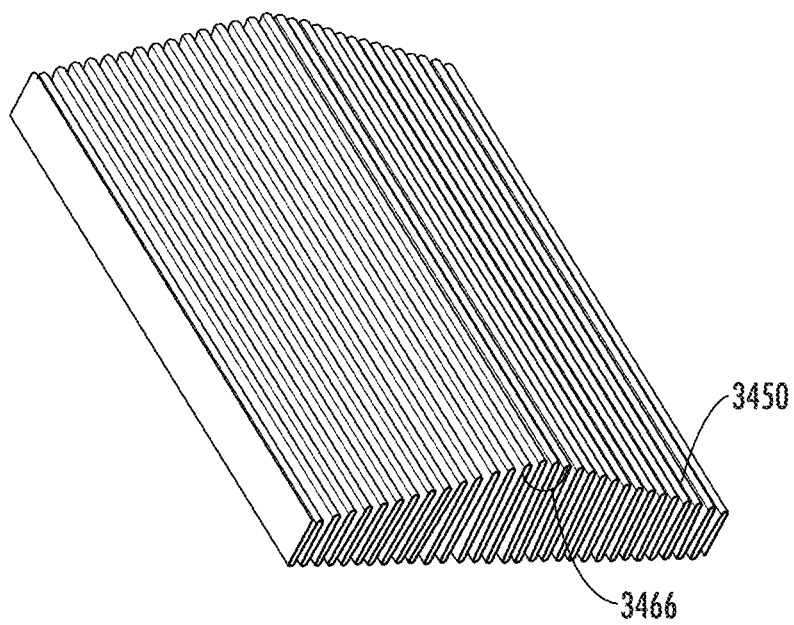
FIG. 87 is a perspective view of a filter media pack having a wedge-shaped inlet face, according to yet another embodiment.

Referring to FIGS. 86-87, the inlet face 3350, 3450 may define an inlet face angle 3366, 3466 between planar portions of the inlet face 3350, 3450. Smaller values of the inlet face angle 3366, 3466 may result in a larger protrusion of the filter media pack along the flow direction. The inlet face angle 3366, 3466 may be different in various embodiments.

Figure 89:
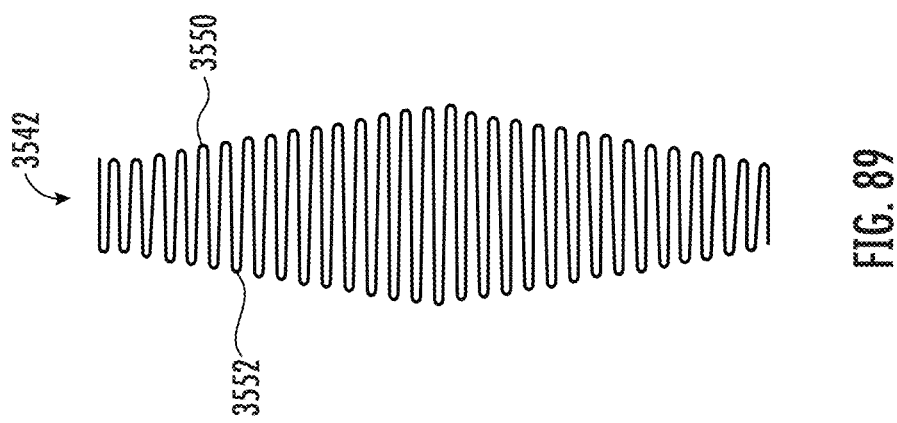
FIG. 89 is a side view of the filter media pack of FIG. 88.
Figure 88:
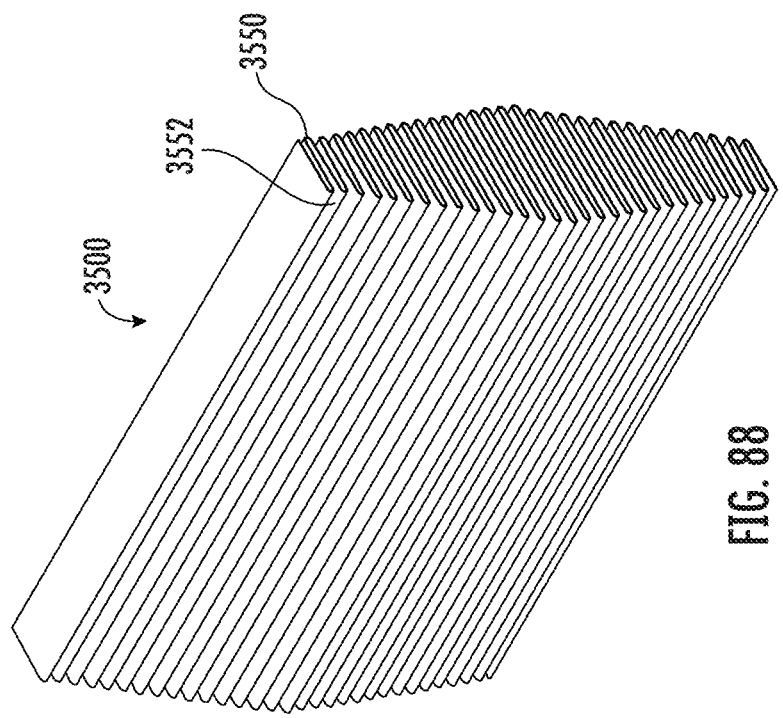
FIG. 88 is a perspective view of a filter media pack having angled inlet and outlet faces, according to an embodiment.

In some embodiments, both the inlet face and the outlet face of the filter media pack includes portions that arc, bow, or otherwise protrude along the flow direction. Referring to FIGS. 88-89, a filter media pack 3542 is shown that has an approximately diamond-shaped cross-section when viewed normal to a flow direction through the filter media pack 3542. Both an inlet face 3550 and an outlet face 3552 of the filter media pack 3542 define a wedge-shaped or 'V' shaped profiled when viewed normal to the flow direction through the filter media pack 3542.

The profile of the inlet face 3550 may be a mirror image of the profile of the outlet face 3552. In addition to increasing media surface area and volume in areas of high air flow velocity through the filter assembly—which increases the filter media material-to-lifespan ratio of the filter element—the filter media pack 3542 of FIGS. 88-89 occupies an approximately uniform portion of the interior cavity of the filter housing on either side of the filter media pack 3542, which can reduce the overall footprint of the filter housing.

Figure 90:
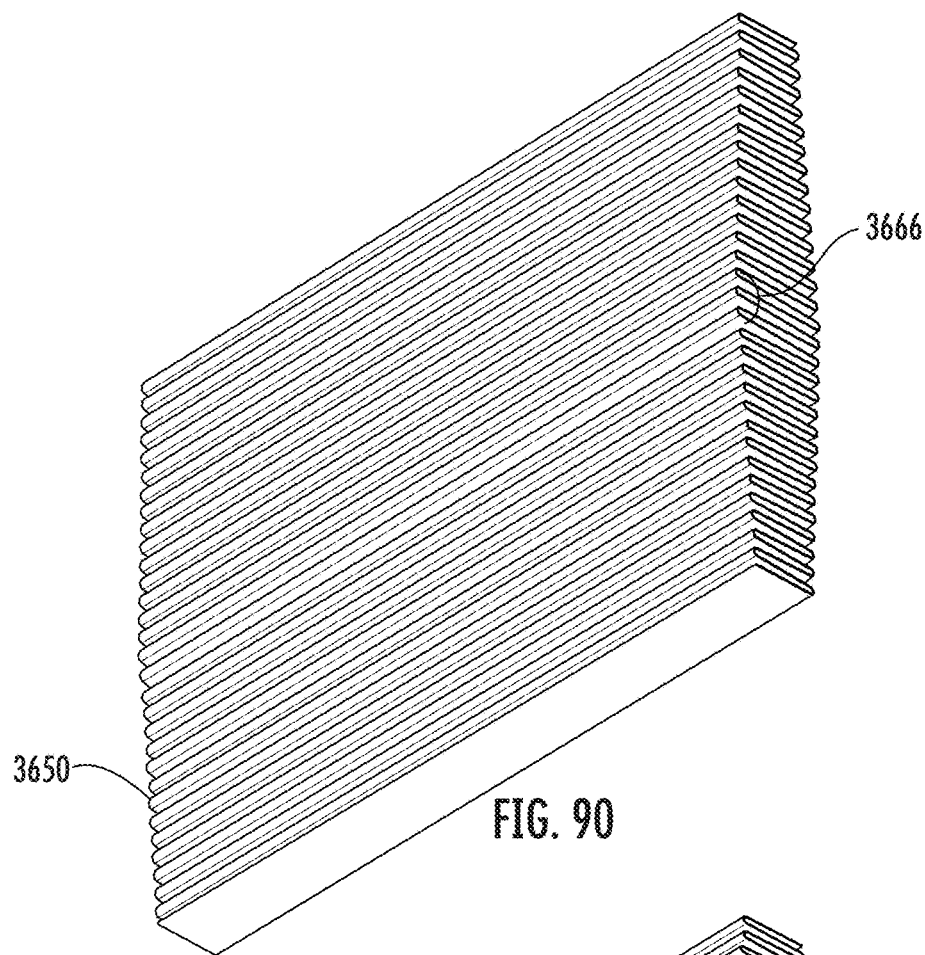
FIG. 90 is a perspective view of a filter media pack having angled inlet and outlet faces, according to another embodiment.
Figure 91:
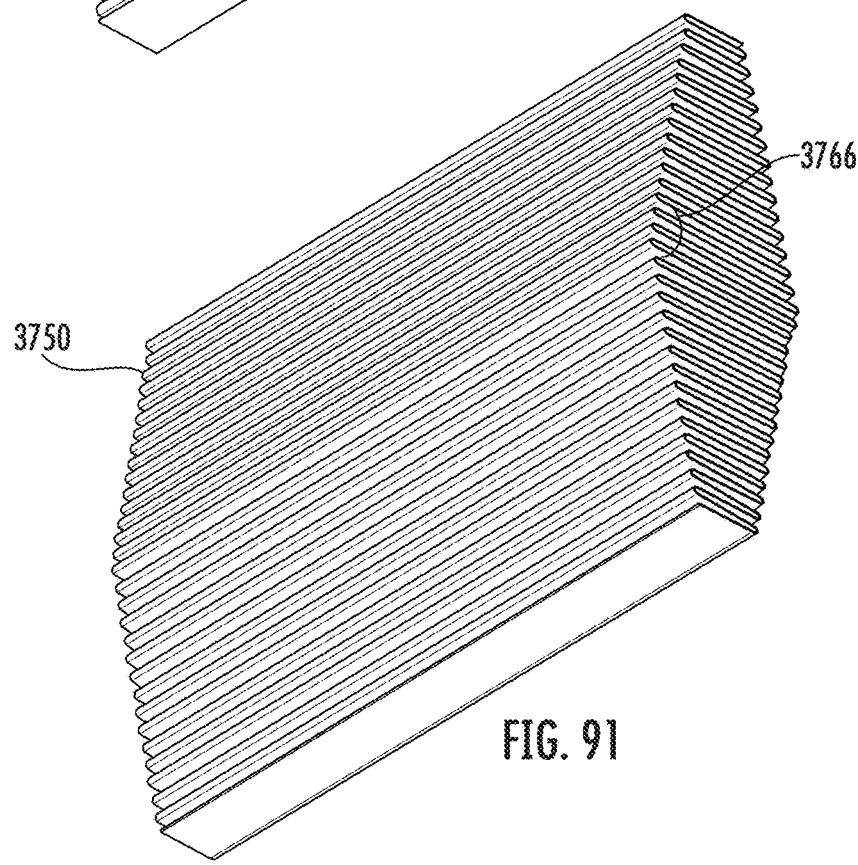
FIG. 91 is a perspective view of a filter media pack having angled inlet and outlet faces, according to yet another embodiment.

Referring to FIGS. 90-91, an inlet face 3650, 3750 may define an inlet face angle 3666, 3766 between planar portions of the inlet face 3650, 3750. The outlet face may have an outlet face angle that corresponds with (e.g., is the same as, etc.) the inlet face angle 3666, 3766. Smaller values of the inlet face angle 3666, 3766 may result in a larger protrusion of the filter media pack along the flow direction. The inlet face angle 3666, 3766 and the outlet face angle may be different in various embodiments.

Figure 92:
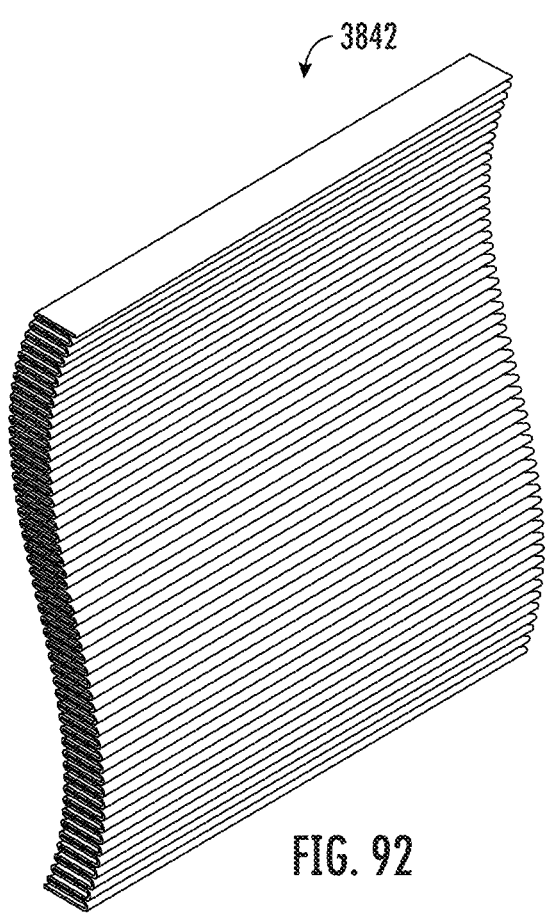
FIG. 92 is a perspective view of a filter media pack having both convex and concave portions, according to an embodiment.
Figure 93:
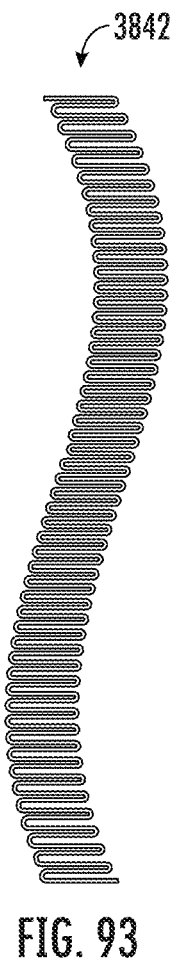
FIG. 93 is a side view of the filter media pack of FIG. 92.
Figure 94:
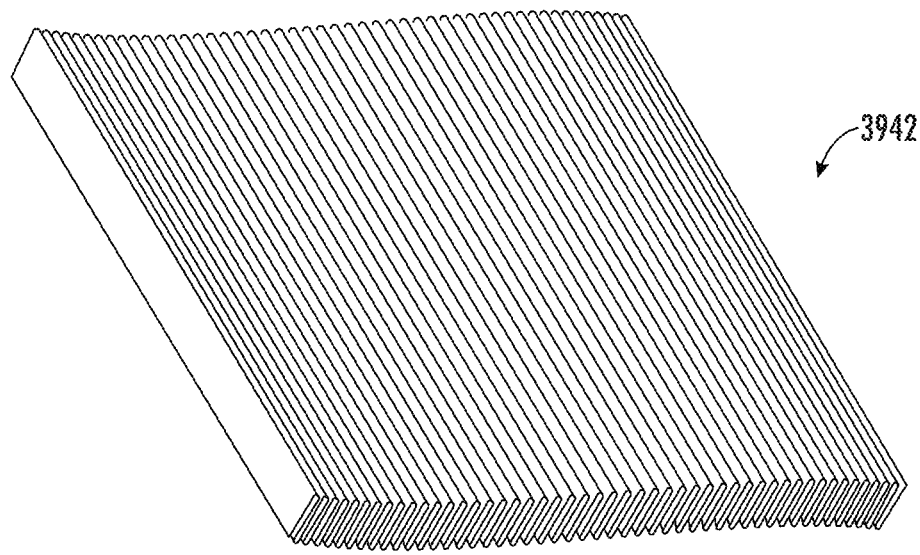
FIG. 94 is a perspective view of a filter media pack having both convex and concave portions, according to another embodiment.
Figure 95:
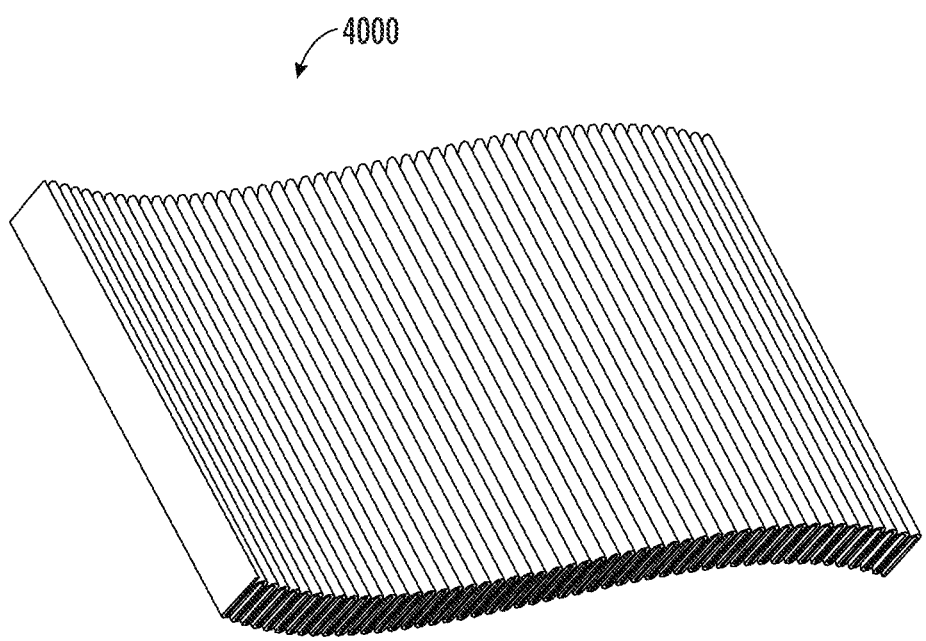
FIG. 95 is a perspective view of a filter media pack having both convex and concave portions, according to yet another embodiment.

Referring to FIGS. 92-93, a filter media pack 3842 is shown that is formed in an 'S' shape when viewed along a cross-section taken perpendicular to a flow direction through the filter media pack 3842. The filter media pack 3842 may be supported by a plurality of media support elements (e.g., ribbons, etc.) along an inlet face and/or an outlet face of the filter media pack 3842 that is attached to the filter media along bend lines. The inlet face and the outlet face each have a convex portion and a concave portion. The concave portion of the inlet face is aligned along the flow direction with the convex portion of the outlet face. As shown in FIGS. 94-95, a curvature of the filter media pack 3942, 4042 (e.g., a radius defining the convex and concave portions of the inlet and outlet faces) can differ in various embodiments. Among other benefits, the 'S' shaped provide provides more media volume and surface area as compared to a rectangular media pack, and provides an approximately uniform average pleat spacing between the upstream and downstream sides of the filter media pack 3942, 4042. Additionally, the concave or convex portions of the filter media pack 3942, 4042 can improve flow performance by redirecting more flow up and across the filter media pack 3942, 4042 (e.g., toward the concave portion of the filter media pack 3942, 4042) increasing contact time between the air and the filter media, thereby improving filter performance.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members, or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:

1. A filter element for a heating, ventilation, and/or air conditioning (HVAC) system, the filter element comprising:
    a filter media pack including a pleated filter media;
    a first support element including:
        a connecting member coupled to an end pleat of the pleated filter media on a first side of the connecting member, the connecting member including at least a portion of a curved wall that curves about a central axis that extends substantially parallel to a longitudinal axis of the connecting member; and a first interface member at a distal end of the curved wall, the first interface member defining a first support ledge that is disposed over a second side of the connecting member that is opposite the first side, the first support ledge extending substantially parallel to the longitudinal axis.

2. The filter element of claim 1, wherein the curved wall defines an overall lateral end of the first support element.

3. The filter element of claim 1, wherein the curved wall forms a circular arc, the curved wall configured to facilitate rotational alignment of the first support element relative to a rail guide of an air cleaner housing.

4. The filter element of claim 1, wherein the curved wall has a continuous curvature.

5. The filter element of claim 1, wherein the curved wall has an approximately constant radius of curvature so that the curved wall is configured to facilitate alignment between the first support element and a rail system of a filter housing.

6. The filter element of claim 1, wherein the curved wall defines a cylindrically shaped volume that is sized to nestably receive a complementary receiving structure of a filter housing therein.

7. The filter element of claim 1, wherein the first support element further comprises a second interface member extending from an opposite end of the connecting member as the first interface member, the second interface member defining a second support ledge that is disposed over the second side of the connecting member, the second support ledge extending parallel to the first support ledge.

8. The filter element of claim 7, wherein a first dimension between the first support ledge and a first portion of the connecting member, in a direction perpendicular to a reference plane that extends from the first support ledge to the second support ledge, is different from a second dimension between the second support ledge and a second portion of the connecting member in the direction perpendicular to the reference plane.

9. The filter element of claim 8, wherein the second interface member includes at least a portion of a leg that extends away from the connecting member in a substantially perpendicular orientation relative to the connecting member.

10. The filter element of claim 1, further comprising a second support element coupled to an opposing end of the filter media pack as the first support element, wherein the filter media pack is reconfigurable between a collapsed position in which the first support element and the second support element are separated by a first distance, and an expanded position in which the first support element and the second support element are separated by a second distance that is greater than the first distance.

11. The filter element of claim 1, wherein the first support element comprises a second interface member extending from an opposite end of the connecting member as the first interface member, wherein the curved wall is rolled back over the connecting member and toward the second interface member so that an end of the curved wall is disposed between overall lateral ends of the first support element.

12. The filter element of claim 1, further comprising a second support ledge that extends substantially parallel to the first support ledge, wherein the second support ledge is spaced apart from the connecting member along an axial direction that is substantially perpendicular to the longitudinal axis.

13. A method of making a filter element for a heating, ventilation, and/or air conditioning (HVAC) system, comprising:

coupling a filter media pack including a pleated filter media to a connecting member of a support element by coupling an end pleat of the pleated filter media to a first side of the connecting member, the connecting member including:

at least a portion of a curved wall that curves about a central axis that extends substantially parallel to a longitudinal axis of the connecting member; and a first interface member at a distal end of the curved wall, the first interface member defining a first support ledge disposed over a second side of the connecting member that is opposite the first side, the first support ledge extending substantially parallel to the longitudinal axis.

14. The method of claim 13, wherein coupling the filter media pack to the connecting member comprises applying an adhesive material across at least a portion of a surface defined by a media-facing side of the support element, and pressing the end pleat of the filter media pack into the adhesive material to engage the end pleat with the portion of the surface.

15. The filter element of claim 1, wherein the curved wall defines a curved surface on the first side of the connecting member.

16. The filter element of claim 1, wherein the connecting member includes a first portion extending away from the curved wall and the first interface member along a lateral direction that is substantially perpendicular to the longitudinal axis, the first portion tangent to the curved wall at a location where the first portion engages the curved wall, and wherein the curved wall curves away from the filter media pack.

* * * * *